US005661219A

United States Patent [19]
Nakane et al.

[11] Patent Number: 5,661,219
[45] Date of Patent: Aug. 26, 1997

[54] CURABLE COMPOSITION, THERMAL LATENT ACID CATALYST, METHOD OF COATING, COATED ARTICLE, METHOD OF MOLDING AND MOLDED ARTICLE

[75] Inventors: Yoshinori Nakane, Kanagawa-ken; Hiroki Mizutani, Chigasaki; Hayato Ishibashi, Yokohama; Masahiro Ishidoya, Chigasaki, all of Japan

[73] Assignee: Nof Corporation, Tokyo, Japan

[21] Appl. No.: 297,588

[22] Filed: Aug. 29, 1994

[30] Foreign Application Priority Data

| Sep. 6, 1993 | [JP] | Japan | 5-243512 |
| Sep. 6, 1993 | [JP] | Japan | 5-243513 |
| Mar. 4, 1994 | [JP] | Japan | 6-058368 |
| Mar. 11, 1994 | [JP] | Japan | 6-066470 |
| Mar. 22, 1994 | [JP] | Japan | 6-073778 |
| Mar. 28, 1994 | [JP] | Japan | 6-079239 |
| May 23, 1994 | [JP] | Japan | 6-130900 |
| May 23, 1994 | [JP] | Japan | 6-130901 |

[51] Int. Cl.$^6$ ............ C08L 67/02; C08L 33/02; C08L 37/00; C08L 29/00
[52] U.S. Cl. ............ 525/166; 525/169; 525/170; 525/175; 525/176; 525/206; 525/208; 525/209; 525/212; 525/217; 525/220; 525/221; 525/223; 525/437; 525/438; 525/440; 525/444; 525/446
[58] Field of Search ............ 525/116, 117, 525/166, 169, 170, 175, 176, 206, 208, 209, 212, 217, 220, 221, 223, 437, 438, 440, 444, 446

[56] References Cited

U.S. PATENT DOCUMENTS

| 3,505,297 | 4/1970 | Sheetz et al. |
| 3,679,618 | 7/1972 | Lohr. |
| 4,132,686 | 1/1979 | Toyoshima et al. |
| 4,371,667 | 2/1983 | Moller et al. |
| 4,579,937 | 4/1986 | Masuda et al. |
| 4,644,051 | 2/1987 | Van Geenen ............ 528/323 |
| 4,650,718 | 3/1987 | Simpson et al. |
| 4,681,811 | 7/1987 | Simpson et al. |
| 4,703,101 | 10/1987 | Singer et al. |
| 4,764,430 | 8/1988 | Blackburn et al. |
| 4,769,400 | 9/1988 | Geist et al. |
| 5,001,207 | 3/1991 | Saegusa et al. ............ 528/49 |
| 5,319,024 | 6/1994 | Ishidoya et al. |
| 5,352,740 | 10/1994 | Ishidoya et al. |
| 5,419,929 | 5/1995 | Ishidoya ............ 525/208 |

FOREIGN PATENT DOCUMENTS

| 672 947 | 10/1963 | Canada. |
| 0 029 595 | 6/1981 | European Pat. Off. |
| 0 451 738 A2 | 10/1991 | European Pat. Off. |
| 0 535 667 A2 | 4/1993 | European Pat. Off. |
| 178626/1992 | 2/1992 | Taiwan. |

OTHER PUBLICATIONS

Hayase et al. "J.Poly.Sci., Chem.Ed.", vol. 19, 2185–2194 (1981).

Lee et al., "Handbook of Epoxy Resins" McGraw Hill Book Co., New York, pp. 11/2–3 (1982 Reissue).

Patent Abstracts Of Japan, unexamined applications, C field, vol. 17, Aug. 12, 1993, The Patent Office Japanese Government, p. 166 C 1096 of JP-A-05 097 771 (Nippon Oil & Fats Co. Ltd.).

Database WPIL, No. 91-337 221, Oct. 8, 1991, Derwent Publications Ltd., London of JP-A-03 227 950 (Niso Maruzen Chem. K) Abstract.

File Supplier PAJ/JPO abstract of JP-A-4081419, Mar. 1992.

Derwent Abstract of JP 4072324, Mar. 1992.

Derwent Abstract of JP 2-115238, Apr. 1990.

Derwent Abstract of JP 1-104646, Apr. 1989.

Derwent Abstract of JP 60-88038, May 1985.

Derwent Abstract of JP 51-114429, Oct. 1976.

Derwent Abstract of JP-A-4080242, Mar. 1992.

Derwent Abstract of JP 4076015, Mar. 1992.

Chemical Abstracts, vol. 109, No. 4, Jul. 25, 1988, Uzawa, A., "Light-stabilied polymer compositions", p. 32, Abstract No. 23846p.

Chemical Abstracts, vol. 109, No. 4, Jul. 25, 1988, Uzawa, A., "Light-stabilized polymer compositions", p. 32, Abstract No. 23848r.

*Primary Examiner*—D. R. Wilson
*Attorney, Agent, or Firm*—Frishauf, Holtz, Goodman, Langer & Chick, P.C.

[57] ABSTRACT

A curable composition comprising (A) a compound having in the molecule two or more specific blocked carboxyl groups: (B) a compound having in the molecule two or more reactive functional groups which can form chemical bonds with the blocked carboxyl groups, and (C) a catalytic component selected from the following: (a) a thermal latent acid catalyst which comprises a compound having a epoxy group, a specific compound having a sulfur atom and a specific Lewis acid; (b) a thermal latent acid catalyst which comprises a specific compound, having at least one of a nitrogen atom, an oxygen atom, a phosphorus atom or a sulfur atom, a specific compound having a halogen atom and a specific Lewis acid having at least one of an aluminum atom, a zinc atom or a tin atom; or a mixture which comprises (c) a metallic chelate compound and a specific organic silicon compound or a condensate thereof. A two component curable composition is prepared by mixing (I) a main material composition or a solution thereof comprising the compound (A) and the compound (B) or a self-crosslinkable compound (D), and (II) an acid catalyst or the solution comprising at least one of a Brönsted acid, a Lewis acid or a mixture of a metallic chelate compound and a compound having a silanol group. The curable composition provides cured products having excellent chemical properties and physical properties and having desirable weathering resistance, stain resistance and appearance.

33 Claims, No Drawings

CURABLE COMPOSITION, THERMAL LATENT ACID CATALYST, METHOD OF COATING, COATED ARTICLE, METHOD OF MOLDING AND MOLDED ARTICLE

BACKGROUND OF THE INVENTION

1. Field of the Invention

The present invention relates to a novel curable composition, a thermal latent acid catalyst, a method of coating, a coated article, a method of molding and a molded article. More particularly, it relates to a novel curable composition which is particularly excellent in storage stability and gives cured products having excellent chemical properties, physical properties, weathering resistance and stain resistance, which is able to be utilized in the field of coatings, ink, adhesive and molded plastics, a thermal latent catalyst capable to be utilized in the thermosetting composition, and a method of coating to provide a top coat having the above cured film properties and excellent appearance by using the curable composition as the top coat material and the obtained coated article. It also relates to a method of molding to provide a molded article having excellent mechanical properties, insulating characteristics, moisture resistance, corrosion resistance and cracking resistance by using the curable composition as the molding material and the obtained molded article.

2. Description of the Prior Art

It is generally known that thermosetting compositions can be prepared from compounds having carboxyl groups and compounds having reactive functional groups which can form chemical bonds with the carboxyl groups by heating, such as epoxy group, oxazoiine group, silanol group, alkoxysilane group, hydroxyl group, amino group, imino group, isocyanate group, blocked isocyanate group, cyclocarobonate group, vinyl ether group, vinyl thioether group, aminomethylol group, alkylated aminomethylol group, acetal group and ketal group. The thermosetting compositions give cured products having excellent chemical properties, physical properties and weathering resistance and are widely utilized in the field of coating composition, ink, adhesive and molded plastics.

As the thermosetting compositions described above, for example, compositions comprising combinations of carboxyl group and epoxy group have been disclosed in Laid Open Japanese Patent Application Showa 51-114429, Laid Open European Patent Application 29595 and U.S. Pat. Nos. 4,371,667, 4,650,718, 4,681,811, 4,703,101 and 4,764,430.

However, the reactivity between the carboxyl group and the reactive functional groups is generally very high so that compositions in which compounds having carboxyl groups and compounds having the reactive functional groups are mixed together have a problem that the compositions are often gelled during storage and the period suitable for pot life is short.

Compounds comprising carboxyl groups conventionally utilized for thermosetting compositions described above have problems that solubility to generally used solvents is low and that compatibility with the compounds having reactive groups with the carboxyl group is inferior because of the tendency of the carboxyl group to form strong hydrogen bonds. When thermosetting compositions comprising these kinds of compounds are utilized as top coat materials, they naturally have problems that preparation of high solid coating materials which discharge a small amount of organic solvents into air during coating is difficult and that appearance of the finished coating is inferior. Furthermore, when the thermosetting compositions are utilized as molding materials, they naturally have problems that defects such as bubbles and cavities are easily caused in the molded articles by a great deal of volatile organic compounds.

For the purpose of solving these problems, it was proposed that the carboxyl group was blocked by converting it to tertiary-butyl ester and the ester was decomposed by heating, and the free carboxyl group was regenerated by elimination of isobutene (Laid Open Japanese Patent Application Heisei 1-104646).

However, there was a problem that this method required a high temperature, such as 170°–200° C., for the heat decomposition of the tertiary-butyl ester. Thus, this method is not sufficiently satisfactory in view of economy in resources and energy considered nowadays and the defect. Furthermore, pock marks which were made by foaming and degassing of isobutene formed by the decomposition remained on the cured surface of the coating.

It is also generally known that two component compositions can be prepared by mixing isocyanate group-containing compounds and hydroxyl group-containing compounds, as a curable composition at lower temperatures which can produce cured products at a near room temperature.

The compositions, however, have a problem that preparation of high solid coating materials is difficult, because the compositions essentially comprise compounds containing a great deal of hydroxyl groups having a high ability to form hydrogen bonds.

SUMMARY OF THE INVENTION

The present invention accordingly has an object to provide thermosetting compositions which give cured products having excellent chemical properties, physical properties, weathering resistance and stain resistance and have excellent storage stability, and can be utilized as high solid one component coating materials. Another object of the invention is to provide compositions curable at lower temperatures which give cured products having excellent chemical properties, physical properties, weathering resistance and stain resistance, and can be utilized as high solid two component coating materials.

Other objects of the invention are to provide methods of coating which discharge a small amount of organic solvents into air during coating and give excellent appearance to the finished articles and to provide articles prepared by utilizing the methods of coating.

Further, other objects of the invention are to provide methods of molding to provide molded articles having excellent mechanical properties, insulating characteristics, moisture resistance, corrosion resistance and cracking resistance and to provide articles prepared by utilizing methods of molding.

Still another object of the invention is to provide thermal latent acid catalysts which give excellent storage stability and excellent curability simultaneously to the thermosetting composition.

Extensive investigations undertaken by the present inventors with the objects described above lead to a discovery that the objects can be achieved by a composition comprising: (A) a compound having in the molecule two or more carboxyl groups which are blocked by a specific vinyl ether group, vinyl thioether group or heterocyclic group having vinyl type double bond and oxygen or sulfur as the hereto atom component; (B) a compound having in the molecule two or more reactive functional groups which can form chemical bonds with the blocked carboxyl groups, and (C) a thermal latent acid catalyst which comprises (a) (i) a compound having a epoxy group, (ii) a specific compound having a sulfur atom and (iii) a specific Lewis acid; or by a composition comprising, (D) a self-crosslinkable compound having in the molecule one or more blocked carboxyl groups and one or more reactive functional groups which can form chemical bonds with the blocked carboxyl groups, (C) a thermal latent acid catalyst described above and optionally, the compound (A) and/or the compound (B). It was also discovered that the method of coating utilizing the thermosetting composition having the advantageous as the top coat material discharges a small amount of organic solvents into air and gives excellent appearance to the finished articles. The present invention was completed on the basis of the discoveries described above.

Further, it was discovered that when a thermal latent acid catalyst which comprises (b) (v) a specific compound having at least one selected from the group consisting of a nitrogen atom, an oxygen atom, a phosphorus atom and a sulfur atom, (vi) a specific compound having a halogen atom and (vii) a specific Lewis acid having at least one selected from the group consisting of an aluminium atom, a zinc atom and a tin atom was used as (C) the thermal latent acid catalyst in the thermosetting composition described above, the above objects could be achieved.

Furthermore, it was discovered that when a mixture which comprises (c) (viii) a metallic chelate compound and (ix) a specific organic silicon compound or the condensate was used as the component (C) in the thermosetting composition described above, the above objects could be achieved.

Also, it was discovered that when an acid catalyst was used as the component (C) and a volatile organic compound was not essentially used as a diluent in the thermosetting composition described above, the above objects could be achieved.

Extensive investigations undertaken by the present inventors for discovering a two component composition curable at lower temperatures having the preferred property described above also lead to a discovery that the objects can be achieved by a two component curable composition prepared by mixing (I) a main material composition or a solution thereof comprising the compound (A) and the compound (B) or the self-crosslinkable compound (D), and optionally, the compound (A) and/or the compound (B), and (II) an acid catalyst or the solution comprising at least one kind selected from the group consisting of a Brönsted acid, a Lewis acid and a mixture of a metallic chelate compound and a compound having a silanol group.

The present invention was completed on the basis of the discoveries described above.

Thus, the thermosetting composition of the invention comprise: (A) a compound having in the molecule two or more functional groups of the formula (1):

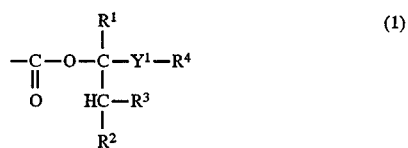 (1)

wherein $R^1$, $R^2$ and $R^3$ are each selected from the group consisting of a hydrogen atom and an organic group of 1 to 18 carbon atoms, $R^4$ is an organic group of 1 to 18 carbon atoms, $Y^1$ is selected from the group consisting of an oxygen atom and a sulfur atom and $R^3$ and $R^4$ may be bonded with each other to form a heterocyclic structure which comprises $Y^1$ as the hetero atom component; (B) a compound having in the molecule two or more reactive functional groups which can form chemical bonds with the functional groups of the compound (A) ; and (C) a catalytic component which is at least one component selected from the group consisting of:

(a) a thermal latent acid catalyst which comprises (i) a compound having an epoxy group, (ii) a compound having a sulfur atom of formula (2):

$$R^5\text{—}S\text{—}R^6 \qquad (2)$$

wherein $R^5$ and $R^6$ are each selected from the group consisting of a hydrogen atom and an organic group of 1 to 40 carbon atoms, $R^5$ and $R^6$ are the same or different each other, and $R^5$ and $R^6$ may be bonded with each other to form a cyclic structure; and (iii) a Lewis acid of formula (3):

$$(X^1)_{n1}\text{—}M^1\text{—}(R^7)_{n2} \qquad (3)$$

wherein $M^1$ is selected from the group consisting of a boron atom, an aluminium atom, a tin atom, a lead atom and a transition element, $X^1$ is one or more of a halogen atom, $R^7$ is one or more of an organic group of 1 to 40 carbon atoms, $R^7$ may form a chelate ring by coordinating to $M^1$ atom, $n1$ and $n2$ are each an integer of 0 through 6, and $n1$ plus $n2$ equals an integer of 1 through 6; and optionally, (iv) a carboxylic acid compound and/or a carboxylic acid anhydride compound;

(b) a thermal latent acid catalyst which comprises (v) a compound having at least one selected from the group consisting of a nitrogen atom, an oxygen atom, a phosphorus atom and a sulfur atom of formula (4):

$$(R^8)_{n3}\text{—}Y^2 \qquad (4)$$

wherein $Y^2$ is selected from the group consisting of a nitrogen atom, an oxygen atom, a phosphorus atom and a sulfur atom, $R^8$ is one or more of an organic group selected from the group consisting of an alkyl group, an alkenyl group, an aryl group, an alkaryl group and alkanol group, having 1 to 12 carbon atoms, two of $R^8$ may be bonded with each other to form a heterocyclic structure which comprises $Y^2$ as the hetero atom component, and $n3$ is an integer of 2 or 3; (vi) a compound having a halogen atom of formula (5):

$$R^9\text{—}X^2 \qquad (5)$$

wherein $R^9$ is an organic group selected from the group consisting of a benzyl group, a substituted benzyl group, an allyl group, a substituted allyl group, a cyeloalkyl group, a substituted cycloalkyl group, a secondary alkyl group, a substituted secondary alkyl group, a tertiary alkyl group and a substituted tertiary alkyl group, having 1 to 12 carbon atoms, and $X^2$ is a halogen atom; and (vii) a Lewis acid having at least one selected from the group consisting of an aluminium atom, a zinc atom and a tin atom of formula (6):

$$(X^3)_{n4}\text{—}M^2\text{—}(R^{10})_{n5} \qquad (6)$$

wherein $M^2$ is selected from the group consisting of an aluminium atom, a zinc atom and a tin atom, $X^3$ is one or more of a halogen atom, $R^{10}$ is one or more of an organic group of 1 to 20 carbon atoms, $R^{10}$ may form a chelate ring by coordinating to $M^2$ atom, $n4$ and $n5$ are each an integer of 0 through 6, and $n4$ plus $n5$ equals an integer of 1 through 6; and (c) a mixture comprising (viii) a metallic chelate compound and (ix) an organic silicon compound of formula (7) or a condensate thereof:

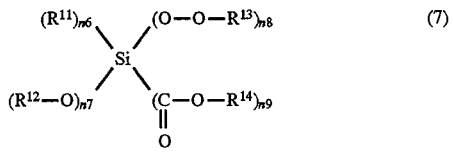

wherein $R^{11}$ is selected from the group consisting of an alkyl group, an aryl group and an alkenyl group, having 1 to 18 carbon atoms, $R^{12}$ is selected from the group consisting of a hydrogen atom, an alkyl group, an aryl group and an alkaryl group, having 1 to 18 carbon atoms, $R^{13}$ and $R^{14}$ are each selected from the group consisting of an alkyl group and an aryl group, having 1 to 18 carbon atoms, n6, n7, n8 and n9 are each an integer of 0 through 4, and a total of n6, n7, n8 and n9 equals 4.

The thermosetting composition of the invention also comprises :(D) a self-crosslinkable compound having in the molecule (α) one or more functional groups of the formula (8):

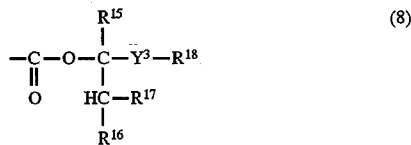

wherein $R^{15}$, $R^{16}$ and $R^{17}$ are each selected from the group consisting of a hydrogen atom and an organic group of 1 to 18 carbon atoms, $R^{18}$ is an organic group of 1 to 18 carbon atoms, $Y^3$ is selected from the group consisting of an oxygen atom and a sulfur atom and $R^{17}$ and $R^{18}$ may be bonded with each other to form a heterocyclic structure which comprises $Y^3$ as the hetero atom component; and (β) one or more reactive functional groups which can form chemical bonds with the functional groups (α);

(C) a catalytic component which is at least one component selected from the group consisting of:

(a) a thermal latent acid catalyst which comprises (i) a compound having an epoxy group, (ii) a compound having a sulfur atom of formula (2):

 (2)

wherein $R^5$ and $R^6$ are each selected from the group consisting of a hydrogen atom and an organic group of 1 to 40 carbon atoms, $R^5$ and $R^6$ are the same or different each other, and $R^5$ and $R^6$ may be bonded with each other to form a cyclic structure; and (iii) a Lewis acid of formula (3):

 (3)

wherein $M^1$ is selected from the group consisting of a boron atom, an aluminium atom, a tin atom, a lead atom and a transition element, $X^1$ is one or more of a halogen atom, $R^7$ is one or more of an organic group of 1 to 40 carbon atoms, $R^7$ may form a chelate ring by coordinating to $M^1$ atom, n1 and n2 are each an integer of 0 through 6; and n1 plus n2 equals an integer of 1 through 6; and optionally, (iv) a carboxylic acid compound and/or a carboxylic acid anhydride compound;

(b) a thermal latent acid catalyst which comprises (v) a compound having at least one selected from the group consisting of a nitrogen atom, an oxygen atom, a phosphorus atom and a sulfur atom of formula (4):

 (4)

wherein $Y^2$ is selected from the group consisting of a nitrogen atom, an oxygen atom, a phosphorus atom and a sulfur atom, $R^8$ is one or more of an organic group selected from the group consisting of an alkyl group, an alkenyl group, an aryl group, an alkaryl group and alkanol group, having 1 to 12 carbon atoms, two of $R^8$ may be bonded with each other to form a heterocyclic structure which comprises $Y^2$ as the hetero atom component, and n3 is an integer of 2 or 3; (vi) a compound having a halogen atom of formula (5):

 (5)

wherein $R^9$ is an organic group selected from the group consisting of a benzyl group, a substituted benzyl group, an allyl group, a substituted allyl group, a cycloalkyl group, a substituted cycloalkyl group, a secondary alkyl group, a substituted secondary alkyl group, a tertiary alkyl group and a substituted tertiary alkyl group, having 1 to 12 carbon atoms, and $X^2$ is a halogen atom; and (vii)a Lewis acid having at least one selected from the group consisting of an aluminium atom, a zinc atom and a tin atom of formula (6):

 (6)

wherein $M^2$ is selected from the group consisting of an aluminium atom, a zinc atom and a tin atom, $X^3$ is one or more of a halogen atom, $R^{10}$ is one or more of an organic group of 1 to 20 carbon atoms, $R^{10}$ may form a chelate ring by coordinating to $M^2$ atom, n4 and n5 are each an integer of 0 through 6, and n4 plus n5 equals an integer of 1 through 6; and (c) a mixture comprising (viii)a metallic chelate compound and (ix) an organic silicon compound of formula (7) or a condensate thereof:

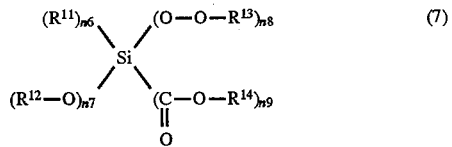

wherein $R^{11}$ is selected from the group consisting of an alkyl group, an aryl group and an alkenyl group, having 1 to 18 carbon atoms, $R^{12}$ is selected from the group consisting of a hydrogen atom, an alkyl group, an aryl group and an alkaryl group, having 1 to 18 carbon atoms, $R^{13}$ and $R^{14}$ are each selected from the group consisting of an alkyl group and an aryl group, having 1 to 18 carbon atoms, n6, n7, n8 and n9 are each an integer of 0 through 4; and the total of n6, n7, n8 and n9 equals 4;

and optionally, the compound (A) described above and/or, (B) a compound having in the molecule two or more reactive functional groups which can form chemical bonds with either one or both of the functional group of the formula (8) and the functional group of the formula (1).

Further, the thermosetting composition of the invention comprises the compound (A) and the compound (B) or the self-crosslinkable compound (D), and optionally, the compound (A) and/or the compound (B), and an acid catalyst, and a volatile organic compound was not used as a diluent.

Furthermore, the two component composition curable at lower temperatures of the invention is prepared by mixing (I) A main material composition or a solution thereof comprising the compound (A) and the compound (B) or the self-crosslinkable compound (D), and optionally, the compound (A) and/or the compound (B), and (II) an acid catalyst or the solution comprising at least one kind selected from the group consisting of a Brönsted acid, a Lewis acid and a mixture of a metallic chelate compound and a compound having a silanol group.

The method of coating of the invention is a method of coating which comprises coating a substrate with a top coat material comprising a pigment and the curable composition described above, the amount of the pigment being in the range from 0 to 300 weight parts based on 100 weight parts of the curable composition.

The method of molding of the invention is a method of molding which comprises preparing a molding material by compounding a filler and the curable composition described above, the amount of the filler being in the range from 0 to 500 weight parts based on 100 weight parts of the curable composition and optionally aging the molding material at room temperature or by heating, followed casting the molding material into a mold and curing the molding material in atmospheric pressure or in application of pressure.

The thermal latent acid catalyst of the invention comprises the thermal latent acid catalyst (a) or the thermal latent acid catalyst (b).

Other and further objects, features and advantages of the invention will appear more fully from the following description.

DETAILED DESCRIPTION OF THE INVENTION

The invention will be explained in detail in the following. The compound (A) in the thermosetting composition of the invention has in the molecule two or more, preferably from 2 to 50, functional groups of the following formula (1):

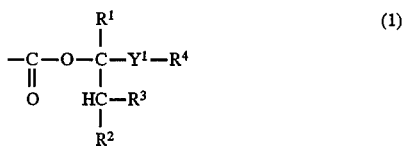

wherein $R^1$, $R^2$, $R^3$, $R^4$ an $Y^1$ have the same meaning as described above. The functional group having the formula (1) is easily prepared by reaction of carboxyl group with a vinyl ether, a vinyl thioether or a heterocyclic compound having oxygen or sulfur as the hetero atom and having a vinyl type double bond which is described by the formula (9):

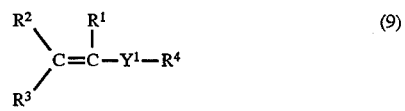

wherein $R^1$, $R^2$, $R^3$, $R^4$ an $Y^1$ have the same meaning as described above.

In the formula (1) and formula (9), $R^1$, $R^2$ and $R^2$ and $R^3$ are selected from the group consisting of a hydrogen atom and an organic group, such as an alkyl group, an aryl group and an alkaryl group of 1 to 18 carbon atoms. $R^4$ is an organic group, such as an alkyl group, an aryl group and an alkaryl group of 1 to 18 carbon atoms. The organic groups may have substituted groups in the molecule and $R^3$ and $R^4$ may, by bonding together, form a heterocyclic structure with or without substituents and having $Y^1$ as the hereto atom component.

Preferable examples of $R^1$, $R^2$ and $R^3$ are a hydrogen atom, alkyl groups, aryl groups and alkaryl groups of 1 to 10 carbon atoms. Preferable examples of $R^4$ are alkyl groups, aryl groups and alkaryl groups of 1 to 10 carbon atoms. The alkyl groups also contain cycloalkyl groups and aralkyl groups.

Examples of the compound of the formula (9) include: aliphatic vinyl ethers, such as methyl vinyl ether, ethyl vinyl ether, isopropyl vinyl ether, n-propyl vinyl ether, n-butyl vinyl ether, isobutyl vinyl ether, 2-ethylhexyl vinyl ether, cyclohexyl vinyl ether and the like; aliphatic vinyl thioethers, such as methyl vinyl thioether, ethyl vinyl thioether, isopropyl vinyl thioether, n-propyl vinyl thioether, n-butyl vinyl thioether, isobutyl vinyl thioether, 2-ethylhexyl vinyl thioether, cyclohexyl vinyl thioether and the like; cyclic vinyl ethers, such as 2,3-dihydrofuran, 3,4-dihydrofuran, 2,3-dihydro-2H-pyran, 3,4-dihydro-2-dihydro-2-ethoxy-2-H-pyran-2-on, 3,4-dihydro-2-ethoxy-2H-pyran, sodium 3,4-dihydro-2H-pyran-2-carboxylate and the like; and cyclic vinyl thioethers, such as 2,3-dihydrothiophene, 3,4-dihydrothiophene, 2,3-dihydro-2H-thiopyran, 3,4-dihydro-2H-thiopyran, 3,4-dihydro-2-methoxy-2H-thiopyran, 3,4-dihydro-4,4-dimethyl-2H-thiopyran-2-on, 3,4 -dihydro-2-ethoxy-2H-thiopyran, sodium 3,4-dihydro-2H-thiopyran-2-carboxylate and the like.

The compound (A) is prepared by the reaction of a compound having two or more, preferably 2 to 50, carboxyl groups in the molecule with the compound having the formula (9). Examples of the compound having two or more carboxyl groups in the molecule are: aliphatic polycarboxylic acids of 2 to 22 carbon atoms, such as succinic acid , adipic acid , azelaic acid , sebacic acid, decamethylenedicarboxylic acid and the like; aromatic polycarboxylic acids, such as phthalic acid, isophathalic acid, terephathalic acid, trimellitic acid, pyromellitic acid and the like; allcyclic polycarboxylic acids , such as tetrahydrophthalic acid, hexahydrophthalic acid, methylhexahydrophthalic acid and the like; resins having two or more carboxyl groups in the molecule, such as polyester resins, acrylic resins, polybutadiene resins modified with maleic acid and the like resins having two or more carboxyl groups in the molecule; and silicone oils containing carboxyl groups, such as X-22-162A®, X-22-162° C. ® (a product of Shin-Etsu Chemical Co., Ltd) and the like.

The compound having two or more carboxyl groups in the molecule is prepared by: (1) half-esterification of an acid anhydride with a polyol having two or more, preferably 2 to 50, hydroxyl groups in the molecule; (2) addition of a polyisocyanate compound having two or more, preferably 2 to 50 isocyanate groups in the molecule with a hydroxycarboxylic acid or an amino acid; (3) homopolymerization of an α,β-unsaturated monomer having a carboxyl group or copolymerization of the α, β-unsaturated monomer with other α, β-unsaturated monomers; (4) preparation of a polyester resin having carboxyl groups and the like other methods.

Examples of the polyol having two or more hydroxyl groups include: polyols such as ethylene glycol, 1,2-propylene glycol, 1,3-propylene glycol, 1,3-butanediol, 1,4-butanediol, 2,3-butanediol, 1,6-hexanediol, diethylene glycol, pentanediol, dimethylbutanediol, hydrogenated bisphenol A, glycerol, sorbitol, neopentyl glycol, 1,8-octanediol, 1,4-cyclohexanedimethanol, 2-methyl-1,3-propanediol, 1,2,6-hexanetriol, 1,2,4-butanetriol, trimethylolethane, trimethylolpropane, pentaerythritol, quinitol, mannitol, tris-hydroxyethyl isocyanurate, dipentaerythritol and the like; addition products of the polyhydric alcohols with a lactone, such as δ-butyrolactone, ε-caprolactone and the like, by ring opening of the lactone; addition products of the polyol with an isocyanate, such as tolylene diisocyanate, diphenylmethane diisocyanate, hexamethylene diisocyanate, isophorone diisocyanate and the like, in excess amount of the alcohol; addition products of the thepolyhydric alcohols with a divinyl ether, such as ethylene glycol divinyl ether, polyethylene glycol divinyl ether, butanediol divinyl ether, pentanediol divinyl ether, hexanediol divinyl ether, 1,4-cyclohexanedimethanol divinyl ether and the like, in excess amount of the alcohol; addition products of the polyol with an alkoxysilicone compound, such as KR-213®, KR-217®, KR-9218® (products of Shin-Etsu Chemical Co., Ltd.), in excess amount of the alcohol; and silicone oils containing hydroxyl groups, such as X-22-160AS®, KF-6001® (a product of Shin-Etsu Chemical Co., Ltd) and the like.

Examples of the acid anhydride which reacts with the polyol having two or more hydroxyl groups in the molecule include: acid anhydrides of polycarboxylic acids, such as succinic acid, glutaric acid, adipic acid, azelaic acid, sebacic acid, decamethylenedicarboxylic acid, phthalic acid, maleic acid, trimellitic acid, pyromellitic acid, tetrahydrophthalic acid , hexahydrophthalic acid, methylhexahydrophthalic acid and the like.

Examples of the polyisocyanate compound having two or more isocyanate groups in the molecule include: p-phenylene diisocyanate, biphenyl diisocyanate, tolylene diisocyanate, 3,3'- dimethyl- 4,4'-biphenylene diisocyanate, 1,4- tetramethylene diisocyanate, hexamethylene diisocyanate, 2,2,4- trimethylhexane-1,6- diisocyanate, methylene-bis-(phenyl isocyanate), lysine methyl ester diisocyanate, bis-(isocyanatoethyl) fumarate, isophorone diisocyanate, methylcyclohexyldiisocyanate, 2-isocyanatoethyl 2,6-diisocyanatohexanoate, biuret derivatives of these polyisocyanates, isocyanurate drivatives of these polyisocyanates and the like compounds.

Examples of the hydroxycarboxylic acid which reacts with the polyisocyanate compound include: lactic acid, citric acid, hydroxypivalic acid, 12-hydroxystearic acid, malic acid and the like. Examples of the amino acid which reacts with the polyisocyanate compound include: DL-alanine, L-glutamic acid, glycine, L-teanine, glycylglycine, δ-aminocaproic acid, L-aspartic acid, L-citrulline, L-arginine, L-leucine, L-serine and the like.

Examples of the $\alpha,\beta$-unsaturated monomer having a carboxyl group which are homopolymerized or copolymerized include: acrylic acid, methacrylic acid, iraconic acid, mesaconic acid, maleic acid, fumaric acid and the like. Examples of the other $\alpha,\beta$-unsaturated monomer which is copolymerized with the $\alpha,\beta$-unsaturated monomer having a carboxyl group include: methylacrylate, ethylacrylate, n-propylacrylate, isopropylacrylate, n-butylacrylate, isobutylacrylate, sec-butylacrylate, cyclohexylacrylate, 2-ethylhexylacrylate, stearylacrylate, methylmethacrylate , ethylmethacrylate, n-propylmethacrylate, isopropylmethacrylate, n-butylmethacrylate, isobutylmethacrylate, sec-butylmethacrylate, cyclohexylmethacrylate, 2-ethylhexylmethacrylate, stearylmethacrylate, styrene , α-methylstyrene, p-vinyltoluene, acrylonitrile and the like.

The polyester resin having carboxyl groups is easily prepared according to the conventional method of preparation of polyester resins by using an excess amount of polyacid in relation to the amount of polyol.

The reaction of the compound having two or more carboxyl group in the molecule with the compound having the formula (9) is generally performed at a temperature between room temperature and 100° C. in the presence of an acid catalyst.

The compound (A) is also prepared by homopolymerizing a product obtained by reacting the $\alpha,\beta$-unsaturated monomer having a carboxyl group with the compound of formula ( 9), or by copolymerizing the product and another $\alpha,\beta$-unsaturated monomer. Examples of the $\alpha,\beta$-unsaturated monomer having a carboxyl group which reacts with the compound of formula (9) include: acrylic acid, methacrylic acid, itaconic acid, mesaconic acid, maleic acid, fumaric acid and the like. Examples of the other $\alpha,\beta$-unsaturated monomer which is copolymerized with the $\alpha,\beta$-unsaturated monomer having carboxyl group include: methylacrylate, ethylacrylate, n-propylacrylate, isopropylacrylate, n-butylacrylate, isobutylacrylate, sec-butylacrylate, cyclohexylacrylate, 2-ethylhexylacrylate, stearylacrylate, methylmethacrylate, ethylmethacrylate, n-propylmethacrylate, isopropylmethacrylate, n-butylmethacrylate, isobutylmethacrylate, sec-butylmethacrylate, cyclohexylmethacrylate, 2-ethylhexylmethacrylate, stearylmethacrylate, styrene, α-methylstyrene, p-vinyltoluene, acrylonitrile and the like.

Either a single kind of the compound (A) or a combination of two or more kinds of the compound (A) may be utilized in the invention.

The compounds (B) utilized in the thermosetting composition of the invention are compounds having in the molecule two or more, preferably from 2 to 50, reactive functional groups which can form chemical bonds by. the reaction with the regenerated carboxyl group formed from the blocked carboxyl group (1)of the compound (A) by heating or in the presence of the acid catalyst. The kind of the reactive functional group is not particularly limited so long as it satisfies the condition described above. Preferable examples of the reactive functional group include: epoxy group, oxazoline group, silanol group, alkoxysilane group, hydroxyl group, amino group, imino group, isocyanate group, blocked isocyanate group, cyclocarbonate group, vinyl ether group, vinyl thioether group, aminomethylol group, alkylated aminomethylol group, acetal group, ketal group and the like groups. More preferable examples of the reactive functional group are epoxy group, oxazoline group, silanol group, alkoxysilane group, hydroxyl group, amino group, imino group, cyclocarbonate group, vinyl ether group, vinyl thioether group, aminomethylol group, alkylated aminomethylol group, acetal group and ketal group. The isocyanate group and the blocked isocyanate group have a high level of toxicity. Therefore, the reactive functional groups may cause a problem with respect of safety and sanitary conditions in a specific environment.

Examples of the compound (B) include: compounds having epoxy group, such as epoxy resins of bisphenol type, alicyclic epoxy resins, homopolymers and copolymers of glycidyl acrylate , 3,4-epoxycyclohexylmethyl acrylate, glycidyl methacrylate, 3,4-epoxycyclohexylmethyl methacrylate and the like compounds copolymers of glycidyl allyl ether, vinylidene fluoride and vinyl ether, polyglycidyl compounds obtained by the reaction of epichlorohydrine with polycarboxylic acids or polyols and other like compounds, silicone oils containing epoxy groups, such as KF- 101®, KF-103®, KF-105®, X-22-169AS® (a product of Shin-Etsu Chemical Co., Ltd)and the like; compounds having oxazoline group, such as oxazoline compounds having an oxazoline ring connected to an alkyl chain like 1,2-bis (2-oxazolinyl-2) ethane, 1,4-bis (2-oxazolinyl-2) butane, 1,6-bis (2-oxazolinyl-2) hexane, 1,8-bis (2-oxazolinyl-2) octane, 1,4-bis (2-oxazolinyl-2) cyclohexane and the like, oxazoline compounds having two oxazoline rings connected to an aromatic ring like benzene ring like 1,2-bis (2-oxazolinyl-2) benzene, 1,3-bis (2-oxazolinyl-2) benzene, 1,4-bis (2-oxazolinyl-2) benzene, 5,5'-dimethyl-2,2'-bis (2-oxazolinyl-2) benzene, 4,4,4',4'-tetramethyl-2,2'-bis (2-oxazolinyl-2) benzene, 1,2-bis (5-methyl-2-oxazolinyl-2)

benzene, 1,3-bis (5-methyl-2-oxazoliinyl-2) benzene, 1,4-bis (5-methyl-2-oxazolinyl-2) benzene and the like, bis (2-oxazoline) compounds such as 2,2-bis (2-oxazoline), 2,2'-bis (4-methyl-2-oxazoline), 2,2'-bis (5-methyl-2-oxazoline) and the like, polyfunctional oxazoline compounds obtained by the reaction of hydroxyalkyl-2-oxazoline with the polyisocyanate compounds described above, compounds comprising oxazoline group like polymers and copolymers of 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-ethyl-2-oxazoline and the like, commercial compounds comprising oxazoline group like CX-RS-1200®, CX-RS-3200® (products of Nippon Shokubai Co., Ltd.) and the like other compounds having oxazoline group; compounds having silanol group or alkoxysilane group, such as condensation products of a compound having the formula (10):

$$(R^{19})_m Si(OR^{20})_{4-m} \qquad (10)$$

wherein $R^{19}$ and $R^{20}$ are each selected from the group consisting of alkyl group of 1 to 18 carbon atoms and aryl group of 1 to 18 carbon atoms and m is 0, 1 or 2, homopolymers and copolymers of α,β-unsaturated silane compounds, like acryloyloxypropyltrimethoxy silane, methacryloyloxypropyltrimethoxysilane, methacryoyloxypropyltri-n-butoxysilane and the like, compounds having silanol group or alkoxysilane group such as hydrolysis products of these compounds and the like; compounds having hydroxyl group, such as aliphatic polyols, phenols, polyalkyleneoxyglycols, homopolymers and copolymers of α,β-unsaturated compounds , like 2-hydroxyethylacrylates, 2 - hydroxypropyl acrylate, 2-hydroxyethyl methacrylates, 2-hydroxypropyl methacrylate and the like, addition products of ε-caprolactone with these polyhydroxyl compounds and the like; compounds having amino group, such as aliphatic diamino compounds, aromatic diamino compounds, polyamino compounds, polyamino compounds prepared by cyanoethylation and reduction of the compounds having hydroxyl group and the like; compounds having imino group, such as aliphatic polyimino compounds, aromatic polyimino compounds and the like; compounds having isocyanate group, such as p-phenylene diisocyanate, biphenyl diisocyanate, tolylene diisocyanate, 3,3'-dimethyl-4,4'-biphenylene diisocyanate, 1,4-tetramethylene diisocyanate, hexamethylene diisocyanate, 2,2,4-trimethylhexane-1,6-diisocyanate, methylene-bis (phenyl isocyanate), lysine methyl ester diisocyanate, bis-(isocyanatoethyl) fumarate, isophorone diisocyanate , methylcyclohexyl diisocyanate, 2-isocyanatoethyl 2,6-diisocyanatehexanoate, biuret derivatives and isocyanurate derivatives of these isocyanates, addition products of these isocyanates and the compounds having hydroxyl group and the like; compounds having blocked isocyanate group, such as compound prepared by blocking the compounds having isocyanate group with phenols, lactams, active methylenes, alcohols, acid amides, imides, amines, imidazoles, ureas, imines, or oximes and the like compounds; compounds having cyclocarbonate group, such as homopolymers and copolymers of 3-acryloyloxypropylene carbonate or 3-methacryloyloxypropylene carbonate, compounds having polyfunctional cyclocarbonate groups prepared by the reaction of the compounds having epoxy group with carbon dioxide and the like; compounds having vinyl ether group or vinyl thioether group, such as polyfunctional vinyl ether compounds prepared by the reaction of the compounds having hydroxyl group with halogenareal alkyl vinyl ethers, polyvinyl ethers prepared by the reaction of hydroxyalkyl vinyl ethers with compounds having polyfunctional carboxyl group or with the compounds having isocyanate group, copolymer of vinyloxyalkyl acrylates or vinyloxyalkyl methacrylates with α,β-unsaturated compounds, vinyl thioethers corresponding to the vinyl ethers and the like; compounds having aminomethylol groups or alkylated aminomethylol groups, such as reelamine formaldehyde resins, glycolyl formaldehyde resins, urea formaldehyde resins, homopolymers and copolymers of α,β-unsaturated compounds having aminomethylol group or alkylated aminomethylol group and the like; compounds having acetal groups or ketal groups, such as polyfunctional acetal compounds prepared by the reaction of polyfunctional ketones , polyfunctional aldehydes, or the polyfunctional vinyl ether compounds described above and the like compounds with alcohols or orthoacids esters, condensation products of the polyfunctional acetal compounds with polyols, homopolymers and copolymers of addition products of the vinyloxyalkyl acrylate or vinyloxyalkyl methacrylate with alcohols or orthoacid esters; and the like other compounds.

The compound (B) utilized in the invention may be either a compound comprising a single kind of functional group, such as the compounds shown in the examples, or a compound comprising two or more kind of functional group in the molecule. Two or more kinds of the compound (B) may utilized together. However, when the functional groups of two or more kinds are reactive between each other, the storage stability of the thermosetting composition is damaged and the utilization of such combination of the functional groups is undesirable. Examples of such undesirable combination of functional groups are: combination of a functional group selected from the group of epoxy group, isocyanate group, vinyl ether group, vinyl thioether group, cyclocarbonate group and silanol group with amino group or imino group, combination of hydroxyl group with isocyanate group or vinyl ether group and the like other combinations.

The thermosetting composition of the invention may comprise the compound (A) and the compound (B) or it may comprise compound (D), a self-crosslinkable compound comprising (α) one or more, preferably from 1 to 50, functional group having the formula (8):

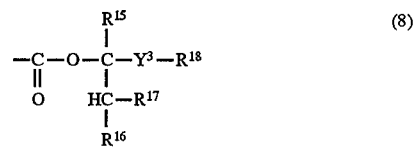

wherein $R^{15}$, $R^{16}$, $R^{17}$, $R^{18}$ and $Y^3$ have the same meaning as described above, and (β) one or more, preferably from 1 to 50, reactive functional groups which can form chemical bond with the functional group (α). The thermosetting composition of the invention may also comprise the compound (D) and the compound (A) and/or the compound (B) and, in this case, the functional group of the compound (B) forms chemical bond with the functional group of formula (1) and/or the functional group of formula (8).

Examples of the functional group (α) having the formula (8) of the compound (D) are the same functional groups as the examples of the functional group having the formula (1) in the compound (A) already described. Examples of the reactive functional group (β) are the same functional groups as the examples of the reactive functional groups of compound (B).

The compound (D) can be prepared from a compound comprising one or more, preferably from 1 to 50, carboxyl groups and one or more, preferably from 1 to 80, reactive functional groups in the molecule by using the same reaction as the reaction utilized in the preparation of the compound (A). The compound (D) can also be prepared by copolymerization of an unsaturated compound having the functional group of formula (8) with an unsaturated compound having the reactive functional group.

The compound (D) comprises the functional group of formula (8) and, furthermore, may comprise two or more kinds of the reactive functional groups in the same molecule. However, when the two or more kinds of the functional groups are reactive between each other, the storage stability of the thermosetting composition is reduced and the utilization of such combination of the functional groups is undesirable.

In the thermosetting composition of the invention, it is preferable that at least one of the compounds (A) and/or the compound (B), or at least one of the compound (D) and the compound (A) and/or the compound (B) which are utilized optionally is a polymer of an α,β-unsaturated compound or a polyester resin. It is also preferable that equivalent ratio of the functional group of the formula (1) or the formula (8) and the reactive functional group to form chemical bond with the former functional group utilized in the thermosetting composition is adjusted in the range from 0.2:1.0 to 1.0:0.2.

The functional groups having the formula (1) and the formula (8) in the compound (A) and the compound (D) of the invention regenerate free carboxyl group by heating or in the presence of the acid catalyst and form chemical linkages with the reactive functional groups in the compound (B) and the compound (D). As active ester, the functional groups of the compound (A) can also react with the functional groups in the compound (B) and the compound (D) by addition between the functional groups and this addition reactions can contribute to decreasing amount of volatile organic substances discharged into air because the addition reactions are not accompanied with elimination reactions during the crosslinking.

In the present invention, the catalytic component (C) which shows activity in the curing condition at an elevated temperature is essentially comprised in the thermosetting composition for the purpose of keeping excellent storage stability of the composition for a long period of time, promoting the curing reaction and giving excellent chemical properties, physical properties, weathering resistance and stain resistance to the cured products.

One kind of the catalytic component (C) of the invention is a thermal latent acid catalyst (a) which comprises a compound having an epoxy group (i), a compound having a sulfur atom (ii) of formula (2):

$$R^5—S—R^6 \qquad (2)$$

wherein $R^5$ and $R^6$ are each selected from the group consisting of a hydrogen atom and an organic group of 1 to 40 carbon atoms, $R^5$ and $R^6$ are the same or different each other, and $R^5$ and $R^6$ may be bonded with each other to form a cyclic structure; and a Lewis acid (iii) of formula (3):

$$(X^1)_{n1}—M^1—(R^7)_{n2} \qquad (3)$$

wherein $M^1$ is selected from the group consisting of a boron atom, an aluminium atom, a tin atom, a lead atom and a transition element, $X^1$ is one or more of a halogen atom, $R^7$ is one or more of an organic group of 1 to 40 carbon atoms, $R^7$ may form a chelate ring by coordinating to $M^1$ atom, n1 and n2 are each 0 through 6 of an integer, and n1 plus n2 equals 1 through 6 of an integer; and optionally, a carboxylic acid compound and/or a carboxylic acid anhydride compound (iv).

The thermal latent acid catalyst ( a ) manifest thermal latent property by protecting a vacant electron orbit of the Lewis acid (iii) of the formula (3) with complex action of the epoxy compound (i) and the compound having a sulfur atom (ii) each other.

The thermal latent acid catalyst (a)may be comprised by a carboxylic acid compound and/or a carboxylic acid anhydride compound (iv) other than above three compounds. The thermal latent acid catalyst (a)is improved in solubility to organic solvents by act of the carboxylic acid compound and/or the carboxylic acid anhydride compound (iv). That is, when inorganic metal salts are used as the Lewis acid (iii), the solubility of thermal latent acid catalyst (a)without the carboxylic acid compound and/or the carboxylic acid anhydride compound (iv)to organic solvents is inferior and the range of utilization of the thermal latent acid catalyst (a) is narrow. However, the thermal latent acid catalyst (a) also comprised by the carboxylic acid compound and/or the carboxylic acid anhydride compound (iv) is improved in the solubility and has excellent practicability.

The epoxy compound (i)has one or more epoxy groups in the molecule and may be a monomer or a polymer.

Examples of the epoxy compound (i) include aliphatic monoepoxide compounds derived from alkene such as propyleneoxide, butyleneoxide and the like; alicyclic monoepoxide compounds derived cycloalkene such as cyclohexeneoxide, CELOXIDE2000® (a product of Daicel Chemical Industries Co., Ltd.), CELOXIDE3000® (a product of Daicel Chemical Industries Co., Ltd.), RIKARESIN E-8® (a product of New Japan Chemical Co., Ltd.), 3,4-epoxycyclohexyl methyl acrylate, 3,4-epoxycyclohexylmethyl methyacrylate and the like; aromatic monoepoxide compounds such as styreneoxide, stilbeneoxide and the like; glycidylether compounds such as methylglycidylether, ethylglycidylether, propylglycidylether, butylglycidylether, octylglycidylether, phenylglycidylether, allylglycidylether, polyalkyleneoxide monoglycidylether and the like; glycidylester compounds such as glycidylisobutyrate, CARDURA E-10® (a product of Shell Co.), glycidylacrylate, glycidylmethacrylate and the like; epoxy plasticizers such as SANSOCIZER E-4030® (a product of New Japan Chemical Co., Ltd.), SANSOCIZER E-6000® (a product of New Japan Chemical Co., Ltd.) and the like; homopolymers of monomers having an epoxy group such as glycidylacrylate, glycidylmethacrylate, allylglycidylether, 3,4-epoxycyclohexylmethyl acrylate, 3,4-epoxycyclohexylmethyl methacrylate and the like or copolymers of the monomers having an epoxy group and one or more of the other monomers; polymers having epoxy groups such as polyglycidyl compounds obtained by reacting polycarboxylic acids with epichlorohydrin or polyols with epichlorohydrin and the like. Preferable examples are propyleneoxide, butyleneoxide, SANSOCIZER E-4030® (a product of New Japan Chemical Co., Ltd.), SANSOCIZER E-6000® (a product of New Japan Chemical Co., Ltd.), RIKARESIN E-8® (a product of New Japan Chemical Co., Ltd.), cyclohexeneoxide, CELOXIDE3000® (a product of Daicel Chemical Industries Co., Ltd.), methylglycidylether, ethylglycidylether, propylglycidylether, butylglycidylether, CARDURA E-10® (a product of Shell Co.), homopolymers or copolymers of glycidylacrylate, glycidylmethacrylate, allylglycidylether, 3,4-epoxycyclohexylmethylacrylate, 3,4-epoxycyclohexylmethyl methacrylate.

When the epoxy compound (i) is a polymer, the content of the epoxy groups is preferably in the range from 0.1 to 7 mol/kg, more preferably 0.35 to 5 mol/kg.

Either a single kind of the epoxy compound (i) or a combination of two or more kinds of the epoxy compound (i) may be utilized in the invention.

The compound having a sulfur atom (it) is a compound having a sulfur atom of formula (2).

In the formula (2), $R^5$ and $R^6$ are each selected from the group consisting of a hydrogen atom and an organic group of 1 to 40 carbon atoms. $R^5$ and $R^6$ are the same or different each other, and $R^5$ and $R^6$ may be bonded with each other to form a cyclic structure. The organic group is preferably an organic group of 1 to 18 carbon atoms, more preferably an organic group of 1 to 10 carbon atoms.

Examples of the organic groups include organic groups such as alkyl group, aryl group, alkaryl group, alkoxyl group, acyl group, acyloxyl group, alkoxycarbonyl group and the like; functional groups such as hydroxyl group, amino group, nitrile group, carboxyl group and the like; and the organic groups substituted by the functional group and the like.

Suitable examples of a compound having a sulfur atom (ii) include alkyl sulfides such as methyl sulfide, ethyl sulfide, n-propyl sulfide, n-butyl sulfide, n-hexyl sulfide, isopropyl sulfide, sec-butyl sulfide, tert-butyl sulfide, n-octyl sulfide, 2-ethylhexyl sulfide and the like; hydroxyalkyl sulfides or the derivates such as 2-(ethylthio) ethanol, 2,2'-thiodiethanol, bis (2-methoxyethyl) sulfide and the like; sulfur-containing compounds having an aromatic ring such as diphenyl sulfide, thioanisole and the like; sulfur-containing compounds having a carboxylic acid ester portion such as methyl methylthioacetate, ethyl methylthiopropionate, dimethyl thiodipropionate and the like; sulfur-containing compounds having a nitrile group such as thiodipropionitrile and the like; cyclic sulfur-containing compounds such as tetrahydrothiophene, tetrahydrothiapyran, 1,2-oxathiorane, 1,3-oxathiorane, 1,3-oxathiane, 1,4-oxathiane and the like. Preferable examples of compound having a sulfur atom (ii) are alkyl sulfides such as n-propyl sulfide, n-butyl sulfide, n-hexyl sulfide, isopropyl sulfide, sec-butyl sulfide, tert-butyl sulfide, n-octyl sulfide, 2-ethylhexyl sulfide, 2-(ethylthio) ethanol, bis (2-methoxyethyl) sulfide, methyl methylthioacetate, ethyl methylthiopropionate, tetrahydrothiophene and 1,4-oxathiane.

Either a single kind of the compound having a sulfur atom (ii) or a combination of two or more kinds of the compound having a sulfur atom (ii) may be utilized in the invention.

The Lewis acid (iii) is a Lewis acid of formula (3).

In the formula (3), $M^1$ is selected from the group consisting of a boron atom, an aluminjure atom, a tin atom, a lead atom and a transition element, $X^1$ is one or more of a halogen atom, $R^7$ is one or more of an organic group of 1 to 40 carbon atoms, $R^7$ may form a chelate ring by coordinating to $M^1$ atom, n1 and n2 are each an integer of 0 through 6, and n1 plus n2 equals an integer of 1 through 6.

The transition elements are 3 group through 12 groups in the fourth to the sixth period of the New IUPAC Periodic Table and are scandium, yttrium, lanthanides, titanium, zirconium, hafnium, vanadium, niobium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium and mercury.

Preferable examples of $M^1$ are boron, aluminium, tin, lead, titanium, zinc, iron, copper and zirconium. More preferable examples of $M^1$ are aluminium, tin, titanium, zinc and zirconium.

Examples of $X^2$ are fluorine, chlorine, bromine and iodine. Preferable examples of $X^2$ are fluorine, chlorine and bromine.

$R^7$ is preferably an organic group of 1 to 18 carbon atoms and more preferably an organic group of 1 to 10 carbon atoms.

Examples of the organic groups include alkyl group, aryl group, alkoxyl group, acyl group, acyloxyl group, alkoxycarbonyl group and preferably alkyl group, alkoxyl group, acyl group and acyloxyl group.

Examples of the Lewis acid (iii) are: metal halides, such as boron trifluoride, aluminium trichloride, titanium trichloride, titanium tetrachloride, ferrous chloride, ferric chloride, zinc chloride, zinc bromide, stannous chloride, stannic chloride, stannous bromide, stannic bromide and the like; organometallic compounds, such as trialkylboron , trialkylaluminium , dialkylaluminium halides , monoalkylalminium halides, tetraalkyltin and the like; metallic chelate compounds such as diisopropoxyethylaeetoacetate aluminium, tris (ethylacetoacetate) aluminium, isopropoxy bis (ethylacetoacetate) aluminium, monoacetylacetonato.bis (ethylacetoacetate) aluminium, tris(n-propylacetoacetate) aluminium, tris (n-butylacetoacetate ) aluminium, monoethylacetoacetate.bis (acetylacetonato) aluminium, tris (acetylacetonato) aluminium, tris (propionylacetonato) aluminium, acetylacetonato.bis (propionylacetonato) aluminium, diisopropoxy-bis (ethylacetoacetate) titanium, diisopropoxy.bis (acetylacetonato) titanium, tetrakis (n-propylaeetoacetate) zirconium, tetrakis (acetylacetonato) zirconlure, tetrakis (ethylacetoaeetate) zirconium, dichloro-.bis (acetylacetonato) tin, dibutyl-bis (acetylacetonato) tin, tris (acetylacetonato) iron, tris (acetylacetonato) chromium, tris (acetylacetonato) rhodium, bis (acetylacetonato) zinc , tris (acetylacetonato) cobalt and the like; metallic soaps such as dibutyltin dilaurate, dioctyltin ester maleate, magnesium naphthenate, calcium nalDhthenate, manganese naphthenate, iron naphthenate, cobalt naphthenate, copper naphthenate, zinc naphthenate, zirconium nalphthenate, lead naphthenate, calcium octanoate, manganese octanoate, iron octanoate, cobalt octanoate, zinc octanoate, zirconium octanoate, tin octanoate, lead octanoate, zinc laurate, magnesium stearate, aluminium stearate, calcium stearate, cobalt stearate, zinc stearate, lead stearate and the like; and other like compounds. Preferable examples of the Lewis acid are chelate compounds containing boron, aluminium, tin, titanium, zinc and zirconium, metallic soaps and halides. When the the carboxylic acid compound and/or the carboxylic acid arthydride compound (iv) are not comprised in the thermal latent acid catalyst (a), preferable examples of the Lewis acid are chelate compounds containing boron, aluminium, tin, titanium, zinc and zirconium, and metallic soaps in view of the solubility to organic solvents.

The Lewis acid (iii) may be utilized singly or as a combination of two or more kinds.

Examples of the carboxylic acid (iv) include monocarboxylic acid such as acetic acid, propionic acid, butyric acid, 2-ethylhexanoic acid, lauric acid, stearic acid, oleic acid, linoleic acid, linolenic acid, acrylic acid, methacrylic acid, monochloroacetic acid, dichloroacetic acid, trichloroacetic acid and the like; polycarboxylic acid such as succinic acid, glutaric acid, adipic acid, azeleic acid, sebacic acid, decamethylene dicarboxylic acid, phthalic acid, maleic acid, trimellitic acid, pyromellitic acid, tetrahydrophthalic acid, hexahyrophthalic acid, methyl hexahydrophthalic acid, iraconic acid, methaconic acid, fumaric acid and the like; acrylic resins containing carboxyl groups and polyester resins containing carboxyl groups. Preferable examples of the carboxylic acid are monocarboxylic acids or polycarboxylic acids having lower molecular weight. More preferable examples of the carboxylic acid are monocarboxylic acids or polycarboxylic acids having molecular weight of not more than 3000.

Examples of the carboxylic acid anhydride compounds (iv) include low molecular weight caboxylic anhydride such as acetic anhydride, propionic anhydride, butyric anhydride, isobutyric anhydride, lauric anhydride, oleic anhydride, linoleic anhydride, stearic anhydride, linolenic anhydride, succinic anhydride, phthalic anhydride, maleic anhydride, trimellitic anhydride, pyromellitic anhydride, isovaleric anhydride, n-caprylic anhydride, n-capylic anhydride, n-caproic anhydride, citraconic anhydride, gultaric anhydride, itaconic anhydride, crorendic anhydride, palmitic anhydride, myristic anhydride, tetrapropenyl succinic anhydride, tetrahrydophthalic anhydride, hexahydrophthalic anhydride, 4-methylhexahydrophthalic anhydride, endomethylenetetrahydrophthalic anhydride, methylendomethylenetetrahydrophthalic anhydride, tetrachlorophthalic anhydride, 3-nitrophthalic anhydride, trichloroacetic anhydride, dichloroacetic anhydride, monochloroacetic anhydride, trifluoroacetic anhydride, heptafluorobutyric anhydride and the like and polymers of carboxylic acid anhydride compounds such as acrylic resins containing acid anhydride groups and polyester resins containing acid anhydride groups. Preferable examples of the carboxylic acid anhydride are acetic anhydride, propionic anhydride, butyic anhydride, isobutyric anhydride, lauric anhydride, oleic anhydride, stearic anhydride, n-caproic anhydride, n-caprylic anhydride, n-capric anhydrfde, palmitic anhydride, myristic anhydride, trichloroacetic anhydride, dichloroacetic anhydride, monochloroacetic anhydride, trifluoroacetic anhydride and heptafluorobutyric anhydride.

The solubility of thermal latent acid catalyst (a) to organic solvents, which is effect of addition of the carboxylic acid compound and/or the carboxyic acid anhydride compound (iv), is excellent when the Lewis acid is a metal halide.

The the carboxylic acid compound and/or the carboxylic acid anhydride compound (iv) may be utilized singly or as a combination of two or more kinds.

The amount of the components in the thermal latent acid catalyst (a) utilized is not particularly limited. The equivalent ratio of the epoxy group of the epoxy compound (i) and the sulfur atom of the compound having a sulfur atom (ii) to $M^1$ atom of the Lewis acid (iii) are each preferably in the range from 0.2 to 10, more preferably 0.5 to 5. When the equivalent ratio is less than 0.2, the activity of the Lewis acid may be sufficiently not inhibited in storage. When the equivalent ratio is more than 10, the activity of the Lewis acid may be inferior by heating.

The equivalent ratio of the carboxyl group of the carboxylic acid compound and/or the acid anhydride group of the carboxylic acid anhydride compound to $M^1$ atom of the Lewis acid (iii) is not particularly limited, but is preferably in the range from 0.05 to 10, more preferably 0.1 to 5. When the equivalent ratio is less than 0.05, the solubility to organic solvents acid may be not sufficient. When the equivalent ratio is more than 10, the activity of the Lewis acid may be sufficiently not inhibited in storage.

The thermal latent acid catalyst (a) is easily prepared by mixing the epoxy compound (i), the compound having a sulfur atom (ii) and the Lewis acid (iii) in the presence of a solvent or without a solvent in optional order. It is preferable that after the mixture of the epoxy compound (i) and the compound having a sulfur atom (ii) is prepared, the thermal latent acid catalyst (a) is prepared by mixing the Lewis acid (iii) into the mixture. Also, It is preferable that after the mixture of the compound having a sulfur atom (ii) and the Lewis acid (iii) is prepared, the thermal latent acid catalyst (a) is prepared by mixing the epoxy compound (i) into the mixture. The mixing order of the carboxylic acid compound and/or the carboxylic acid anhydride compound (iv) is optional. More preferable mixing order is at first mixing the epoxy compound (i), the compound having a sulfur atom (it) and the Lewis acid (iii), and then, mixing the carboxylic acid compound and/or the carboxylic acid anhydride compound (iv) into the mixture. In the preparation of the thermal latent acid catalyst (a), it is preferable to heat at temperature from room temperature to 100° C. for 10 minutes through 10 hours, after mixing two components or three components, or optionally four components or five components. Because it may accelerate the thermal latent reaction.

Solvents utilized in the preparation of the thermal latent acid catalyst (a) include aliphatic hydrocarbon solvents, aromatic hydrocarbon solvents, ether solvents, alcohol solvents, ester solvents, ketone solvents and the mixture. The amount of the solvent is selected according to needs, but generally preferable to control the thermal latent acid catalyst (a) in the range from 1 to 90% by weight.

The action for the thermal latent reaction of the epoxy compound (i) and the compound having a sulfur atom (ii) to the Lewis acid (iii) is complex, but it is, for example, presumed the mechanism that the thermal latent acid catalyst (a) manifest thermal latent property by protecting a vacant electron orbit of the Lewis acid (iii) with the both effects of a lone pair of an oxygen atom of the epoxy group and a lone pair of a sulfur atom of the compound having a sulfur atom (ii).

Further, it is, for example, presumed the mechanism that the thermal latent acid catalyst (a) manifest excellent solubility by changing a ligand of the thermal latent acid catalyst (a) or some of it with the reaction of the carboxylic acid compound and/or the carboxylic acid anhydride compound (iv).

Furthermore, it is presumed that the thermal latent acid catalyst (a) is decomposed by heating and regenerated to the Lewis acid. By the mechanism, the thermal latent acid catalyst shows the activity of the acid catalyst only by heating.

In the present invention, the thermal latent acid catalyst (a) which shows activity in the curing condition at an elevated temperature is used in the thermosetting composition for the purpose of maintaining excellent storage stability of the composition for a long period of time, promoting the curing reaction when the composition is cured in a short time at a rather low temperature and giving excellent chemical properties and physical properties to the cured products. It is preferable that the thermal latent acid catalyst (a) is a compound which exhibit the activity at the temperatures above 50° C. If the thermal latent acid catalyst shows the catalytic activity under 50° C., the prepared thermosetting composition has undesirable properties, such as increase of viscosity and gelation during storage.

The catalytic activity temperature is easily controlled by changing the kind or the quantity of each components of the epoxy compound (i), the compound having a sulfur atom (ii) and the Lewis acid (iii), and optionally the carboxylic acid compound and/or the carboxylic acid anhydride compound (iv).

The thermal latent acid catalyst (a) may be utilized singly or as a combination of two or more kinds.

The amount of the thermal latent acid catalyst (a) in terms of the amount of the Lewis acid (iii) is selected in the range from 0.01 to 20 weight parts, preferably 0.02 to 10 weight part based on 100 weight parts of the total solid component which is the sum of the compound (A) and the coralSound (B) or the sum of the compound (D) and the optionally utilized compound (A) and/or the compound (B).

When the amount of the Lewis acid (iii)in the thermosetting composition is less than 0.01 weight parts, the promoting effect of the catalytic activity may be not sufficiently manifested. When the amount is more than 20 weight parts, the promoting effect is lower than the value expected and the decrease in properties of the cured products may be caused by the presence of the catalyst in great quantities as residue in the cured product.

The thermal latent acid catalyst (a) may be utilized in all of the thermosetting compositions promoting curing reaction by the Lewis acid besides the thermosetting composition of the present invention.

The curing reactions activated by the Lewis acid include condensation reaction, condensation polymerization reaction, addition reaction, addition polymerization reaction and the like. Examples of the curing reactions are esterification reaction, amidation reaction, imidation reaction, transesterification reaction, transetherification reaction, transacetalification reaction and the like. More specifically, examples of the curing reactions are condensation reaction or condensation polymerization reaction of compounds having a silanol group or an alkoxysilane group; addition reaction or addition polymerization reaction of compounds having epoxy group, isocyanate group, vinylether group or vinylthioether group with compounds having an activated hydrogen, which react the compounds described above to cause addition reaction or addition polymerization reaction, such as hydroxyl group, carboxyl group, amino group, imino group, silanol group and the like; addition reaction of compounds having epoxy group with compounds having 1-alkoxyester group; cationic polymerization of compounds having epoxy group, vinylether group, cyclic ester group, spiroorthoester group, spiroorthocarbonate group, oxazoline group, cyclic acetal group, cyclic ketal group or bicycloorthoester group.

The curing reactions may be utilized singly or as a combination of two or more kinds.

Another kind of the catalytic component (C) of the invention is a thermal latent acid catalyst (b) which comprises a compound having at least one selected from the group consisting of a nitrogen atom, an oxygen atom, a phosphorus atom and a sulfur atom (v) of formula (4):

$(R^8)_{n3}—Y^2$                                         (4)

wherein $Y^2$ is selected from the group consisting of a nitrogen atom, an oxygen atom, a phosphorus atom and a sulfur atom, $R^8$ is one or more of an organic group selected from the group consisting of an alkyl group, an alkenyl group, an aryl group, an alkaryl group and alkanol group, having 1 to 12 carbon atoms, two of $R^8$ may be bonded with each other to form a heterocyclic structure which comprises $Y^2$ as the hetero atom component, and n3 is an integer of 2 or 3; a compound having a halogen atom (vi) of formula (5):

$R^9—X^2$                                               (5)

wherein $R^9$ is an organic group selected from the group consisting of a benzyl group, a substituted benzyl group, an allyl group, a substituted allyl group, a cycloalkyl group, a substituted cycloalkyl group, a secondary alkyl group, a substituted secondary alkyl group, a tertiary alkyl group and a substituted tertiary alkyl group, having 1 to 12 carbon atoms, and $X^2$ is a halogen atom; and a Lewis acid having at least one selected from the group consisting of an aluminium atom, a zinc atom and a tin atom (vii) of formula (6):

$(X^3)_{n4}—M^2—(R^{10})_{n5}$                   (6)

wherein $M^2$ is selected from the group consisting of an aluminium atom, a zinc atom and a tin atom, $X^3$ is one or more of a halogen atom, $R^{10}$ is one or more of an organic group of 1 to 20 carbon atoms, $R^{10}$ may form a chelate ring by coordinating to $M^2$ atom, n4 and n5 are each an integer of 0 through 6, and n4 plus n5 equals an integer of 1 through 6.

The compound (v) is represented by formula (4). In the formula (4), preferable examples of $R^8$ are alkyl groups, alkenyl groups, aryl groups, alkaryl groups and alkanol groups, having 1 to 10 of carbon atoms. More preferable examples of $R^8$ are alkyl groups, aryl groups and alkaryl groups, having 1 to 10 of carbon atoms. The organic groups may have suitable substituents such as halogen atom, lower alkyl group, lower alkoxyl group, aryloxyl group, lower haloalkyl group, acyloxyl group, aeylamino group, hydroxyl group, nitoro group and the like.

The compound (v) includes tertiary amines such as trimethylamine, triethylamine, tri-n-butylamine, triallylamine, dimethyl-n-octylamine, dimethylbenzylamine, triethanolamine, pyridine, 2-picoline, 3-picoline, 4-picoline, N-methylpyridine, N-methylpyrolidine, N-methylimidazole, N-methylmorpholine and the like; ethers such as diethylether, di-n-butylether, anisole, diphenylether, benzylethylether, dibenzylether, 1,4-dioxane, 1,3,5-trioxane, furan, tetrahydrofuran, tetrahydropyran and the like; phosphines such as tributylphosphine, tricyclohexylphosphine, triphenylphosphine and the like; sulfides such as diethylsulfide, dipropylsulfide, di-n-butylsulfide, di-sec-butylsulfide, di-tert-butylsulfide, diisobutylsulfide, di-n-hexylsulfide, di-n-octylsulfide, methyl-n-octylsulfide, 2,2'-thiodiethanol, bis (2-methoxyethyl) sulfide, 2-(ethylthio) ethanol, methyl methylthioacetate, ethyl methylthiopropionate, dimethyl thiodipropionate, thiodipropionitrile, thioanisole, diphenylsulfide, 1,4-thioxane, thiophene, tetrahydrothiophene, tetrahydrothiopyran and the like.

The compounds (v) may be utilized singly or as a combination of two or more kinds.

The compound (vi) is represented by formula (5). In the formula (5), $R^9$ is an organic group selected from the group consisting of a benzyl group, an allyl group, a cycloalkyl group, a secondary alkyl group, a tertiary alkyl group and the groups substituted by one or more of suitable groups, having 1 to 12 carbon atoms, and $X^2$ is a halogen atom such as fluorine, chlorine, bromine and iodine.

Preferable examples of $R^9$ are benzyl groups, substituted benzyl groups, allyl groups, substituted allyl groups, cycloalkyl groups, substituted cycloalkyl groups, secondary alkyl groups, substituted secondary alkyl groups, tertiary alkyl groups and substituted tertiary alkyl groups, having 1 to 10 carbon atoms. More preferable examples of $R^9$ are benzyl groups, substituted benzyl groups, allyl groups, substituted allyl groups, cycloalkyl groups, substituted cycloalkyl groups, having 1 to 10 carbon atoms.

The substituents are not limited, but the examples includehalogen atom, lower alkyl group, lower alkoxyl group, aryloxyl group, lower haloalkyl group, acyloxyl group, acylamino group, hydroxyl group, nitoro group and the like.

Examples of the compound (vi) include chlorine-containing compounds such as benzylchloride, 4-(tert-butyl) benzylchloride, 3-methoxybenzylchloride, 4-methoxybenzylchloride, 2-methylbenzylchloride, 3-methylbenzylchloride, 4-methylbenzylchloride, 3-vinylbenzylchloride, 4-vinylbenzylchloride, 2-chlorobenzylchloride, 3-chlorobenzylchloride, 4-chlorobenzylchloride, 2-nitrobenzylchloride, 3-nitrobenzylchloride, 4-nitrobenzylchloride, 2,3-dichlorobenzylchloride, 2,4-dichlorobenzylchloride, 2,6-dichlorobenzylchloride, 3,4-dichlorobenzylchloride, $\alpha,\alpha'$-dichloroparaxylene, allylchloride, 1-chloro-2-butene, 1-chloro-3-methyl-2-butene, cyclobutylchloride, cyclopentylchloride, cyclohexylchloride, 2-chlorocyclohexanol, 2-chlorocyclohexanone, isopropylchloride, sec-butylchloride, tert-butylchloride and the like; bromine-containing compounds such as benzylbromide, 2-bromobenzylbromide, 3-bromobenzylbromide, 4-bromobenzylbromide, 2-nitrobenzylbromide, 3-nitrobenzylbromide, 4-nitrobenzylbromide, allylbromide, 1-bromo-2-butene, 1-bromo-3-methyl-2-butene, cyclobutylbromide, cyclopentylbromide, cyclohexylbromide, isopropylbromide, sec-butylbromide, tert-butylbromide and the like; iodine-containing compounds such as allyliodide, cyclohexyliodide, isopropyliodide, sec-butyliodide, tert-butyliodide and the like; and fluorine-containing compounds corresponding to the above compounds.

The compounds (vi) may be utilized singly or as a combination of two or more kinds.

The Lewis acid (vii) has an aluminium atom, a zinc atom or a tin atom and is a compound represented by formula (6).

$R^{10}$ are preferably organic groups having 1 to 18 carbon atoms, more preferably organic groups having 1 to 10 carbon atoms. Examples of the organic groups are alkyl groups, aryl groups, alkaryl groups, acyl groups, alkoxycarbonyl groups, alkoxyl groups, acyloxyl groups and the like. Preferable examples of the organic groups are alkyl groups, acyl groups, alkoxyl groups and acyloxyl groups. The halogen atoms of $X^3$ are fluorine, chlorine, bromine or iodine.

The substituents are mot limited, but the examples are halogen atom, lower alkyl group, lower alkoxyi group, aryloxyl group, lower haloalkyl group, acyloxyl group, acylamino group, hydroxyl group, nitoro group and the like.

The compound (vii) includes aluminium-containing compounds such as aluminium trifluoride, aluminium trichloride, aluminium tribromide, aluminium triiodide, trialkyl aluminium, dialkylhalogenated aluminium, monoalkylhalogenated aluminium, diisopropoxyethylacetoacetate aluminium, isopropoxybis (ethylacetoacetate) aluminium, tris(ethylacetoacetate) aluminium, acetylacetonato bis (ethylacetoacetate) aluminium, ethylacetoacetate bis (acetylacetonato) aluminium, tris (acetylacetonato) aluminium, tris (n-propylacetoacetate) aluminium, tris (n-butylacetoacetate) aluminium, tris (propionylacetonato) aluminium, acetylacetonato bis (propionylacetonato) aluminium, aluminium stearate and the like; zinc-containing compounds such as zinc fluoride, zinc chloride, zinc bromide, zinc iodide, bis (acetylacetonato) zinc, zinc naphthenate, zinc octanoate, zinc laurate, zinc stearate and the like; tin-containing compounds such as stannous fluoride, stannous chloride, stannic chloride, stannous bromide, stannic bromide, stannous iodide, tetraalkyl tin, dichloro bis (acetylacetonato) tin, dibutyl bis (acetylacetonato) tin, dibutyltin dilaurate, dioctyltin ester maleate, tin octanoate and the like.

The compounds (vii) may be utilized singly or as a combination of two or more kinds.

The thermal latent acid catalyst (b) comprises the compound (v), the compound having a halogen atom (vi) and Lewis acid (vii), and is presumed to comprise a compound of the formula (11) or a mixture of the compounds.

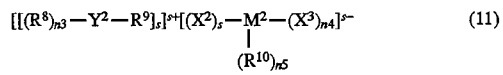

wherein $M^2$, $X^2$, $X^3$, $Y^2$, $R^8$, $R^9$, $R^{10}$, n3, n4 and n5 are defined before and s is an integer of 1 through 3.

That is, the thermal latent acid catalyst (b) is onium compound having an aluminium atom, a zinc atom or a tin atom in the anion. The compound does not manifest the catalytic activity at near room temperature, but is decomposed by heating and regenerates the Lewis acid having an aluminium atom, a zinc atom or a tin atom which manifests the catalytic activity.

In the decomposition, it is characterized that the thermal latent acid catalyst (b) forms carbocations such as a benzyl cation, an allyl cation, a secondary carbocation, a tertiary carbocation and the like, which are comparatively stable. This is needed to decrease the decomposition temperature of the thermal latent acid catalyst (b) and to manifest the catalytic activity at lower temperatures. This means that the compound having a halogen atom (vi) is particularly limited as described above.

The amount of the components in the thermal latent acid catalyst (b) utilized is not particularly limited. The equivalent ratio of $Y^2$ atom of the compound (v) and $X^2$ atom of the compound (vi) to $M^2$ atom of the Lewis acid having an aluminium atom, a zinc atom or a tin atom (vii) are each preferably in the range from 0.5 to 10, more preferably 1 to 5.

The thermal latent acid catalyst (b) is easily prepared by mixing the compound (v), the compound (vi) and the Lewis acid (vii) in optional order. The mixing order may be simultaneous mixing of the components, or a mixing order that after the mixture of the compound (v) and the compound (vi) is prepared to form the onium compound of formula (12) having a halogen anion, the thermal latent acid catalyst (b) is prepared by mixing the Lewis acid (vii) into the mixture.

wherein $X^2$, $Y^2$, $R^8$ $R^9$ and n3 are defined before.

In the preparation of the thermal latent acid catalyst (b), it is preferable to heat at temperature from room temperature to 100° C. for 10 minutes through 10 hours, after mixing two components or three components. Because it may accelerate the thermal latent reaction.

The preparation of the thermal latent acid catalyst (b) may be conducted in the presence of a solvent or without a solvent.

Solvents utilized in the preparation of the thermal latent acid catalyst (b) include aliphatic hydrocarbon solvents, aromatic hydrocarbon solvents, ether solvents, alcohol solvents, ester solvents, ketone solvents and mixtures thereof. The amount of the solvent is selected according to need, but it is generally preferable to control the thermal latent acid catalyst (b) in the range from 1 to 80% by weight.

In the present invention, the thermal latent acid catalyst (b) which shows activity in the curing condition at an elevated temperature is used in the thermosetting composition for the purpose of keeping excellent storage stability of the composition for a long period of time, promoting the curing reaction when the composition is cured in a short time at a rather low temperature and giving excellent chemical properties and physical properties to the cured products. It is preferable that the thermal latent acid catalyst (b) is a compound which exhibits the activity at temperatures above 50° C. If the thermal latent acid catalyst shows the catalytic activity under 50° C., the prepared thermosetting composition has undesirable properties, such as an increase of viscosity and gelation during storage.

The catalytic activity temperature is easily controlled by changing the kind or the quantity of each components of the compound (v), the compound (vi) and the Lewis acid (vii).

The thermal latent acid catalyst (b) may be utilized singly or as a combination of two or more kinds.

Amount of the thermal latent acid catalyst (b) in terms of the amount of the Lewis acid (vii) is selected in the range from 0.01 to 20 weight parts, preferably 0.02 to 10 weight part based on 100 weight parts of the total solid component which is the sum of the compound (A) and the compound (B) or the sum of the compound (D) and the optionally utilized compound (A) and/or the compound (B).

When the amount of the Lewis acid (vii) in the thermosetting composition is less than 0.01 weight part, the promoting effect of the catalytic activity may be not sufficiently manifested. When the amount is more than 20 weight part, the promoting effect is lower than the value expected and the decrease in properties of the cured product may be caused by the presence of the catalyst in great quantities as residue in the cured product.

The thermal latent acid catalyst (b) may be utilized in the thermosetting composition promoting curing reaction by the Lewis acid besides the thermosetting composition of the present invention.

The curing reactions activated by the Lewis acid include condensation reaction, condensation polymerization reaction, addition reaction, addition polymerization reaction and the like. Examples of the curing reactions are esterification reaction, amidation reaction, imidation reaction, transesterification reaction, transetherification reaction, transacetalification reaction and the like. More specifically, examples of the curing reactions are condensation reaction or condensation polymerization reaction of compounds having a silanol group or an alkoxysilane group; addition reaction or addition polymerization reaction of compounds having epoxy group, isocyanate group, vinylether group or vinylthioether group with the compounds having an activated hydrogen, which react the compounds described above to cause addition reaction or addition polymerization reaction, such as hydroxyl group, carboxyl group, amino group, imino group, silanol group and the like; addition reaction of compounds having epoxy group with compounds having 1-alkoxyester group; cationic polymerization of compounds having epoxy group, vinylether group, cyclic ester group, spiroorthoester group, spiroorthocarbonate group, oxazoline group, cyclic acetal group, cyclic ketal group or bicycloorthoester group.

The curing reactions may be utilized singly or as a combination of two or more kinds.

The other kind of the catalytic component (C) of the invention is a mixture (c) comprising a metallic chelate compound (viii) and an organic silicon compound of formula (7) or a condensate thereof (ix):
wherein $R^{11}$ is selected from the group consisting of an alkyl group, an aryl group and an alkenyl group, having 1 to 18 carbon atoms, $R^{12}$ is selected from the group consisting of a hydrogen atom; an alkyl group, an aryl group and an alkaryl group, having 1 to 18 carbon atoms, $R^{13}$ and $R^{14}$ are each selected from the group consisting of an alkyl group and an aryl group, having 1 to 18 carbon atoms, n6, n7, n8 and n9 are each an integer of 0 through 4, and the total of n6, n7, n8 and n9 equals 4.

Examples of the metallic chelate compounds include aluminium chelate compounds such as diisopropoxyethylacetoacetatealuminium, tris (ethylacetoacetate) aluminium, isopropoxy.bis (ethylacetoacetate) aluminium, monoacetylacetonato.bis (ethylacetoacetate) aluminium, tris(n-propylacetoacetate) aluminium, tris (n-butylacetoacetate) aluminium, monoethylacetoacetate.bis (acetylacetonato) aluminium, tris (acetylacetonato) aluminium, tris (propionylacetonato) aluminium, acetylacetonato.bis (propionylacetonato) aluminium and the like; titanium chelate compounds such as diisopropoxy.bis (ethylacetoacetate) titanium, diisopropoxy-.bis (acetylacetonato) titanium and the like; zirconium chelate compounds such as tetrakis (n-propylacetoacetate) zirconium, tetrakis (acetylacetonato) zirconium, tetrakis (ethylacetoacetate) zirconium and the like; dichloro.bis (acetylacetonato) tin, dibutyl.bis (acetylacetonato) tin, tris (acetylacetonato) iron, tris (acetylacetonato) chromium, tris (acetylacetonato) rhodium, bis (acetylacetonato) zinc, tris (acetylacetonato) cobalt and the like.

Preferable examples of the metallic chelate compounds are aluminium chelate compounds such as diisopropoxyethylacetoacetatealuminium, tris (ethylacetoacetate) aluminium, isopropoxy.bis (ethylacetoacetate) aluminium, monoacetylacetonato.bis (ethylacetoacetate) aluminium, tris (n-propylacetoacetate) aluininium, tris (n-butylacetoacetate) aluminium, monoethylacetoacetate.bis (acetylacetonato) aluminium, tris (acetylacetonato) aluminium, tris (propionylacetonato) aluminium, acetylacetonato.bis (propionylacetonato) aluminium and the like; zirconium chelate compounds such as tetrakis (n-propylacetoacetate) zirconium, tetrakis (acetylacetonato) zirconium , tetrakiss (ethylacetoacetate) zirconium and the like.

The metallic chelate compounds (viii) may be utilized singly or as a combination of two or more kinds.

Another component in the mixture (c) is an organic silicon compound (ix) of formula (7) or a condensate thereof (ix).

In the formula (7), preferable $R^{11}$ is alkyl groups, aryl groups or alkenyl groups, having 1 to 10 carbon atoms and preferable $R^{12}$ is a hydrogen atom, alkyl groups, aryl groups or alkaryl groups, having 1 to 10 carbon atoms and preferable $R^{13}$ and $R^{14}$ is alkyl groups or aryl groups, having 1 to 10 carbon atoms.

Examples of the organic silicon compounds or the condensates (ix) include triphenylsilanol, diphenylvinylsilanol, diphenylmethylsilanol, dimethylphenylsilanol, diphenylsilanediol, dimethylsilanediol, diphenyldimethoxysilane, diphenyldiethoxysilane, diphenyldiisopropoxysilane, triphenylmetoxysilane, triphenylethoxysilane, diphenylvinylethoxysilane, diphenyldimethoxycarbonylsilane, triphenylsilyl-2-nitrobenzylether and the like, and one or more of the condensates of them; silylperoxides such as trimethylsilyl-tert-butylperoxide, triphenylsilyl-tert-butylperoxide, tris (4-chlorophenyl) silyl-tert-butylperoxide, naphthyldiphenylsilyl-tert-butylperoxide, tri-2-naphthylsilyl-tert-butylperoxide) triphenyisilylcumenylperoxide, di (2-naphthyl) di (tert-butylperoxide) silane and the like; homopolymers or copolymers of α, β-unsaturated silane compounds such as acryloyloxypropyltrimethoxysilane, methacryloyloxypropyltrimethoxysilane, methacryloyloxypropyltri-n-butoxysilane and the like; and compounds containing a silanol group or alkoxysilane group such as hydrolyzates of the above compounds and the like.

The organic silicon compounds or the condensates (ix) may be utilized singly or as a combination of two or more kinds.

The amount of the components in the mixture (c) utilized is not particularly limited. The equivalent ratio of silicon atom of the organic silicon compound or the condensate (ix) to the metallic atom of the metallic thelate compounds (viii) is preferably in the range from 0.2 to 10, more preferably 0.5 to 5.

The preparation of the catalytic mixture (c) may be conducted in the presence of a solvent or without a solvent.

Solvents utilized in the preparation of the mixture (c) include aliphatic hydrocarbon solvents, aromatic hydrocarbon solvents, ether solvents, alcohol solvents, ester solvents, ketone solvents and the mixture. The amount of the solvent is selected according to needs, but generally preferable to control the metallic chelate compound (viii) in the range from 0.1 to 80 % by weight.

In the curing condition at an elevated temperature, it is presumed that the metallic chelate compounds (viii) and the organic silicon compound or the condensate (ix) forms a complex compound and the complex compound manifests the catalytic activity. The complex compound manifests excellent acid catalytic activity compared with using the metallic chelate compound alone.

The mixture (c) is used in the thermosetting composition for the purpose of keeping excellent storage stability of the composition for a long period of time, promoting the curing reaction when the composition is cured in a short time at a rather low temperature and giving excellent chemical properties and physical properties to the cured products. It is preferable that the mixture (c) exhibits the activity at the temperatures above 50° C. If the mixture shows the catalytic activity under 50° C., the prepared thermosetting composition has undesirable properties, such as an increase of viscosity and gelation during storage.

The catalytic activity temperature is easily controlled by changing the kind or the quantity of each components of the metallic chelate compound (viii) and the organic silicon compound or the condensate (ix).

The mixture (c) may be utilized singly or as a combination of two or more kinds.

The amount of the mixture (c) in terms of the amount of the metallic chelate compound (viii) is selected in the range from 0.01 to 20 weight parts, preferably 0.02 to 10 weight part based on 100 weight parts of the total solid component which is the sum of the compound (A) and the compound (B) or the sum of the compound (D) and the optionally utilized compound (A) and/or the compound (B).

In the present thermosetting composition, the mixing order of the metallic chelate compound (viii) and the organic silicon compound or the condensate (ix)into the thermosetting composition is not limited. The mixing order may be a mixing order that after the mixture of the metallic chelate compound (viii) and the organic silicon compound or the condensate (ix) are mixed to prepare the mixture (c), the mixture (c) is mixed into the compound (A) and the compound (B) or the compound (D) and optionally, the compound (A) and/or the compound (B), or that the metallic chelate compound (viii) and the organic silicon compound or the condensate (ix) are respectively mixed into the compound (A) and the compound (B) or the compound (D) and optionally, the compound (A) and/or the compound (B) to prepare the mixture in them.

The time and temperature required to cure the thermosetting composition comprising the catalytic component (a), (b) and (c) of the invention is different depending on the temperature at which free carboxyl group is regenerated from the blocked functional group of the formula (1)or the formula (8), kind of the reactive functional group and the kind of the catalytic component. In general, curing is completed by heating at the temperatures in the range from 50° to 300° C. for the time in the range from 5 seconds to 20 hours. The thermosetting composition of the invention has an advantageous property that it can be cured at a temperature below 160° C. and higher temperature are not necessarily required.

Further, another thermosetting composition of the invention is a thermosetting composition that an acid catalyst is used as the catalytic component (C) in the thermosetting composition described above and essentially does not comprise an organic solvent as a diluent.

The acid catalyst utilized is indispensable in the thermosetting composition to promote the curing reaction by heating and to give excellent chemical property and physical property to cured articles. The acid catalyst includes Brönsted acids, Lewis acids and the thermal latent components derived from them.

Brönsted acids are materials which dissociate proton and have an acidic property.

Examples of the Brönsted acid are sulfuric acid, monoesters of sulfuric acid, sulfonic acids, phosphoric acid, monoesters and diesters of phosphoric acid, esters of polyphosphoric acid, monoesters and diesters of boric acid, carboxylic acids, halogenocarboxylic acids and the like and, preferably, alkylbenzenesulfonic acids having 1 to 50 carbon atoms, such as p-toluenesulfonic acid, dodecylbenzenesulfonic acid and the like, mono- or dihalogenocarboxylic acids having 1 to 50 carbon atoms, such as chloroacetic acid, dichloroacetic acid and the like, alkyl monoesters and diesters of phosphoric acid having 1 to 50 carbon atoms, such as monomethyl phosphate, dimethy phosphate and the like, and the like compounds.

Examples of the Lewis acid include the same as described in the Lewis acid (iii).

The thermal latent components derived from Brönsted acids and Lewis acids are described above.

Preferable examples of the thermal latent components are boron compounds such as triethyl borate, boron trifluoride and the like; aluminium compounds such as trialkylaluminium, dialkylhalogenatedaluminium, monoalkylhalogenatedaluminium, halogenatedaluminium, aluminium stearate and the like; zinc compounds such as zinc 2-ethylhexanoate, zinc stearate, zinc chloride, zinc bromide, tin compounds such as dibutyltin dilaurate, dibutyltin diacetate, dibutyltin acetylacetonate, dioctyltin diacetate, tin 2-ethylhexanoate, tin stearate, stannous chloride, stannic chloride, stannous bromide, stannic bromide and the like; titanium compounds such as titanium acetylacetonate, titanocene dichloride, titanium (IV) chloride and the like; zirconium compounds such as ziruconium acetylacetonate, zirconocene dichloride, zirconium (IV) chloride and the like; benzyl cation type Lewis acids and the like; and thermal latent compounds of the above compounds and the like.

The acid catalyst may be utilized singly or as a combination of two or more kinds.

Amount of the acid catalyst is selected in the range from 0.01 to 20 weight parts, preferably 0.02 to 10 weight part based on 100 weight parts of the total solid component which is the sum of the compound (A) and the compound (B) or the sum of the compound (D) and the optionally utilized compound (A) and/or the compound (B).

When the amount of the acid catalyst in the thermosetting composition is less than 0.01 weight part, the promoting effect of the catalytic activity may be not sufficiently manifested. When the amount is more than 0.01 weight part, the promoting effect is lower than the value expected and the decrease in properties of the cured product may be caused by the presence of the catalyst in great quantities as residue in the cured product.

The time and temperature required to cure the thermosetting composition is different depending on the temperature at which the free carboxyl group is regenerated from the blocked functional group of the formula (1) or the formula (8), kind of the reactive functional group and the kind of the acid catalyst. In general, curing is completed by heating at the temperatures in the range from 50° to 300° C. for the time in the range from 5 seconds to 20 hours. The thermosetting composition of the invention has an advantageous property that it can be cured at a temperature below 160° C. and higher temperature are not necessarily required.

The other curable composition of the invention is a two componentcomposition curable at lower temperatures which is prepared by mixing (I) a main material composition or a solution of the main material composition comprising the compound (A) and compound (B), or the compound (D) and the optionally utilized compound (A) and/or the compound (B), and (II) an acid catalyst or a solution thereof comprising at least one kind selected from the group consisting of a Brönsted acid, a Lewis acid and a mixture of a metallic chelate compound and a compound having a silanol group.

Solvents utilized in the main material composition are not limited so long as the solvents can dissolve the materials and include conventional coating solvents, for example, aliphatic hydrocarbons such as n-hexane, n-heptane, n-octane and the like, aromatic hydrocarbons such as benzene, toluene, xylene and the like, halogenated hydrocarbons such as chloroform, carbon tetrachloride and the like, alcohols such as methanol, ethanol, isopropanol, butanol and the like, ethers such as dibutylether, tetrahydrofuran, dioxane and the like, ketones such as acetone, methylethylketone, methylisobutylketone and the like, esters such as ethyl acetate, n-propyl acetate, n-butyl acetate and the like.

The solvent may be utilized singly or as a combination of two or more kinds.

The amount of the solvent is not limited and in general, selected in the range from 10 to 95% by weight, preferably 30 to 80% by weight.

The acid catalyst in the composition is a Brönsted acid, a Lewis acid and a mixture of a metallic chelate compound and a compound having a silanol group. The acid catalyst may be utilized singly or as a combination of two or more kinds.

Examples and preferable examples of the Brönsted acid are the same as described before. The Brönsted acid may be utilized singly or as a combination of two or more kinds.

Examples of the Lewis acid include the same as described in the Lewis acid (iii). The Lewis acid may be utilized singly or as a combination of two or more kinds.

The mixture of a metallic chelate compound and a silanol compound can form a complex compound which manifest the catalytic activity. Therefor, the mixture can be utilized in the curable composition.

Examples of the metallic chelate compound are the same as described in the metallic chelate compound (viii). The metallic chelate compound may be utilized singly or as a combination of two or more kinds.

The silanol compound includes triphenylsilanol, diphenylvinylsilanol, diphenylmethylsilanol, dimethylphenylsilanol, diphenylsilanediol, dimethylsilanediol and the like and one or more of condensates of them, compounds containing a silanol group which are hydrolyzates of homopolymers or copolymers of α,β-unsaturated silane compounds such as acryloyloxypropyltrimethoxysilane methacryloyloxypropyltrimethoxysilane, methacryloyloxypropyltri-n-butoxysilane and the like. The compound having a silanol group may be utilized singly or as a combination of two or more kinds.

The amount of the components in the mixture is not particularly limited. The equivalent ratio of a silanol group of the compound having a silanol group to a metal atom of the metallic chelate compound is preferably in the range from 0.2 to 10, more preferably 0.5 to 5.

In the compositions curable at lower temperatures, amount of the acid catalyst in terms of the amount of the Brönsted acid, the Lewis acid or the metallic chelate compound in the mixture of a metallic chelate compound and a silanol compound is selected in the range from 0.01 to 20 weight parts, preferably 0.02 to 10 weight part based on 100 weight parts of the total solid component which is the sum of the compound (A) and the compound (B) or the sum of the compound (D) and the optionally utilized compound (A) and/or the compound (B).

It is desirable that the acid catalyst is added and mixed in the curable composition at just through 48 hours, preferably just through 24 hours, before using the curable composition.

In the preparation of the curable composition, the acid catalyst may be added in the curable composition without other ingredients or after the solution containing the acid catalyst is prepared.

Solvents utilized in the solution of the acid catalyst are not limited so long as the solvents can dissolve the acid catalyst and include conventional coating solvents , for example, aliphatic hydrocarbons such as n-hexane, n-heptane, n-octane and the like, aromatic hydrocarbons such as benzene, toluene, xylene and the like, halogenated hydrocarbons such as chloroform, carbon tetrachloride and the like, alcohols such as methanol, ethanol, isopropanol, butanol and the like, ethers such as dibutylether, tetrahydrofuran, dioxane and the like, ketones such as acetone, methylethylketone, methylisobutylketone and the like, esters such as ethyl acetate, n-propyl acetate, n-butyl acetate and the like. The solution prepared by mixing the solvent and water may be used as solvent.

The solvent may be utilized singly or as a combination of two or more kinds.

The amount of the acid catalyst in the solution is not limited, but in general, in the range from 1 to 95% by weight, preferably 2 to 60% by weight.

The two component curable composition is prepared by mixing (I) the main material composition or the solution of the main material composition and (II) the acid catalyst or the solution of the acid catalyst.

The time and temperature required to cure the curable composition is different depending on the temperature at which acidity of carboxyl group before blocking reaction, kind of the blocking agent of the blocked functional group of the formula (1) or the formula (8), kind of the reactive functional group and the kind of the acid catalyst. In general, the surface of the cured product becomes free adhesion state at the temperatures in the range of not less than 0 and less than 50° C., preferably not less than 15 and less than 50° C., for the time in the range from 30 minutes to 10 days.

The two component curable composition may be cured at a temperature above 50° C. for the purpose of accelerating the curing reaction and decreasing the curing time.

The curable composition of the invention can be utilized for various applications such as coatings, ink, adhesive, molded plastics and the like and, according to the needs, it may be compounded without other ingredients or with additives such as coloring pigments, fillers, solvents, ultraviolet light absorbents, antioxidants, flow controlling agent and other ingredients.

The curable composition of the invention is prepared by compounding the above components and, according to needs, various additives. The addition method of the components and the additives is not limited and the mixing order and the addition order are not limited.

The curable composition is utilized as coating materials which are one layer top coat material or coating material for preparing coated articles having plural layers comprising a colored base coat and a clear coat. The curable composition is very advantageously applied to the field of industrial coating such as coatings for automobiles, coatings for railway vehicles, coatings for metal articles such as precoated steel plates and postcoated steel plates, coatings for electric instruments, coatings for steel structures, coatings for machines, coatings for building materials, coatings for insulating, sealing or preventing corrosion of electrical and electric parts and others.

The pigment is preferably compounded in the coating in the range from 0 to 300 weight parts, more preferably 0 to 100 weight parts, based on the 100 weight parts of the curable composition.

The pigment include various pigments of organic pigments and inorganic pigments. Examples of the pigment include surface treated metallic pigments such as aluminium, copper, brass, bronze, stainless steel, iron oxides of mica form, metallic powders of flake form, mica coated with titanium dioxide or iron oxides and the like; inorganic pigments such as titanium dioxide, iron oxides, yellow iron oxide, carbon black and the like; organic pigments such as phthalocyanine blue, phthalocyanine green, quinacridone red pigments and the like; body pigments such as precipitated barium sulfate, clay, silica, tarc and the like, and other like pigments.

When the curable composition of the invention is utilized for preparing articles coated with plural layers comprising a colored base coat and a clear top coat, articles having very excellent finished appearance can be obtained.

The base coat is made of a film forming composition comprising a resin binder and pigments. As the resin binder, conventional acrylic polymers, polyesters including alkyd resins, melamine resins, polyurethanes and the like may be utilized as well as the curable composition of the invention.

Conventionally utilized additives of various kinds, such as surfactants, levelling agents, rheology control agents, fillers, defoaming agents, organic solvents, catalysts and the like, may be added to the film forming composition for the base coat.

The clear top coat is made of a film forming composition comprising the curable composition of the present invention. The film forming composition for the clear top coat may be compounded by various additives, the above pigments, dyes having excellent weathering resistance and the like within an amount not to damage the transparency.

The kind of the substrate to which the coating is applied is not particularly limited, but various kinds of organic or inorganic substrate materials, such as woods, glasses, metals, fabrics, plastics, foamed articles, elastomers, papers, ceramics, concretes, gypsum boards and the like, may be utilized.

The suitable method of application of the coating composition comprising the thermosetting composition of the invention includes a method which comprises heating the coating composition or controlling the viscosity by adding organic solvents or reactive diluents according to needs, and applying the coating on the substrate by conventional coating machines such as air spray, electrostatic air spray, roll coater, flow coater, dip type coating machine and the like, brush, bar coater or applicator in an amount to form a film having dried thickness of 0.5 to 300 μm and curing, in general, in the condition of 50° to 300° C. for 5 seconds to 1 hour, and a method which comprises, in the case of two coat one bake coating, diluting the base coat composition with suitable solvents such as organic solvents to control the desirable viscosity, applying the base coat composition on the substrate by the above method in an amount to form a film having dried thickness of 5 to 40 μm, preferable 7 to 35 μm, allowing to stand at room temperature to 100° C. for 1 to 20 minutes, followed applying the clear top coat composition of the present invention on the base coat by the above method in an amount to form a film having dried thickness of 10 to 100 μm, preferable 10 to 60 μm and curing, in general in the condition of 50° to 300° C. for 5 seconds to 1 hour and the like. Preferable method of the application is the application by an air spray in the above methods.

The suitable method of application of the coating composition comprising the two component composition curable at lower temperatures of the invention is the same method as described above. In this case, curing condition is generally to allow to stand at the temperature in the range of not less than 0° C. and less than 50° C. for 30 minutes to 10 days.

The two component curable composition may be cured at a temperature above 50° C. for the purpose of accelerating the curing reaction and decreasing the curing time.

The curable compositions of the invention can be applied to coating on the metal plates.

The method of application of metal coating includes a method which comprises applying optionally the under coat on the substrate by the above method and curing, and further optionally the intermediate coat on the under coat by the above method and curing, and applying the curable compositions comprising the pigment in the range from 0 to 300 weight parts based on the 100 weight parts of the curable composition on the coat layers and curing by heating or at lower temperature of not less than 0° C. and less than 50° C.

The kind of metal plates includes various metal plates such as cold rolled steel plates, zinc-coated steel plates such as electroplating zinc-coated steel plates, electroplating zinc alloy-coated steel plates, hot-dip zinc-coated steel plates (non alloyed), zinc-iron plates, hot-dip zinc-coated steel plates (alloyed), hot-dip zinc aluminium alloy-coated steel plates, stainless steel plates, aluminium plates, aluminium alloy plates and the like.

In applying the under coat to the metal plate, it is better to pretreat the surface of the metal plate. The pretreatment includes conventional various pretreatments as pretreatment for precoat metal plate such as chromate chemical treatment, phosphoric acid chemical treatment, complex oxgenated film treatment and the like.

As the under coat and the intermediate coat, various of conventional under coats and intermediate coats can be utilized. The under coat layer and intermediate coat layer are cured in order application of the coatings. The curing condition is generally 100° to 300° C. for 5 seconds to 5 minutes. In the field of precoating in which the application is conducted by coil coating, the curing are generally conducted in the condition of 120° to 260° C. of maximum temperature of coated materials for 15 to 120 seconds.

The top coat described above comprises the pigment in the range from 0 to 800 weight parts, preferably 0 to 180 weight parts, based on the 100 weight parts of the curable composition.

The methods of application of under coat, intermediate coat and top coat include various methods, but preferably methods by roll coater, flow coater, spray and the like. In the case of applying the top coat by roll coater, natural method and reverse method can be used, but it is preferable to use the reverse method, because an excellent smoothing surface of the coated film is obtained in the reverse method.

The thickness of the coated film is not particularly limited but is generally in the range from each 3 to 25 µm of under coat layer and intermediate coat layer and 3 to 50 µm of top coat layer. When the precoated steel plate is produced with conventional top coats in an amount to form a film having dried thickness of not less than 20 µm, defects such as pinholes in the cured film are often caused. However, the curable compositions of the invention can inhibit the pinholes in such case at the thickness of more than 20 µm.

The coated film applied with top coat is cured, preferably by heating. The curing by heating is generally conducted in condition of 100° to 300° C. of maximum temperature of coated materials for 5 seconds to 5 minutes, preferably 120° to 280° C., more preferably 160° to 260° C, preferably for 15 to 120 seconds, more preferably 15 to 90 seconds. Also, The coated film can be cured in the condition of 210° to 250° C. of maximum temperature of coated materials in the short time of 10 to 15 seconds. By the heat curing, the coated metal plate having excellent properties of the cured film and finishing appearance is obtained.

In applying on metal plate with the two component curable composition of the invention, the curing is generally conducted in the condition of at lower temperature of not less than 0° C. and less than 50° C. for 30 minutes to 10 days in state of standing. The two component curable composition may be cured at a temperature above 50° C. for the purpose of accelerating the curing reaction and decreasing the curing time.

Coated articles prepared by the coating composition of the invention include structures, wood articles, metallic articles, plastics articles, rubber articles, finished papers, ceramic articles, glass articles and the like, specifically automobiles, metal plates such as steel plates, two-wheel barrows, marine vessels, railway vehicles, airplanes, furnitures, musical instruments, house-hold electric instruments, building materials, vessels, office articles, sport articles, toys and the like.

The curable compositions of the invention are useful as molding materials to prepare molded articles having various shapes which are utilized in the broad field such as industrial instruments and parts and the like.

In the application of the molded articles, fillers such as powders, flake fillers, acicular fillers, globular fillers, hollow fillers, fibrous fillers and the like may be compounded in the range from preferably 0 to 800 weight parts, more preferably 0 to 400 weight parts, based on the 100 weight parts of the curable composition.

The kind of the fillers includes powders such as calcium sulfate, calcium silicate, clay, diatomaceous earth, tarc, alumina, quartz sand, glass powder, iron oxide, metallic powder, graphite, silicon carbide, nitrogen carbide, silica, boron nitride, aluminium nitride, carbon black and the like; flake fillers and acicular fillers such as mica, glass flake, sericite, pyrophlite, metallic flake such as alunimium flak, black lead and the like; hollow fillers such as shirasu balloon, metallic balloon, glass balloon and the like;fibrous fillers such as glass fiber, carbon fiber, graphite fiber, whisker such as potassium titanate, metallic fiber, silicon carbide fiber, asbestos, mineral fiber such as wosnite and the like. The fillers may be treated on the surface with stearic acid, oleic acid, palmitic acid or the metal salts, paraffin wax, polyethylene wax, modified paraffin wax, modified polyethylene wax, silane coupling agent, organic borane, organic titanium and the like.

Further, optionally, other additives such as inorganic flame retardants such as magnesium hyroxide, aluminium hydroxide and the like, organic flame retardants such as halogen compound, phosphorus compound and the like, organic fillers such as wood powder and the like, colored pigments, ultraviolet light absorbents, antioxidants, flow controlling agent, lower shrinkage agent, lubricant, foaming agent, thermoplastic resin and the like are utilized.

In compounding molding composition comprising the curable composition of the invention, the curable composition can be mixed by stirring instruments such a dispenser used in mixing of conventional clear coats, because the curable composition has relative good flowability. When the quantity of the filler and the viscosity of the molding composition is large, mixing instruments such as banbury mixer, kneader, kneading extruder, single or multi screw extruder and the like can be utilized. The mixing temperature may be room temperature to 120° C. according to the viscosity of the molding composition and mixing power of the mixing instrument.

Methods of preparation of the molded articles include a method comprising casting the molding composition into the metal mold having desirable shapes and curing by heating or at lower temperatures near room temperature, compression molding utilized in SMC with unsaturated polyester and conventional molding method represented by pressure gelation method which is known as injection molding with a liquid resin. The molding can be performed by the method comprising compounding the molding composition, followed aging at room temperature or by heating according to needs, and curing at room temperature to 300° C. for 1 minutes to 10 days by the above methods.

Prepared molded articles are advantageously applied to sealing materials, casting materials, electrical and electric parts such as laminating plates utilized as printed circuit boards, housing parts such as bus tub, sewage purifier and water tank panel, automotive parts, sounder parts, insulating materials, dampproofing materials, rust preventing materials, parts of industrial instrument and the like.

The curable composition of the invention is favorably utilized in the field of coatings, ink, adhesive and molded plastics.

DESCRIPTION OF THE PREFERRED EMBODIMENTS

The invention will be understood more readily with reference to the following examples; however, these examples are intended to illustrate the invention and are not to be construed to limit the scope of the invention.

Properties of the coated film were evaluated by the following methods.

(1) Acid resistance 1

On a test piece, 2 ml of 40 weight % sulfuric acid was applied as spots and condition of the cured film was observed by visual comparison after standing for 48 hours at 20° C.

(2) Acid resistance 2

On a test piece, 2 ml of 40 weight % sulfuric acid was applied as spots and condition of the cured film was observed by visual comparison after heating for 30 minutes at 60° C.

(3) Acid resistance 3

On a test piece was dipped in 0.1N sulfuric acid and the condition of cured film was observed by visual comparison after standing for 24 hours at 60° C.

(4) Impact resistance

By using an shock deformation tester (Japanese Industrial Standard K-5400 (1990), 8.3.2 Du Pont method), a test piece was clamped to an impact frame of 6.35 mm radius and a weight of 500 g was dropped from the height of 40 cm on the test piece. Damage made on the cured film was observed by visual comparison.

(5) Weathering resistance

By using a weathering resistance tester of sunshine carbon arc lamp (Japanese Industrial Standard K-5400 (1990) 9.8.1), a test piece was exposed for 3000 hours. Condition of the cured film was observed by visual comparison.

(6) Knoop hardness

Measurement was made by using M type microhardnessmeter (manufactured by Shimadzu, Co., Ltd.) at 20° C. A larger value shows a higher hardness (ASTM D-1474).

(7) Processability

Two same plates as a test piece having width of 5 cm were put on the reverse side of coated face of the test piece in a method of 2T bending processing. Four same plates as the test piece were put on the reverse side of coated face of the test piece in a method of 4T bent processing. These test pieces were bended at the angle of 180 deg. and attached completely. After the bending test, a pressure sensitive adhesive cellophane tape was adhered on the test piece and peeled off. Evaluation was conducted in accordance with the following standard.

⊙: Cured film was not peeled off.

o: Percentage of cured film peeled off was not more than 10 %.

Δ: Percentage of cured film peeled off was more than 10% and not more than 50%.

X: Percentage of cured film peeled off was more than 50%.

(8) Pencil hardness

By using a pencil scratching tester according to the method of Japanese Industrial Standard K-5400 (1990) 8.4.1 (a), the hardness of cured film having no rubbing flaws was measured.

(9) Corrosion resistance

By using a test piece bended by 4T bending processing, a salt spray test was conducted for 100 hours according to the method of Japanese Industrial Standard Z-2371 and K-5400 (1990) 9.1. The condition of generation of white rust and blistering on a plane portion, a portion bended by 4T bending processing and a crosscut portion was observed. Evaluation was conducted in accordance with the following standard.

o: Generation of white rust and blistering was not observed.

Δ: Generation of white rust and blistering was slightly observed.

X: Generation of white rust and blistering was apparently observed.

(10) Boiling water resistance

A test piece was dipped in boiling water for 2 hours, and then abnormalities were observed according to the method of Japanese Industrial Standard K-5400 (1990) 8.20. Evaluation was conducted in accordance with the following standard.

⊙: Abnormality of a cured film was not observed.

o: Generation of blistering was slightly observed.

X: Generation of blistering was apparently observed.

(11) Marking ink stain resistance

Marking ink was adhered on the surface of a cured film. After standing as it is for 48 hours at room temperature, the adhered marking ink was wiped off by a soft cloth immersed with xylene and the degree of stain on the surface of cured film was examined.

(12) Carbon stain resistance

One ml of dispersion comprising carbon black and water in a weight ratio of 5:95 was adhered on the surface of a cured film. After allowing to stand as it is for 24 hours at 20° C. in a thermostat, the test piece was washed with water, and the degree of the discoloration of the portion adhered with dispersion was observed by visual comparison.

Evaluation was conducted in accordance with the following standard.

⊙: Trace was not observed.

o: Trace was slightly observed.

Δ: Many traces were observed.

X: Strong trace was apparently observed.

(13) Izod impact resistance test

An Izod impact resistance test was conducted according to Japanese Industrial Standard K 7100.

(14) Flexural strength and flexural modulus

A bending test was conducted according to Japanese Industrial Standard K 6758. Flexural strength and flexural modulus were measured.

(15) Coefficient of linear thermal expansion

Coefficient of linear thermal expansion of a test piece (5×5×5 mm) cut was measured by using a thermophysical fester produced by Rigaku Co., Ltd.

(16) Volume resistivity

Volume resistivity of a test piece at 25° C. was measured according to Japanese Industrial Standard C 2105.

(17) Corrosion resistance of enamel wire conductor

A electric power transformer (core measurements: 66×54×30 mm) made from a enamel wire of ϕ0.5 mm, 2UEW (copper wire covered by polyurethane) was dipped into a sample of a curable composition for 2 minutes, was taken out of the sample and then was standed in air for 10 minutes. The enamel wire was cured at 120° C. for 1 hour. Further, the transformer treated with varnish was placed into a thermohygrostat of 95% RH at 60° C. The number of days from the starting time to the time of generation of corrosion on the enamel wire conductor was measured. Evaluation of the corrosion resistance was conducted according to the discoloration of the enamel wire conductor (examples of discoloration: black, red brawn and the like).

(18) Corrosion resistance of core

In test of the above (17), after standing in the thermohygrostat for 5 days, the condition of generation of rust on the core of the electric power transformer was observed. Evaluation was conducted in accordance with the following standard.

o: Rust was not observed.

Δ: Rust was generated on 10 to 20% of surface area of the core.

X: Rust was generated on 40 to 60% of surface area of the core.

(19) Non-volatile matter

Non-volatile matter in Table 2 and 40 was measured by treating the sample in vacuo of 0.1 mmHg at 50° C. for 3 hours. Non-volatile matter in Table 32 and 33 was measured by treating the sample at 105° C. for 3 hours according to Japanese Industrial Standard K 5407 (1990) 4.

(20) Gardener viscosity

Gardener viscosity was measured by a Gardener viscometer according to Japanese Industrial Standard K 5400 (1990) 4.5.1.

Abbreviations and trade names used in the examples are listed in the following.

SANSOCIZER E- 4030®: a product of New Japan Chemical Co., Ltd., epoxy compound

CARDURA E- 10®: a product of Shell Co., epoxy compound

DENACOL EX-421®: a product of Nagase Kagaku Kogyo Co., Ltd., a polyepoxy compound CHEMITITE PZ-33®: a product of Nippon Shokubai Co., Ltd., aziridine compound CORONATE EH®: a product of Nippon Polyurethane Kogyo Co., Ltd., trimer of hexamethylene diisocyanate CYMEL 303®: a product of Mitsui Cyanamid Co., Ltd., methylated melamine resin KR-214®: a product of Shin- Etsu Chemical Co., Ltd., silicone compound Titanium dioxide JR-602®: a product of Teikoku Kako Co., Ltd., titaniumu dioxide of rutile type MODAFLOW®: a product of Monsanto Co., a leveling agent ALCH-TR-20®: a product of Kawaken Fine Chemicals Co., Ltd., a solution of 20% tris (ethylacetoactate) aluminium in toluene CX-RS-1200®:a product of Nippon Shokubai Co., Ltd., YD-128®: a product of Tohto Kasei Co., Ltd., epoxy compound GT-302®: a product of Daicel Chemical Industries Co., Ltd., epoxy compound KF-101®: a product of Shin- Etsu Chemical Co., Ltd., silicone-containing epoxy compound X-22-169AS ®: a product of Shin-Etsu Chemical Co., Ltd., silicone-containing epoxy compound MSTEP2®: a product of Mitsubishi Chemical Industries Co., Ltd., polymethoxypolysiloxane having epoxy group CRT-D®: a product of Tatsumori Co., Ltd., silica MF3A®: a product of Asahi Fiber Glass Co., Ltd., glass fiber CY-179®: a product of Chiba-Geigy Co., epoxy compound GI: hot-dip zinc coated steel plate, plating amount: Z-25, plate thickness: 0.4 mm GF: hot-dip 5 % aluminium-zinc coated steel plate, plating amount: Z-25, plate thickness: 0.4 mm GL: hot-dip 55% aluminium- zinc coated steel plate, plating amount: Z-25, plate thickness: 0.4 mm P: zinc phosphate treatment Cr: chromating of coating type P-40: PRECOLOR PRIMER P-40®, a product of NOF CORPORATION, high-molecular weight type polyester coating SP-7: PRECOLOR PRIMER SP-7®, a product of NOF CORPORATION, epoxy resin coating PRE 2120 W: PRECOLOR 2120 WHITE, a product of NOF CORPORATION, acrylic coating PRE 3200 W: PRECOLOR 3200 WHITE, a product of NOF CORPORATION, high-molecular weight type polyester coating PRE 3800 W: PRECOLOR 3800 WHITE, a product of NOF CORPORATION, polyester coating PRE 4600 W: PRECOLOR 4600 WHITE, a product of NOF CORPORATION, silicone-polyester coating PTSA: p-toluene sulfonic acid comp.: compound Preparation Examples 1 through 3

Three kinds of the component (A), the solution of compound A-1, A-2 and A-3, were prepared.

(1) Preparation of α,β-unsaturated compound

A mixture shown in Table 1 was charged into a four-necked flask which is equipped with a thermometer, a reflux condenser and a stirrer and stirred at 50° C. The reaction was finished when the acid value of the mixture decreased to a value not more than 30 and the reaction mixture was transferred to a separating funnel after cooling by standing. The reaction mixture was washed with 100 weight parts of alkaline water containing 10 weight % of sodium bicarbonate in a separation funnel and then washed with 200 weight parts of deionized water repeatedly until the PH of the washing water became below 7. The organic layer was dried by adding Molecular Sieves® 4A1/16 (a product of Wako Pure Chemical Industries Co., Ltd.) and standing for 3 days at the room temperature. The α,β-unsaturated compounds obtained by this process, A-1 (a), A-2 (a) and A-3 (a), contained effective components in the amounts shown in Table 1. The contents of the effective components were determined by gas chromatography.

(2) Preparation of the solution of compounds A-1, A-2 and A-3

Into a four-necked flask equipped with a thermometer, a reflux condenser, a stirrer and a dropping funnel, 200 weight parts of an initial solvent which was xylene was charged, heated under stirring and kept at 80° C. A mixture of monomers and a polymerization initiator shown in Table 2 (dropping component) was added by dropping to the solvent at 80° C. at a constant rate for 2 hours. When the addition of the dropping component was finished, the mixture was kept at 80° C. for further 1 hour and then, an additional amount of initiator solution shown in Table 2 (additional catalyst) was added to the mixture. The mixture was kept at 80° C. for 4 hours before finishing the reaction and finally the solution of compounds A-1, A-2 and A-3 having the properties shown in Table 2 were obtained.

Preparation Example 4

One kind of the component (A), the solution of compound A-4, was prepared.

(1) Preparation of the solution of polycarboxylic acid compound A-4 (a)

Into a four-necked flask equipped with a thermometer, a reflux condenser, a stirrer and a dropping funnel, the following components were charged and the mixture was heated under stirring until the temperature reacted to 120° C.

| | |
|---|---|
| pentaerythritol | 136.0 weight parts |
| methyl isobutyl ketone | 538.7 weight parts |

To the mixture kept at 120° C., 672.0 weight parts of methyl-hexahydrophthalic anhydride was added by dropping for 2 hours and the mixture was kept stirring under heating until acid value of the mixture decreased to a value not more than 170. The acid value was measured by diluting the same sample 50 times by weight with a mixture of pyridine and water (pyridine/water=9/1 (by weight)), heating for 80 minutes at 90° C. and titrating with a standard solution of potassium hydroxide. Thus, the solution of a tetrafunctional polycarboxylic acid compound A-4 (a) was prepared.

(2) Preparation of the solution of compound A-4

Into a flask of the same kind as the above, a mixture of the following composition including the solution of the polycarboxylic acid compound prepared above was charged and kept stirring at 50° C.

| | |
|---|---|
| the solution of polycarboxylic acid compound A-4 (a) | 336.7 |
| isobutyl vinyl ether | 120.2 |
| hydrochloric acid, 35 weight % | 0.2 |
| methyl isobutyl ketone | 46.3 |
| (quantity in weight parts) | |

The reaction was finished when acid value of the mixture decreased to a value not more than 12 and the mixture was transferred to a separation funnel after cooling by standing. The reaction mixture was washed with 100 weight parts of alkaline water containing 10 weight % of sodium bicarbonate in the funnel and then washed with 100 weight parts of deionized water repeatedly until pH of the washing water became below 7. The organic layer was dried by adding Molecular Sieves® 4A1/16 (a product of Wako Pure Chemical Industries Co., Ltd.) and standing for 3 days at the room temperature. The solution of compound A-4 thus prepared had 60.0 weight % of non-volatile matter and Gardener viscosity of E-F at 25° C.

Preparation Example 5

One kind of component (A), compound A-5 was prepared.

(1) Preparation of polycarboxylic acid compound A-5 (a)

Into a four-necked flask equipped with a thermometer, a reflux condenser, a stirrer and a dropping funnel, the following component was charged and the mixture was heated under stirring until the temperature reacted to 140° C.

| | |
|---|---|
| trimethylol propane | 134.2 weight parts |

To the mixture kept at 140° C., 420.4 weight parts of hexahydrophthalic anhydride was melt by heating added by dropping for 2 hours and the mixture was kept stirring under heating until acid value of the mixture decreased to a value not more than 285. The acid value was measured by diluting the same sample 50 times by weight with a mixture of pyridine and water (pyridine/water=9/1 (by weight)), heating for 30 minutes at 90° C. and titrating with a standard solution of potassium hydroxide. Thus, a trifunctional polycarboxylic acid compound A-5 (a) was prepared. The compound A-5 (a) is crystalline at near room temperature.

(2) Preparation of compound A-5

Into an autoclave, a mixture of the following composition including the polycarboxylic acid compound prepared above was charged and sufficiently mixed at 130° C. And then, the temperature of the mixture was decreased at 50° C. and the mixture was kept stirring.

| | |
|---|---|
| polycarboxylic acid compound A-5 (a) | 272.3 |
| n-propyl vinyl ether | 129.2 |
| 2-ethylhexyl phosphate | 0.2 |
| (quantity in weight parts) | |

The reaction was finished when acid value of the mixture decreased to a value not more than 10. The obtained compound A-5 was liquid at near room temperature.

Preparation Example 6

One kind of the component (A), compound A-6 was prepared.

(1) Preparation of polycarboxylic acid compound A-6 (a)

Into a four-necked flask equipped with a thermometer, a reflux condenser, a stirrer and a dropping funnel, the following component was charged and the mixture was heated under stirring until the temperature reacted to 120° C.

| | |
|---|---|
| pentaerythritol | 136.0 weight parts |
| methyl isobutyl ketone | 464.5 weight parts |

To the mixture kept at 120° C., 560.7 weight parts of hexahydrophthalic anhydride melt by heating was added by dropping for 2 hours and the mixture was kept stirring under heating until acid value of the mixture decreased to a value not more than 180. The acid value was measured by diluting the same sample 50 times by weight with a mixture of pyridine and water (pyridine/water=9/1 (by weight)), heating for 30 minutes at 90° C. and titrating with a standard solution of potassium hydroxide. Thus, the solution of a tetrafunctional polycarboxylic acid compound A-6 (a) was prepared.

The solvent of the solution of polycarboxylic acid compound A-6 (a) was removed in vacuo of 0.1 mmHg, at 50° C. The prepared compound A-6 (a) was crystalline at near room temperature.

(2) Preparation of compound A-6

Into a flask of the same kind as the above, a mixture of the following composition including the polycarboxylic acid compound prepared above was charged and kept stirring at 50° C.

| | |
|---|---|
| the solution of polycarboxylic acid compound A-6 (a) | 290.3 |
| isobutyl vinyl ether | 109.3 |
| hydrochloric acid, 35 weight % | 0.2 |
| methyl isobutyl ketone | 35.7 |
| (quantity in weight parts) | |

The reaction was finished when acid value of the mixture decreased to a value not more than 12 and the mixture was transferred to a separation funnel after cooling by satanding. The reaction mixture was washed with 100 weight parts of alkaline water containing 10 weight % of sodium bicarbonate in the funnel and then washed with 300 weight parts of deionized water repeatedly until the pH of the washing water became 7. The organic layer was dried by adding Molecuar Sieves® 4A1/16 (a product of Wako Pure Chemical Industries Co., Ltd.) and standing for 3 days at the room temperature.

The solvent of the solution of the compound prepared above was removed in vacuo of 0.1 mmHg, at 50° C. The prepared compound A-6 was liquid at near room temperature.

Preparation Examples 7 through 9

Three kinds of the component (B), the solution of compound B-1 and B-2, and compound B-3 were prepared by the following method.

Into a four-necked flask equipped with a thermometer, a reflux condenser, a stirrer and a dropping funnel, 40.0 weight parts of solvent which was xylene was charged, heated under stirring and kept at 100° C. A mixture of monomers and a polymerization initiator shown in Table 3 (dropping component) was added by dropping to the solvent at 100° C. at a constant rate for 2 hours. When the addition of the dropping component was finished, the mixture was kept at 100° C. for further 1 hour and then, an additional amount of initiator solution shown in Table 3 (additional catalyst) was added to the mixture. The mixture was kept at 100° C. for 2 hours before finishing the reaction. Finally, the solution of compounds B-1 and B-2 were obtained in Preparation Examples 7 and 8. In Preparation Example 9, the solvent of the solution of compound prepared above was removed in vacuo of 0.1 mmHg, at 50° C. and finally compound B-3 was obtained.

Preparation Examples 10 and 11

Two kinds of component (D), the solution of compound D-1 and compound D-2, were prepared by the following method.

Into a four-necked flask equipped with a thermometer, a reflux condenser, a stirrer and a dropping funnel, 40.0 weight parts of an initial portion of solvent which was xylene was charged in an amount shown in Table 4, heated under stirring and kept at 80° C. A mixture of monomers and a polymerization initiator shown in Table 4 (dropping component) was added by dropping to the solvent at 80° C. at a constant rate for 2 hours. When the addition of the dropping component was finished, the mixture was kept at 80° C. for further 1 hour and, then, an additional amount of initiator solution shown in Table 4 (additional catalyst) was added to the mixture. The mixture was kept at 80° C. for 4 hours before finishing the reaction. Finally, the solution of the compound D-1 was obtained in Preparation Example 10. In Preparation Example 11, the solvent of the solution of compound D-2 was removed in vacuo of 0.1 mmHg, at 50° C. and finally compound D-2 was obtained Preparation Examples 12 through 15

Four kinds of the component (C), thermal latent acid catalyst C-1, C-2, C-3 and C-4 were prepared by the following method.

A compound having epoxy group of component (i) and a compound having sulfur atom of component (ii) shown in Table 5 were charged into a flask and mixed at room temperature. And then, 10 weight % solution of Lewis acid of component (iii) shown in Table 5 in mixture solvent comprising methylsiobutyl ketone and ethyl acetate in the ratio of 1:1 by weight was dropped in the mixture and the mixture was stirred for 3 hours. Finally, the solvent of the solution of thermal latent acid catalysts C-1, C-2, C-3 and C-4 were removed and the thermal latent acid catalysts C-1, C-2, C-3 and C-4 were obtained.

Preparation Examples 16 through 19

Four kinds of the component (C), thermal latent acid catalyst C-5, C-6, C-7 and C-8 were prepared by the following method.

A compound having epoxy group of component (i), a compound having sulfur atom of component (ii) and a carboxylic acid compound of component (iv) shown in Table 6 were charged into a flask and mixed at room temperature. And then, 10 weight % solution of Lewis acid of component (iii) shown in Table 6 in mixture solvent comprising methylsiobutyl ketone and ethyl acetate in the ratio of 1:1 by weight was dropped into the mixture and the mixture was stirred for 3 hours. Finally, the solvent of the solution of thermal latent acid catalysts C-5,C-6, C-7 and C-8 were removed and the thermal latent acid catalysts C-5, C-6, C-7 and C-8 were obtained.

These thermal latent acid catalysts C-5, C-6, C-7 and C-8 had excellent solubility to various solvents as shown in Table 6.

Preparation Examples 20 through 23

Four kinds of the component (C), the solution of thermal latent acid catalyst C-9, C-10, C-11 and C-12 were prepared by the following method.

A compound having epoxy group of component (i) and a compound having sulfur atom of component (ii) shown in Table 7 were charged into a flask and mixed at room temperature in Preparation Example 20 and 21. And then, the solution of the Lewis acid of component (iii) shown in Table 7 was dropped into the mixture and the mixture was stirred for 2 hours at 70° C. The mixture was cooled by standing. And when the temperature of the mixture was decreased until room temperature, a carboxylic acid anhydride compound of component (iv) shown in Table 7 was added into the mixture. The mixture was stirred for 1 hour at room temperature and the solution of thermal latent acid catalyst C-9 and C-10 shown in Table 7 were obtained.

In Preparation Examples 22 and 23, a compound having sulfur atom of component (ii) and the solution of Lewis acid of component (iii) shown in Table 7 were charged into a flask and mixed at room temperature. And then, a compound having epoxy group of component (i) shown in Table 7 was dropped into the mixture and the mixture was stirred for 1 hour at room temperature. Finally, a carboxylic acid compound and a carboxylic acid anhydride compound of component (iv) shown in Table 7 were added into the mixture and the mixture was stirred for 2 hours at room temperature in Preparation Example 22 or for 4 hours at 80° C. in Preparation Example 23. As the result, the solution of thermal latent acid catalyst C-11 and C-12 shown in Table 7 were obtained.

Preparation Examples 24 through 27

Four kinds of the component (C), the solution of thermal latent acid catalyst C-13, C-14, C-15 and C-16 were prepared by the following method.

Compounds shown in Table 8 were mixed to form the composition shown in Table 8 with stirring. However, in Preparation Example 24 and 27, the mixture of a solution of zinc chloride and zinc octanoate of component (vii) was added into the mixture of a compound having nitrogen atom or sulfur atom of component (v) and a compound having halogen atom of component (vi). And then, these mixtures were stirred for 24 hours and the solution of thermal latent acid catalyst C-13 through C-16 shown in Table 7 were obtained.

Preparation Example 28

One kind of the component (C), the solution of acid catalyst C-17 was prepared by the following method.

The following compounds were charged into a test tube and the mixture was stirred at room temperature. The 10 weight % solution of tris (ethylacetoacetate) aluminium in isopropanol was prepared.

| | |
|---|---|
| tris (ethylacetoacetate) aluminium | 10.0 weight parts |
| isopropanol | 90.0 weight parts |

And then, 13.3 weight parts of triphenyl silanol was added into the solution and the mixture was stirred for 1 hour at 50° C. As the result, the solution of acid catalyst C-17 was obtained.

Examples 1 through 28

These examples show application to thermosetting one coat solid color coating composition.

(1) Preparation of coating compositions

Compositions summarized in Table 9 through 12 were utilized for the preparation of the coating compositions. Some of or all materials were charged into a sand mill and dispersed until the particle size of pigments decreased to not more than 10 μm. Materials excluding following components were charged into the sand mill: compounds of component (B) in Example 1 through 8, 10 through 17, 19 through 21, 23, 24, 26 and 27. All the raw materials were charged into the sand mill in Examples 9, 18, 22, 25 and 28. In Examples 1 through 8, 10 through 17, 19 through 21, 23, 24, 26 and 27, one component coating compositions were prepared by adding the materials which were not treated by the sand mill to the materials treated by the sand mill. In Example 9, 18, 22, 25 and 28, the materials treated by the sand mill were utilized for one component coating compositions.

(2) Preparation of test piece and Evaluation of cured film properties

Cationic electrodeposition coat AQUA No.4200® (a product of NOF CORPORATION) was applied by electrodeposition to a soft steel plate treated with zinc phosphate in an amount to form a film having dried thickness of 20 μm and the coated plate was baked at 175° C. for 25 minutes. intermediate coat EPICO No.1500CP Sealer® (a product of NOF CORPORATION)was applied to the prepared plate by air spraying in an amount to form a film having dried thickness of 40 μm and the plate was baked at 140° C. for 30 minutes to obtain a base test piece.

The coating compositions prepared in (1)were diluted with thinner (xylene/n-butyl acetate=8/2 (by weight)) in Example 1 through 22 and 26 through 28, or diluted with thinner (xylene/methyl ethyl ketone=6/4 (by weight)) in Example 23 through 25 to a viscosity required for spraying (25 seconds at 20° C. by Ford cup No. 4) and applied to the base test piece prepared before by air spraying in an amount to form a film having dried thickness of 40 μm. Test pieces were prepared by curing the coated pieces at 140° C. for 30 minutes.

Results of the evaluation of cured film properties are shown in Table 13 through 16. In all cases, uniform cured films having good gloss were prepared. All the cured films had excellent acid resistance, impact resistance, weathering resistance and hardness.

(3) Evaluation of storage stability

The coating compositions prepared in (1) were diluted with thinner (xylene/n-butyl acetate=8/2 (by weight)) in Example 1 through 22 and 26 through 28, or diluted with thinner (xylene/methyl ethyl ketone=6/4 (by weight)) in Examples 23 through 25 to the viscosity of 1 poise (measured by Brookfield type viscometer at 20° C.) and stored in a sealed condition at 40° C. After the coating compositions were stored for 30 days at 40° C, the viscosity was measured. Results listed in Table 13 through 16 show that the increase of viscosity was very slight in all cases.

The coating compositions diluted in (2) were stored in a sealed condition at 40° C. After the coating compositions were stored for 30 days at 40° C., the test pieces were prepared by the same method as (2) described above. Knoop hardness of the test pieces were measured. Results listed in Table 13 through 16 show that the coating compositions had excellent curability after the storage. Thus, thermosetting one coat solid color coating compositions prepared by the thermosetting composition of the present invention had excellent storage stability.

Comparative Examples 1 through 7

Compositions summarized in Table 17 were utilized for the preparation of the coating compositions. The coating compositions were prepared by dispersing the pigments into the compositions in the same method as in Example 1 through 28.

Storage stability test was conducted by the same method as in Example 1 through 28, except that the prepared coating compositions were diluted with thinner (xylene/n-butyl acetate=8/2 (by weight)) in Comparative Example 1 through 4, 6 and 7 or diluted with thinner (xylene/methyl ethyl ketone=6/4 (by weight)) in Comparative Example 5.

Results show that viscosity increased remarkably with the period of storage, leading finally to gelation after days shown in Table 17 because the catalyst was not become thermal-latent in Comparative Example 1, and the carboxyl groups were not blocked in Comparative Examples 2 through 6. Further, results show that viscosity did not increase with the period of storage but hardness required to measure knoop hardness after the storage was not obtained in Comparative Example 7 because the catalyst was stabilized with N-methyl morpholine of a Lewis base.

Examples 29 through 41

These examples show application to clear coating composition for two coat one bake metallic color coating.

(1) Preparation of clear coating compositions

One component clear coating compositions were prepared by mixing raw materials shown in Table 18 and 19.

(2) Preparation of test piece and Evaluation of cured film properties

Raw coating compositions prepared in (1) were diluted by the same method as in Examples 1 through 28 except that the raw coating compositions were diluted with thinner (xylene/n-butyl acetate=8/2 (by weight)) in Examples 29 through 37, 40 and 41, or diluted with thinner (xylene/methyl ethyl ketone=6/4 (by weight)) in Examples 38 and 39.

A silver metallic base coating composition, BELCOAT No. 6000® (a product of NOF CORPORATION) was applied to the base test pieces prepared by the same method as in Examples 1 through 28 by air spraying in 2 stages with interval of 1 minute 30 seconds in an amount to form a film having dried thickness of 15 μm. After the coated pieces were set at 20° C. for 3 minutes, the clear coating compositions diluted were coated by air spray coating in an amount to form a film having dried thickness of 40 μm. Test pieces were prepared by curing the coated pieces at 140° C. for 30 minutes.

Results of the evaluation of cured film properties are shown in Tables 20 and 21. In all cases, uniform cured films having good gloss were prepared. All the cured films had excellent acid resistance, impact resistance, weathering resistance and hardness.

(3) Evaluation of storage stability

Storage stability test was conducted by the same method as in Examples 1 through 28, except that the prepared coating compositions were diluted with thinner (xylene/n-butyl acetate=8/2 (by weight)) in Examples 29 through 37, 40 and 41 or diluted with thinner (xylene/methyl ethyl ketone=6/4 (by weight)) in Example 38 and 39.

Results listed in Tables 20 and 21 show that the increase of viscosity was very slight in all cases and the coating compositions had excellent curability after the storage. Thus, clear coating compositions prepared by the thermosetting composition of the present invention had excellent storage stability.

Comparative Examples 8 through 14

Compositions summarized in Table 22 were utilized for the preparation of the coating compositions. The coating compositions were prepared by mixing the compositions.

Storage stability test was conducted by the same method as in Examples 1 through 28, except that the prepared coating compositions were diluted with thinner (xylene/n-butyl acetate=8/2 (by weight)) in Comparative Example 8 through 11, 13 and 14 or diluted with thinner (xylene/methyl ethyl ketone=6/4 (by weight)) in Comparative Example 12.

Results show that viscosity increased remarkably with the period of storage, leading finally to gelation after days shown in Table 22 because the catalyst was not become thermal-latent in Comparative Example 8, and the carboxyl groups were not blocked in Comparative Examples 9 through 13. Further, results show that viscosity did not increase with the period of storage but hardness required to measure knoop hardness after the storage was not obtained in Comparative Example 14 because the catalyst was stabilized with N-methyl morpholine of Lewis base.

Examples 42 through 55 and Comparative Examples 15 and 16

These examples show application to enamel coating composition for precoat metal.
(1) Preparation of coating compositions Compositions summarized in Tables 23 and 24 were utilized for the preparation of the coating compositions. Materials except of compound of component (B) were charged into a sand mill and dispersed until the particle size of pigments decreased to not more than 10 µm. And then, raw coating compositions were prepared by adding the materials which were not treated by the sand mill to the materials treated by the sand mill. The coating compositions prepared were diluted by a solvent of SOLVESSO #150® (a product of Esso Co., aromatic petroleum naphtha) to the viscosity of 120 seconds at 20° C. by Ford cup No. 4 and the one component coating compositions were obtained.
(2) Preparation of test piece and Evaluation of cured film properties under coats shown in Tables 25 through 27 were applied on the steel plates shown in Table 25 through 27 in an amount to form a film having dried thickness of 5 µm by a roll coater and the undercoated steel plates were baked in the condition shown in Tables 25 through 27. The one component coating compositions prepared in (1) were applied on the undercoated steel plates in Examples 42 through 55 and PRECOLOR 3200 WHITE® (a product of NOF CORPORATION, high-molecular weight type polyester coating) was applied on the undercoated steel plates in Comparative Example 15, and PRECOLOR 3800 WHITE® (a product of NOF CORPORATION, polyester coating) was applied on the undercoated steel plate in Comparative Example 16 in an amount to form a film having dried thickness of 15 µm by a roll coater. These coated steel plates were baked in the conditions shown in Tables 25 through 27 to prepare test pieces.

Results of the evaluation of cured film properties are shown in Tables 25 through 27. In all cases, uniform cured films having good gloss were prepared. The precoat metals of the present invention had excellent processability, impact resistance, hardness, corrosion resistance and boiling water resistance.

Further, the precoat metals of the present invention had excellent weathering resistance, acid resistance and stain resistance compared with steel plate coated by the conventional polyester coatings and high-molecular weight type polyester coatings for precoat metals.
(3) Evaluation of storage stability The one component coating compositions prepared in (1) were stored in a sealed condition at 30° C. After the coating compositions were stored for 30 days at 30° C., viscosity was measured by using Ford Cup No. 4 at 20° C. Results listed in Table 25 through 27 show that the increase of viscosity was very slight in all cases.

The test pieces were prepared by applying the coating compositions after the storage in the same method as (2) described above. Pencil hardness of the test pieces was measured.

Results listed in Tables 25 through 27 show that the coating composition had excellent curability after the storage.

Thus, the enamel coating compositions for precoat metal prepared by the thermosetting composition of the present invention had excellent storage stability.

Examples 91 through 94 and Comparative Examples 21 through 23

These examples show application to enamel coating composition for thick film type precoat metal.
(1) Preparation of coating compositions The coating compositions prepared in Examples 45, 51, 54 and 55 were utilized as enamel coating compositions.
(2) coating test PRECOLOR PRIMER SP-7® (a product of NOF CORPORATION, epoxy resin) as a under coat was applied on the zinc-coated steel plate treated with zinc phosphate having thickness of 0.4 mm in an amount to form a film having dried thickness of 5 µm by a roll coater and the undercoated steel plates were baked at 230° C. of the plate temperature for 10 seconds. The coating compositions shown in Table 28 were applied on the undercoated steel plates at line speed of 150 m/min. in an amount to form a film having dried thickness shown in Table 28 by a roll coater. These coated steel plates were baked in condition of plate temperature of 230° C. for 15 seconds.

Results listed in Table 28 show that, in the cases of the coating compositions for precoat metal prepared by the thermosettign composition of the present invention, uniform cured films having good gloss were prepared.

Thus, the coating compositions for precoat metal prepared by the thermosetting composition of the present invention can be applied in high speed coating and thick film coating compared with the conventional coating compositions for precoat metal.

Examples 56 through 63

These examples show application to clear coating composition for precoat metal.
(1) Preparation of clear coating composition The compositions shown in Table 29 were mixed and were diluted to control the viscosity by the same method as in Example 42 through 55 to prepare one component clear coating composition.
(2) Preparation of test piece and Evaluation of cured film properties under coats shown in Tables 30 and 31 were applied on the steel plates shown in Tables 30 and 31 in an amount to form a film having dried thickness shown in Tables 30 and 31 by a roll coater and the undercoated steel plates were baked in the condition shown in Table 30 and 31.

PRECOLOR 3800 WHITE® (a product of NOF CORPORATION, polyester coating) as an intermediate coat was applied on the undercoated steel plates in Examples 56, 57, 59, 60 and 62 in an amount to form a film having dried thickness of 15 µm by a roll coater. These coated steel plates were baked at 210° C. of the plate temperature for 50 seconds.

Further, the one component coating compositions prepared in (1) were applied on the coated steel plates in an amount to form a film having dried thickness of 10 μm by a roll coater. The coated steel plates were baked at 210° C. of the plate temperature for 50 seconds and test pieces were obtained.

Results of the evaluation of cured film properties show in Table 30 and 31. In all cases, uniform cured films having good gloss were prepared. All the precoat metals showed excellent processability, impact resistance, corrosion resistance, hardness, boiling water resistance, weathering resistance, acid resistance and stain resistance.

(3) Evaluation of storage stability

Storage stability test was conducted by the same method as in Examples 42 through 55.

Results listed in Tables 30 and 31 show that the increase of viscosity was very slight in all cases and the coating compositions had excellent curability after the storage. Thus, the clear coating compositions for precoat metal prepared by the thermosetting composition of the present invention had excellent storage stability.

Examples 64 through 72

These examples show application to non solvent type clear coating composition for two coat one bake metallic color coating.

(1) Preparation of clear coating composition

One component clear coating compositions were prepared by mixing raw materials shown in Tables 32 and 33. The non-volatile matter of the coating compositions were not less than 85% by weight as shown in Tables 32 and 33 and were high level value.

(2) Preparation of test piece and Evaluation of cured film properties

A silver metallic base coating composition, BELCOAT No. 6000® (a product of NOF CORPORATION) was applied to the base test pieces prepared by the same method as in Examples 1 through 28 by air spraying in 2 stages with interval of 1 minute 30 seconds in an amount to form a film having dried thickness of 15 μm. After the coated pieces were set at 20° C. for 3 minutes, the clear coating compositions were coated by hot spray coating in an amount to form a film having dried thickness of 40 μm. Test pieces were prepared by curing the coated pieces at 140° C. for 30 minutes.

Results of the evaluation of cured film properties are shown in Tables 32 and 33. In all cases, uniform cured films having good gloss were prepared. All the cured films had excellent acid resistance, impact resistance, weathering resistance and hardness.

Comparative Examples 17 and 18

Materials summarized in Table 34 were mixed to prepare a clear coating compositions.

Results showed that the mixtures could not be utilized as the clear coating compositions because the polycarboxylic acid compound A-5 (a) and A-6 (a) being crystalline at near room temperature precipitated in the mixtures.

Example 73 through 76

These examples show application to non-solvent type clear coating composition for precoat metal.

(1) Preparation of clear coating compositions

The coating compositions prepared in Example 64, 66, 68 and 71 were utilized as clear coating compositions.

(2) Preparation of test piece and Evaluation of cured film properties under coats shown in Table 35 were applied on the steel plates shown in Table 35 in an amount to form a film having dried thickness shown in Table 35 by a roll coater and the undercoated steel plates were baked in the condition shown in Table 35. PRECOLOR 3800 WHITE® (a product of NOF CORPORATION, polyester coating)as an intermediate coat was applied on the undercoated steel plates in Examples 73 and 74 in an amount to form a film having dried thickness of 15 μm by a roll coater and the coated steel plates were baked at 210° C. of plate .temperature for 50 seconds. Further, the one component coating compositions prepared in (1) were applied on the coated steel plates in an amount to form a film having dried thickness of 10 μm by a roll coater and the coated steel plates were baked at 230° C. of plate temperature for 50 seconds. Finally, test pieces were obtained.

Results of the evaluation of cured film properties are shown in Table 35. In all cases, uniform cured films having good gloss were prepared. All the precoat metals showed excellent processability, impact resistance, hardness, corrosion resistance, boiling water resistance, weathering resistance, acid resistance and stain resistance.

Examples 77 through 79

These examples show application to one coat solid color coating composition curable at lower temperatures of near room temperature.

(1) Preparation of main material compositions

Compositions summarized in Table 36 were utilized for the preparation of the main material compositions. Some or all materials were charged into a sand mill and dispersed until the particle size of pigments decreased to not more than 10 μm. Materials excluding following components were charged into the sand mill: compounds of component (B) in Examples 77 and 78. All the raw materials were charged into the sand mill in Example 79. In Examples 77 and 78, main material compositions were prepared by adding the materials which were not treated by the sand mill to the materials treated by the sand mill. In Example 79, the materials treated by the sand mill were utilized for main material composition.

(2) Preparation of test piece and Evaluation of cured film properties

Solutions of acid catalysts shown in Table 36 were added into the main material compositions prepared in (1). The mixture were diluted with thinner (xylene/n-butyl acetate= 8/2 (by weight)) to prepare one coat solid color coating compositions curable at lower temperatures of near room temperature. The prepared coating compositions was applied on base test pieces prepared by the same method as in Examples 1 through 28 in an amount to form a film having dried thickness of 40 μm by air spraying. The coated pieces were heated at 60° C. for 30 minutes and then stood for 3 days at room temperature. Finally, test pieces were obtained.

Results of the evaluation of cured film properties are shown in Table 36. In all cases, uniform cured films having good gloss were prepared. All the coated films had excellent acid resistance, impact resistance, weathering resistance and hardness.

Examples 80 and 81

These examples show application to clear coating composition curable at lower temperatures of near room temperature for two coat metallic color coating.

(1) Preparation of main material compositions

Raw materials shown in Table 37 were mixed to prepare main material compositions.

(2) Preparation of test piece and Evaluation of cured film properties

A silver metallic base coating composition, BELCOAT No. 6000® (a product of NOF CORPORATION) was applied to the base test piece prepared by the same method as in Examples 1 through 28 by air spraying in 2 stages with interval of 1 minute 30 seconds in an amount to form a film having dried thickness of 15 µm. The coated pieces were baked at 140° C. for 30 minutes. Solutions of acid catalysts shown in Table 37 were added into the main material compositions prepared in (1). The mixture were diluted with thinner (xylene/n-butyl acetate=8/2 (by weight)) to prepare clear coating compositions curable at lower temperatures of near room temperature. The prepared coating compositions was applied on the coated pieces in an amount to form a film having dried thickness of 40 µm by air spraying. The coated pieces were heated at 60° C. for 30 minutes and then stood for 3 days at room temperature. Finally, test pieces were obtained.

Results of the evaluation of cured film properties are shown in Table 38. In all cases, uniform cured films having good gloss were prepared. All the coated films had excellent acid resistance, impact resistance, weathering resistance and hardness.

Examples 82 and 86

These examples show application to molded articles.
(1) Preparation of compositions for molded articles Compositions shown in Table 39 were mixed to prepare the compositions for molded articles in Examples 82, 83 and 85. In Example 84 and 86, the solvent of the mixed compositions was removed in vacuo of 0.1 mmHg at 50° C. to prepare the compositions for molded articles.
(2) Preparation of test piece and Property test The compositions prepared in (1) were heated to 50° C. and charged in metallic molds (10×300×300 mm). The compositions charged in metallic molds were degassed in vacuo of 1 Torr at 50° C. for 20 minutes and were cured by heating at 120° C. of the metallic mold temperature for 1 hour and then at 150° C. for 1 hour. Finally, the molded articles were obtained by releasing from the metallic molds. The molded articles did not have sink marks caused by shrinking or gas bubbles. The molded articles were cut to prepare test pieces. Mechanical property tests and insulating characteristic test were conducted by using the test pieces. Further, corrosion resistance tests were conducted in Examples 82 through 84.

Results listed in Table 39 show that the molded articles prepared by the thermosetting compositions of the present invention showed excellent mechanical properties, insulating characteristic and corrosion resistance.

Examples 87 through 90

These examples show application of the thermal latent acid catalyst to other thermosetting compositions besides the thermosetting composition of the present invention.
(1) Preparation of monomer E-1 (a)

The following components were charged into a flask equipped with a cock and were stirred at room temperature for 24 hours.

| | |
|---|---|
| 2-hydroxyethyl methacrylate | 130.0 weight parts |
| 3,4-dihydro-2H-pyran-2-il-methyl 3,4-dihydro-2H-pyran-2-carboxylate | 224.0 weight parts |
| dodecyl benzen sulfonic acid | 0.3 weight parts |

Thus, methacrylate compound E-1 (a) having vinylether group was prepared.

The content of effective components of the product measured by a gas chromatography was 98.6% by weight.

(2) Preparation of solution of compound E-1

Into a four-necked flask equipped with a thermometer, a reflux condenser, a stirrer and a dropping funnel, 40.0 weight parts of an initial solvent which was xylene was charged, heated under stirring and kept at 100° C. A mixture of monomers and a polymerization initiator shown in Table 40 (dropping component)was added by dropping to the solvent at 100° C. at a constant rate for 2 hours. When the addition of the dropping component was finished, the mixture was kept at 100° C. for further 1 hour and then, an additional amount of initiator solution shown in Table 40 (additional catalyst) was added to the mixture. The mixture was kept at 100° C. for 2 hours before finishing the reaction and finally the compound E-1 having the properties shown in Table 40 was obtained.
(3) Application to thermosetting composition Compositions shown in Table 41 were mixed and were diluted by methyl ethyl ketone to the viscosity of 1 poise (measured by Brookfield type viscometer at 20° C. ) to prepare thermosetting one component coating composition. The prepared coating composition were applied on tin plates by flow coating and cured at 140° C. for 30 minutes. Knoop hardness of the portion having thickness of 30 µm of the cured film was measured.

Results listed in Table 41 show that the cured films showed excellent hardness.

Further, the above coating compositions were stored in a sealed condition at 40° C. After the coating compositions were stored for 30 days at 40° C., viscosity was measured. Results listed in Table 41 show that the increase of viscosity was very slight in all cases.

Comparative Examples 19 and 20

Compositions summarized in Table 42 were utilized for the preparation of the coating compositions. The coating compositions were utilized for the preparation of the cured film in the same method as in Examples 87 through 90. Hardness required to measure knoop hardness was not obtained in Comparative Example 19 because any catalysts was not utilized.

Storage stability test was conducted by the same method as in Examples 87 through 90.

Results show that viscosity increased remarkably with the period of storage, leading finally to gelation after 3 days because the catalyst was not become thermal-latent in Comparative Example 20.

To summarized the advantages obtained by the invention, the curable composition of the invention is excellent in storage stability and gives cured products having excellent chemical properties, physical properties, weathering resistance and stain resistance. The curable composition is favorably utilized in the field of coatings, ink, adhesive and molded plastics. Particularly, when it is utilized as a top coating material, it discharges a small amount of organic solvents into air, gives excellent appearance to the finished articles and is advantageously applied to the field of industrial coating such as coatings for automobiles and precoated steel plates. Further, when it is utilized as a molding material, it gives excellent mechanical properties, insulating characteristic, moisture resistance, corrosion resistance and craking resistance to the molded articles and is advantageously applied to sealing materials, casting materials, electrical and electric parts such as laminating plates utilized as printed circuit boards, housing parts such as bus tub, sewage purifier and water tank panel, automotive parts, sounder parts and parts of industrial instrument.

TABLE 1

| preparation example | 1 | 2 | 3 |
|---|---|---|---|
| α,β-unsaturated compound | A-1 (a) | A-2 (a) | A-3 (a) |
| composition weigh parts | | | |
| methacrylic acid | 86.0 | 86.0 | 86.0 |
| ethyl vinyl ether | 86.5 | — | — |
| isobutyl vinyl ether | — | 120.2 | — |
| 3,4-dihydro-2H-pyran | — | — | 100.9 |
| hydroquinone monomethyl ether | 0.2 | 0.2 | 0.2 |
| 35 weight % hydrochloride | 0.1 | 0.1 | 0.1 |
| content of effective component weight % | 94.5 | 95.3 | 95.1 |

TABLE 2

| preparation example | 1 | 2 | 3 |
|---|---|---|---|
| compound (A) | A-1 | A-2 | A-3 |
| xylene weight parts | 200.0 | 200.0 | 200.0 |
| dropping component weight parts | | | |
| α,β-unsaturated comp. A-1 (a) | 167.2 | — | — |
| α,β-unsaturated comp. A-2 (a) | — | 195.2 | — |
| α,β-unsaturated comp. A-3 (a) | — | — | 178.8 |
| n-butylmethacrylate | 100.0 | 100.0 | 100.0 |
| methylmethacrylate | 178.6 | 178.6 | 178.6 |
| 2-ethylhexylacrylate | 135.4 | 135.4 | 135.4 |
| n-butyl acetate | 135.9 | 106.8 | 123.8 |
| 2,2'-azo-bis-isobutyronitrile | 22.9 | 24.0 | 23.4 |
| additional catalyst weight parts | | | |
| n-butyl acetate | 57.0 | 57.0 | 57.0 |
| 2,2'-azo-bis-isobutyronitrile | 3.0 | 3.0 | 3.0 |
| characteristic | | | |
| non-volatile mattter (weight %) | 57.2 | 60.1 | 58.5 |
| Gardener viscosity (25° C.) | R–S | W–X | U |

TABLE 3

| preparation example | 7 | 8 | 9 |
|---|---|---|---|
| compound (B) | B-1 | B-2 | B-3 |
| xylene weight parts | 40.0 | 40.0 | 40.0 |
| dropping component weight parts | | | |
| methacryloyloxypropyl trimethoxysilane | — | 16.60 | — |
| glycidyl methacrylate | 28.40 | — | 28.40 |
| n-buty methacrylate | 20.00 | 20.00 | 24.45 |
| methyl methacrylate | 27.70 | 51.19 | — |
| 2-ethylhexyl acrylate | 23.90 | 12.21 | — |
| 2-ethylhexyl methacrylate | — | — | 74.15 |
| n-butyl acetate | 54.00 | 54.00 | 50.00 |
| 2,2'-azo-bis-isobutyronitrile | 2.00 | 2.00 | 6.00 |
| additional catalyst weight parts | | | |
| n-butyl acetate | 3.80 | 3.80 | 3.80 |
| 2,2'-azo-bis-isobutyronitrile | 0.20 | 0.20 | 0.20 |

TABLE 4

| preparation example | 10 | 11 |
|---|---|---|
| compound (D) | D-1 | D-2 |
| xylene weight parts | 40.0 | 40.0 |
| dropping component weight parts | | |
| α,β-unsaturated comp. A-1 (a) | — | 20.7 |
| α,β-unsaturated comp. A-3 (a) | 36.0 | — |
| glycidyl methacrylate | 14.2 | 17.0 |
| methacryloyloxypropyl trimethoxysilane | 16.6 | — |
| n-butyl acrylate | — | 23.6 |
| n-butyl methacrylate | 20.0 | — |
| methyl methacrylate | 18.5 | — |
| 2-ethylhexyl acrylate | 13.5 | — |
| 2-ethylhexyl methacrylate | — | 58.7 |
| n-butyl acetate | 28.7 | 28.7 |
| 2,2'-azo-bis-isobutyronitrile | 4.5 | 4.5 |
| additional catalyst weight parts | | |
| n-butyl acetate | 7.6 | 6.4 |
| 2,2'-azo-bis-isobutyronitrile | 0.4 | 0.4 |

TABLE 5

| preparation example | | 12 | 13 | 14 | 15 |
|---|---|---|---|---|---|
| (C) thermal latent acid catalyst (a) | | C-1 | C-2 | C-3 | C-4 |
| composition weight parts | (i) propylene oxide | 11.62 | — | — | — |
| | cyclohexene oxide | — | 19.64 | 9.82 | — |
| | glycidyl methyl ether | — | — | — | 8.81 |
| | (ii) n-propyl sulfide | 23.64 | — | — | — |
| | n-butyl sulfide | — | 29.26 | 14.63 | — |
| | bis (2-methoxyethyl) sulfide | — | — | — | 15.02 |
| | (iii) zinc octanoate | — | 35.18 | 35.18 | — |
| | tin octanoate | 40.51 | — | — | — |
| | zirconium acetyl acetonate | — | — | — | 48.77 |
| | yield (%) | 93 | 92 | 93 | 93 |

TABLE 6

| preparation example | | 16 | 17 | 18 | 19 |
|---|---|---|---|---|---|
| (C) thermal latent acid catalyst (a) | | C-5 | C-6 | C-7 | C-8 |
| composition weight parts | (i) propylene oxide | 11.62 | — | — | — |
| | cyclohexene oxide | — | 19.64 | 9.82 | — |
| | glycidyl methyl ether | — | — | — | 8.81 |
| | (ii) n-propyl sulfide | 23.64 | — | — | — |
| | n-butyl sulfide | — | 29.26 | 14.63 | — |
| | bis (2-methoxyethyl) sulfide | — | — | — | 15.02 |
| | (iii) ZnCl$_2$ | — | 13.63 | 13.63 | — |
| | SnCl$_2$ | 18.96 | — | — | — |
| | TiCl$_4$ | — | — | — | 18.97 |
| | (iv) octanoic acid | — | 14.42 | 28.84 | — |
| | lauric acid | 20.03 | — | — | — |
| | stearic acid | — | — | — | 28.45 |
| | yield (%) | 93 | 95 | 91 | 94 |
| solubility to various solvents | methyl isobutyl ketone | good | good | good | good |
| | ethyl acetate | good | good | good | good |
| | xylene | good | good | good | good |

TABLE 7

| preparation example | | 20 | 21 | 22 | 23 |
|---|---|---|---|---|---|
| (C) thermal latent acid catalyst (a) | | C-9 | C-10 | C-11 | C-12 |
| composition weight parts | (i) cyclohexene oxide | — | — | 15.8 | — |
| | SANSOCIZER E-4030 | 50.4 | — | — | — |
| | methyl glycidyl ether | — | 13.5 | — | — |
| | CARDURA E-10 | — | — | — | 37.9 |
| | (ii) di-n-hexyl sulfide | — | 30.9 | 30.9 | — |
| | di-n-propyl sulfide | 18.1 | — | — | — |
| | 2-(ethylthio) ethanol | — | — | — | 16.2 |

TABLE 7-continued

| preparation example | 20 | 21 | 22 | 23 |
|---|---|---|---|---|
| (C) thermal latent acid catalyst (a) | C-9 | C-10 | C-11 | C-12 |
| (iii) 20.9 weight % solution of zinc chloride in methylethylketone | 100.0 | 100.0 | 100.0 | — |
| 55.6 weight % solution of zinc octanoate in methylethylketone | — | — | — | 100.0 |
| (iv) 2-ethylhexanoic acid | — | — | 17.6 | — |
| acetic anhydride | 15.6 | — | — | 7.8 |
| propionic anhydride | — | 19.9 | 4.0 | — |
| solution concentration (weight %) | 57.0 | 51.9 | 53.0 | 72.6 |

TABLE 8

| preparation example | | 24 | 25 | 26 | 27 |
|---|---|---|---|---|---|
| (C) thermal latent acid catalyst (b) | | C-13 | C-14 | C-15 | C-16 |
| composition weight parts | (v) di-n-hexyl sulfide | 14.8 | 14.8 | 14.8 | — |
| | pyridine | — | — | — | 5.8 |
| | (vi) benzyl chloride | 9.3 | — | 9.3 | — |
| | tert-butyl chloride | — | 6.8 | — | — |
| | allyl chloride | — | — | — | 5.6 |
| | (vii) 5 weight % solution of zinc chloride in methylethylketone | 100.0 | 100.0 | 100.0 | 100.0 |
| | zinc octanoate | 13.3 | — | — | 13.3 |
| solution concentration (weight %) | | 30.9 | 21.9 | 23.4 | 23.8 |

TABLE 9

| example | | 1 | 2 | 3 | 4 | 5 | 6 | 7 | 8 | 9 |
|---|---|---|---|---|---|---|---|---|---|---|
| composition weight parts | | | | | | | | | | |
| (A) | comp. A-1 | 100 | — | — | — | 100 | — | — | — | — |
| | comp. A-2 | — | 100 | — | — | — | 100 | — | — | — |
| | comp. A-3 | — | — | 100 | — | — | — | 100 | 100 | — |
| | comp. A-4 | — | — | — | 50 | — | — | — | — | — |
| (B) | comp. B-1 | — | — | — | 100 | — | — | 100 | — | — |
| | comp. B-2 | — | 100 | — | — | — | — | — | — | — |
| | EX-421 | 15.5 | — | — | — | — | — | — | — | — |
| | PZ-33 | — | — | 16.1 | — | — | — | — | — | — |
| | CORONATE EH | — | — | — | — | 20.0 | — | — | — | — |
| | CYMEL 303 | — | — | — | — | — | 14.0 | — | — | — |
| | KR-214 | — | — | — | — | — | — | — | 49.0 | — |
| (C) (a) | thermal latent acid catalyst C-1 | 1.7 | 2.7 | — | — | — | — | — | 2.2 | 1.4 |
| | thermal latent acid catalyst C-2 | — | — | 2.0 | — | — | — | — | — | — |
| | thermal latent acid catalyst C-3 | — | — | — | 1.5 | 1.5 | 1.4 | — | — | — |
| | thermal latent acid catalyst C-4 | — | — | — | — | — | — | 2.5 | — | — |
| (D) others | comp. D-1 | — | — | — | — | — | — | — | — | 100 |
| | Titanium dioxide | 52.4 | 80.0 | 52.9 | 56.0 | 56.0 | 51.2 | 80.0 | 67.4 | 40.0 |
| | MODAFLOW | 0.3 | 0.5 | 0.3 | 0.3 | 0.3 | 0.3 | 0.5 | 0.3 | 0.3 |
| | xylene | 10.0 | 20.0 | 10.0 | 15.0 | 10.0 | 10.0 | 20.0 | 15.0 | 10.0 |
| | n-butyl acetate | 2.0 | 4.0 | 2.0 | 3.0 | 2.0 | 2.0 | 4.0 | 3.0 | 2.0 |
| | methyl ethyl ketone | — | — | — | — | — | — | — | — | — |

TABLE 10

| example | | 10 | 11 | 12 | 13 | 14 | 15 | 16 | 17 | 18 |
|---|---|---|---|---|---|---|---|---|---|---|
| composition weight parts | | | | | | | | | | |
| (A) | comp. A-1 | 100 | — | — | — | 100 | — | — | — | — |
| | comp. A-2 | — | 100 | — | — | — | 100 | — | — | — |

TABLE 10-continued

| example | | 10 | 11 | 12 | 13 | 14 | 15 | 16 | 17 | 18 |
|---|---|---|---|---|---|---|---|---|---|---|
| | comp. A-3 | — | — | 100 | — | — | — | 100 | 100 | — |
| | comp. A-4 | — | — | — | 50 | — | — | — | — | — |
| (B) | comp. B-1 | — | — | — | 100 | — | — | 100 | — | — |
| | comp. B-2 | — | 100 | — | — | — | — | — | — | — |
| | EX-421 | 15.5 | — | — | — | — | — | — | — | — |
| | PZ-33 | — | — | 16.1 | — | — | — | — | — | — |
| | CORONATE EH | — | — | — | — | 20.0 | — | — | — | — |
| | CYMEL 303 | — | — | — | — | — | 14.0 | — | — | — |
| | KR-214 | — | — | — | — | — | — | — | 49.0 | — |
| (C) (a) | thermal latent acid catalyst C-5 | 1.7 | 2.6 | — | — | — | — | — | 2.2 | 1.4 |
| | thermal latent acid catalyst C-6 | — | — | 1.8 | — | — | — | — | — | — |
| | thermal latent acid catalyst C-7 | — | — | — | 1.7 | 1.6 | 1.6 | — | — | — |
| | thermal latent acid catalyst C-8 | — | — | — | — | — | — | 2.5 | — | — |
| (D) | comp. D-1 | — | — | — | — | — | — | — | — | 100 |
| others | Titanium dioxide | 52.4 | 80.0 | 52.9 | 56.0 | 56.0 | 51.2 | 80.0 | 67.4 | 40.0 |
| | MODAFLOW | 0.3 | 0.5 | 0.3 | 0.3 | 0.3 | 0.3 | 0.5 | 0.3 | 0.3 |
| | xylene | 10.0 | 20.0 | 10.0 | 15.0 | 10.0 | 10.0 | 20.0 | 15.0 | 10.0 |
| | n-butyl acetate | 2.0 | 4.0 | 2.0 | 3.0 | 2.0 | 2.0 | 4.0 | 3.0 | 2.0 |
| | methyl ethyl ketone | — | — | — | — | — | — | — | — | — |

TABLE 11

| | | example | 19 | 20 | 21 | 22 |
|---|---|---|---|---|---|---|
| composition weight parts | (A) | comp. A-1 | 100 | — | — | — |
| | | comp. A-2 | — | — | — | — |
| | | comp. A-3 | — | 100 | — | — |
| | | comp. A-4 | — | — | 50 | — |
| | (B) | comp. B-1 | — | 100 | 100 | — |
| | | comp. B-2 | — | — | — | — |
| | | EX-421 | 15.5 | — | — | — |
| | | PZ-33 | — | — | — | — |
| | | CORONATE EH | — | — | — | — |
| | | CYMEL 303 | — | — | — | — |
| | | KR-214 | — | — | — | — |
| | (C) (a) | thermal latent acid catalyst C-9 | 6.7 | — | — | — |
| | | thermal latent acid catalyst C-10 | — | 9.0 | — | — |
| | | thermal latent acid catalyst C-11 | — | — | 6.8 | — |
| | | thermal latent acid catalyst C-12 | — | — | — | 4.7 |
| (D) others | | comp. D-1 | — | — | — | 100 |
| | | Titanium dioxide | 52.4 | 80.0 | 56.0 | 40.0 |
| | | MODAFLOW | 0.3 | 0.5 | 0.3 | 0.3 |
| | | xylene | 4.7 | 19.5 | 7.5 | 6.0 |
| | | n-butyl acetate | 2.1 | 4.4 | 2.5 | 1.9 |
| | | methyl ethyl ketone | — | — | — | — |

TABLE 12

| | | example | 23 | 24 | 25 | 26 | 27 | 28 |
|---|---|---|---|---|---|---|---|---|
| composition weight parts | (A) | comp. A-1 | 100 | — | — | 100 | — | — |
| | | comp. A-2 | — | — | — | — | — | — |
| | | comp. A-3 | — | — | — | — | — | — |
| | | comp. A-4 | — | 50 | — | — | 50 | — |
| | (B) | comp. B-1 | — | 100 | — | — | 100 | — |
| | | comp. B-2 | — | — | — | — | — | — |
| | | EX-421 | 15.5 | — | — | 15.5 | — | — |
| | | PZ-33 | — | — | — | — | — | — |
| | | CORONATE EH | — | — | — | — | — | — |
| | | CYMEL 303 | — | — | — | — | — | — |
| | | KR-214 | — | — | — | — | — | — |
| | (C) (b) | thermal latent acid catalyst C-13 | 10.4 | — | 8.4 | — | — | — |
| | | thermal latent acid catalyst C-14 | — | 20.5 | — | — | — | — |
| | (C) (c) | ALCH-TR-20 | — | — | — | 11.5 | 12.8 | 9.3 |

TABLE 12-continued

| example | | | 23 | 24 | 25 | 26 | 27 | 28 |
|---|---|---|---|---|---|---|---|---|
| (viii) (C) (c) | | triphenyl | — | — | — | 1.6 | 1.8 | 1.3 |
| (ix) | | methoxy silane | | | | | | |
| (D) | | comp. D-1 | — | — | 100 | — | — | 100 |
| others | | Titanium dioxide | 52.4 | 56.0 | 40.0 | 52.4 | 56.0 | 40.0 |
| | | MODAFLOW | 0.3 | 0.3 | 0.3 | 0.3 | 0.3 | 0.3 |
| | | xylene | — | — | — | 4.6 | 8.7 | 6.3 |
| | | n-butyl acetate | — | — | — | 2.0 | 3.0 | 2.0 |
| | | methyl ethyl ketone | 7.0 | 7.1 | 8.7 | — | — | — |

TABLE 13

| example | 1 | 2 | 3 | 4 | 5 | 6 | 7 |
|---|---|---|---|---|---|---|---|
| cured film property | | | | | | | |
| acid resistance-1 | non abnormal | non abnormal | non abnormal | non abnormal | non abnormal | non abnormal | non abnormal |
| acid resistance-2 | non abnormal | non abnormal | non abnormal | non abnormal | non abnormal | non abnormal | non abnormal |
| acid resistance-3 | non abnormal | non abnormal | non abnormal | non abnormal | non abnormal | non abnormal | non abnormal |
| impact resistance | non abnormal | non abnormal | non abnormal | non abnormal | non abnormal | non abnormal | non abnormal |
| weathering resistance | non abnormal | non abnormal | non abnormal | non abnormal | non abnormal | non abnormal | non abnormal |
| knoop hardness | 11.0 | 12.0 | 11.5 | 12.3 | 12.0 | 11.7 | 11.4 |
| storage stability | | | | | | | |
| initial viscosity (poise) | 1.0 | 1.0 | 1.0 | 1.0 | 1.0 | 1.0 | 1.0 |
| viscosity after 40° C. × 30 days (poise) | 1.1 | 1.2 | 1.3 | 1.1 | 1.2 | 1.2 | 1.2 |
| knoop hardness after 40° C. × 30 days | 10.5 | 11.6 | 11.2 | 12.2 | 11.5 | 11.5 | 11.1 |

TABLE 14

| example | 8 | 9 | 10 | 11 | 12 | 13 | 14 |
|---|---|---|---|---|---|---|---|
| cured film property | | | | | | | |
| acid resistance-1 | non abnormal | non abnormal | non abnormal | non abnormal | non abnormal | non abnormal | non abnormal |
| acid resistance-2 | non abnormal | non abnormal | non abnormal | non abnormal | non abnormal | non abnormal | non abnormal |
| acid resistance-3 | non abnormal | non abnormal | non abnormal | non abnormal | non abnormal | non abnormal | non abnormal |
| impact resistance | non abnormal | non abnormal | non abnormal | non abnormal | non abnormal | non abnormal | non abnormal |
| weathering resistance | non abnormal | non abnormal | non abnormal | non abnormal | non abnormal | non abnormal | non abnormal |
| knoop hardness | 11.5 | 11.8 | 10.8 | 11.5 | 11.4 | 12.0 | 12.2 |
| storage stability | | | | | | | |
| initial viscosity (poise) | 1.0 | 1.0 | 1.0 | 1.0 | 1.0 | 1.0 | 1.0 |
| viscosity after 40° C. × 30 days (poise) | 1.2 | 1.2 | 1.2 | 1.2 | 1.3 | 1.2 | 1.1 |
| knoop hardness after 40° C. × 30 days | 11.2 | 11.5 | 10.6 | 11.6 | 11.2 | 12.2 | 11.5 |

TABLE 15

| example | 15 | 16 | 17 | 18 | 19 | 20 | 21 |
|---|---|---|---|---|---|---|---|
| cured film property | | | | | | | |
| acid resistance-1 | non abnormal | non abnormal | non abnormal | non abnormal | non abnormal | non abnormal | non abnormal |
| acid resistance-2 | non abnormal | non abnormal | non abnormal | non abnormal | non abnormal | non abnormal | non abnormal |
| acid resistance-3 | non abnormal | non abnormal | non abnormal | non abnormal | non abnormal | non abnormal | non abnormal |
| impact resistance | non abnormal | non abnormal | non abnormal | non abnormal | non abnormal | non abnormal | non abnormal |
| weathering resistance | non abnormal | non abnormal | non abnormal | non abnormal | non abnormal | non abnormal | non abnormal |
| knoop hardness | 12.0 | 11.4 | 11.3 | 11.8 | 8.8 | 9.8 | 9.5 |
| storage stability | | | | | | | |
| initial viscosity (poise) | 1.0 | 1.0 | 1.0 | 1.0 | 1.0 | 1.0 | 1.0 |
| viscosity after 40° C. × 30 days (poise) | 1.1 | 1.1 | 1.3 | 1.0 | 1.4 | 2.2 | 1.5 |
| knoop hardness after 40° C. × 30 days | 11.3 | 11.3 | 11.2 | 11.6 | 8.5 | 9.6 | 9.2 |

TABLE 16

| example | 22 | 23 | 24 | 25 | 26 | 27 | 28 |
|---|---|---|---|---|---|---|---|
| cured film property | | | | | | | |
| acid resistance-1 | non abnormal | non abnormal | non abnormal | non abnormal | non abnormal | non abnormal | non abnormal |
| acid resistance-2 | non abnormal | non abnormal | non abnormal | non abnormal | non abnormal | non abnormal | non abnormal |
| acid resistance-3 | non abnormal | non abnormal | non abnormal | non abnormal | non abnormal | non abnormal | non abnormal |
| impact resistance | non abnormal | non abnormal | non abnormal | non abnormal | non abnormal | non abnormal | non abnormal |
| weathering resistance | non abnormal | non abnormal | non abnormal | non abnormal | non abnormal | non abnormal | non abnormal |
| knoop hardness | 9.0 | 7.5 | 8.3 | 8.7 | 11.1 | 11.6 | 11.5 |
| storage stability | | | | | | | |
| initial viscosity (poise) | 1.0 | 1.0 | 1.0 | 1.0 | 1.0 | 1.0 | 1.0 |
| viscosity after 40° C. × 30 days (poise) | 2.0 | 1.3 | 1.6 | 2.4 | 2.3 | 2.6 | 2.9 |
| knoop hardness after 40° C. × 30 days | 8.5 | 7.2 | 8.1 | 8.5 | 10.4 | 10.7 | 10.6 |

TABLE 17

| comparative example | 1 | 2 | 3 | 4 | 5 | 6 | 7 |
|---|---|---|---|---|---|---|---|
| composition weight parts | | | | | | | |
| polycarboxylic acid comp. A-4 (a) (A) | — | 33.3 | 33.3 | 33.3 | 33.3 | 33.3 | — |
| comp. A-4 (B) | 50 | — | — | — | — | — | 50 |
| comp. B-1 | 100 | 100 | 100 | 100 | 100 | 100 | 100 |
| zinc octanoate | 0.9 | — | — | — | — | — | 0.9 |
| N-methyl-morpholine (C) (a) | — | — | — | — | — | — | 0.5 |
| thermal latent acid | — | 1.7 | — | — | — | — | — |
| catalyst C-5 thermal latent acid catalyst C-10 (C) (b) | — | — | 6.6 | — | — | — | — |
| thermal latent acid catalyst C-11 (C) (b) | — | — | — | 6.8 | — | — | — |
| thermal latent acid catalyst C-14 (C) (c) (viii) | — | — | — | — | 20.5 | — | — |
| ALCH-TR-20 (C) (c) (ix) | — | — | — | — | — | 12.8 | — |
| triphenyl methoxy silane | — | — | — | — | — | 1.8 | — |
| others | | | | | | | |

TABLE 17-continued

| comparative example | 1 | 2 | 3 | 4 | 5 | 6 | 7 |
|---|---|---|---|---|---|---|---|
| Titanium dioxide | 56.0 | 56.0 | 56.0 | 56.0 | 56.0 | 56.0 | 56.0 |
| MODAFLOW | 0.3 | 0.3 | 0.3 | 0.3 | 0.3 | 0.3 | 0.3 |
| xylene | 12.0 | 8.0 | 8.3 | 8.4 | — | 8.7 | 12.0 |
| n-butyl acetate | 3.0 | 2.0 | 2.6 | 3.1 | — | 6.0 | 1.5 |
| methyl ethyl ketone | — | — | — | — | 10.2 | — | — |
| storage stability | | | | | | | |
| viscosity (poise) | | | | | | | |
| initial | 1.0 | 1.0 | 1.0 | 1.0 | 1.0 | 1.0 | 1.0 |
| after 40° C. × 30 days | — | — | — | — | — | — | 1.1 |
| gelation days | 5 | 10 | 10 | 10 | 10 | 10 | — |
| knoop hardness | | | | | | | |
| initial | 12.1 | 12.0 | 10.5 | 10.3 | 11.2 | 9.0 | 12.1 |
| after 40° C. × 30 days | — | — | — | — | — | — | non curing |

TABLE 18

| example | 29 | 30 | 31 | 32 | 33 | 34 | 35 |
|---|---|---|---|---|---|---|---|
| composition weight parts | | | | | | | |
| (A) | | | | | | | |
| comp. A-2 | 100 | — | — | 100 | — | — | — |
| comp. A-3 | — | — | — | — | — | — | — |
| comp. A-4 | — | 50 | — | — | 50 | — | 29.4 |
| (B) | | | | | | | |
| comp. B-1 | — | 100 | — | — | 100 | — | — |
| comp. B-2 | 100 | — | — | 100 | — | — | — |
| CX-RS-1200 | — | — | — | — | — | — | 100 |
| (C) (a) | | | | | | | |
| thermal latent acid catalyst C-1 | 2.7 | — | — | — | — | — | — |
| thermal latent acid catalyst C-2 | — | 2.1 | — | — | — | — | — |
| thermal latent acid catalyst C-3 | — | — | 1.1 | — | — | — | — |
| thermal latent acid catalyst C-5 | — | — | — | 2.6 | — | — | — |
| thermal latent acid catalyst C-6 | — | — | — | — | 2.0 | — | 1.6 |
| thermal latent acid catalyst C-7 | — | — | — | — | — | 1.2 | — |
| (D) | | | | | | | |
| comp. D-1 | — | — | 100 | — | — | 100 | — |
| others | | | | | | | |
| MODAFLOW | 0.2 | 0.1 | 0.1 | 0.2 | 0.1 | 0.1 | 0.1 |
| xylene | 5.0 | 4.0 | 3.0 | 5.0 | 4.0 | 3.0 | 10.0 |
| n-butyl acetate | 1.0 | 1.0 | 1.0 | 1.0 | 1.0 | 1.0 | 2.2 |
| methyl ethyl ketone | — | — | — | — | — | — | — |

TABLE 19

| example | 36 | 37 | 38 | 39 | 40 | 41 |
|---|---|---|---|---|---|---|
| composition weight parts | | | | | | |
| (A) | | | | | | |
| comp. A-2 | — | — | — | — | — | — |
| comp. A-3 | 100 | — | — | — | — | — |
| comp. A-4 | — | 50 | 50 | — | 50 | — |
| (B) | | | | | | |
| comp. B-1 | 100 | 100 | 100 | — | 100 | — |
| comp. B-2 | — | — | — | — | — | — |
| CX-RS-1200 | — | — | — | — | — | — |
| (C) (a) | | | | | | |
| thermal latent acid catalyst C-10 | 9.0 | — | — | — | — | — |
| thermal latent acid catalyst C-11 | — | 6.8 | — | — | — | — |
| (C) (b) | | | | | | |
| thermal latent acid catalyst C-13 | — | — | — | 8.4 | — | — |
| thermal latent acid catalyst C-14 | — | — | 20.5 | — | — | — |
| (C) (c) (viii) | | | | | | |
| ALCH-TR-20 | — | — | — | — | 12.8 | 9.3 |
| (C) (c) (ix) | | | | | | |
| triphenyl methoxy silane | — | — | — | — | 1.8 | 1.3 |
| (D) | | | | | | |
| comp. D-1 | — | — | — | 100 | — | 100 |
| others | | | | | | |
| MODAFLOW | 0.1 | 0.1 | 0.1 | 0.1 | 0.1 | 0.1 |
| xylene | 10.3 | 5.3 | — | — | 8.7 | 6.3 |
| n-butyl acetate | 2.2 | 1.4 | — | — | 1.5 | 0.5 |
| methyl ethyl ketone | — | — | 5.0 | 6.6 | — | — |

TABLE 20

| example | 29 | 30 | 31 | 32 | 33 | 34 | 35 |
|---|---|---|---|---|---|---|---|
| cured film property | | | | | | | |
| acid resistance-1 | non abnormal | non abnormal | non abnormal | non abnormal | non abnormal | non abnormal | non abnormal |
| acid resistance-2 | non abnormal | non abnormal | non abnormal | non abnormal | non abnormal | non abnormal | non abnormal |
| acid resistance-3 | non abnormal | non abnormal | non abnormal | non abnormal | non abnormal | non abnormal | non abnormal |
| impact resistance | non abnormal | non abnormal | non abnormal | non abnormal | non abnormal | non abnormal | non abnormal |
| weathering resistance | non abnormal | non abnormal | non abnormal | non abnormal | non abnormal | non abnormal | non abnormal |
| knoop hardness | 11.2 | 11.2 | 11.6 | 11.0 | 11.2 | 11.2 | 11.6 |
| storage stability | | | | | | | |
| initial viscosity (poise) | 1.0 | 1.0 | 1.0 | 1.0 | 1.0 | 1.0 | 1.0 |
| viscosity after 40° C. × 30 days (poise) | 1.2 | 1.1 | 1.1 | 1.2 | 1.2 | 1.1 | 1.1 |
| knoop hardness after 40° C. × 30 days | 10.9 | 11.0 | 11.4 | 10.9 | 11.0 | 11.3 | 10.4 |

TABLE 21

| example | 36 | 37 | 38 | 39 | 40 | 41 |
|---|---|---|---|---|---|---|
| cured film property | | | | | | |
| acid resistance-1 | non abnormal | non abnormal | non abnormal | non abnormal | non abnormal | non abnormal |
| acid resistance-2 | non abnormal | non abnormal | non abnormal | non abnormal | non abnormal | non abnormal |
| acid resistance-3 | non abnormal | non abnormal | non abnormal | non abnormal | non abnormal | non abnormal |
| impact resistance | non abnormal | non abnormal | non abnormal | non abnormal | non abnormal | non abnormal |
| weathering resistance | non abnormal | non abnormal | non abnormal | non abnormal | non abnormal | non abnormal |
| knoop hardness | 9.4 | 9.1 | 8.1 | 8.5 | 11.4 | 11.1 |
| storage stability | | | | | | |
| initial viscosity (poise) | 1.0 | 1.0 | 1.0 | 1.0 | 1.0 | 1.0 |
| viscosity after 40° C. × 30 days (poise) | 1.8 | 1.3 | 1.3 | 2.1 | 1.9 | 2.2 |
| knoop hardness after 40° C. × 30 days | 9.0 | 8.8 | 7.8 | 8.2 | 10.5 | 10.3 |

TABLE 22

| comparative example | 8 | 9 | 10 | 11 | 12 | 13 | 14 |
|---|---|---|---|---|---|---|---|
| composition weight parts | | | | | | | |
| polycarboxylic acid comp. A-4 (a) (A) | — | 33.3 | 33.3 | 33.3 | 33.3 | 33.3 | — |
| comp. A-4 (B) | 50 | — | — | — | — | — | 50 |
| comp. B-1 | 100 | 100 | 100 | 100 | 100 | 100 | 100 |
| zinc octanoate | 0.9 | — | — | — | — | — | 0.9 |
| N-methyl-morpholine (C) (a) | — | — | — | — | — | — | 0.5 |
| thermal latent acid catalyst C-5 | — | 1.7 | — | — | — | — | — |
| thermal latent acid catalyst C-10 | — | — | 6.6 | — | — | — | — |
| thermal latent acid catalyst C-11 (C) (b) | — | — | — | 6.8 | — | — | — |
| thermal latent acid catalyst C-14 (C) (c) (viii) | — | — | — | — | 20.5 | — | — |
| ALCH-TR-20 (C) (c) (ix) | — | — | — | — | — | 12.8 | — |
| triphenyl methoxy silane | — | — | — | — | — | 1.8 | — |
| others | | | | | | | |

TABLE 22-continued

| comparative example | 8 | 9 | 10 | 11 | 12 | 13 | 14 |
|---|---|---|---|---|---|---|---|
| MODAFLOW | 0.1 | 0.1 | 0.1 | 0.1 | 0.1 | 0.1 | 0.1 |
| xylene | 3.0 | 2.0 | 4.2 | 4.4 | — | 8.7 | 2.5 |
| n-butyl acetate | 0.8 | 0.5 | 1.0 | 1.5 | — | 4.5 | 0.4 |
| methyl ethyl ketone | — | — | — | — | 18.1 | — | — |
| storage stability | | | | | | | |
| viscosity (poise) | | | | | | | |
| initial | 1.0 | 1.0 | 1.0 | 1.0 | 1.0 | 1.0 | 1.0 |
| after 40° C. × 30 days | — | — | — | — | — | — | 1.1 |
| gelation days | 5 | 10 | 10 | 10 | 10 | 10 | — |
| knoop hardness | | | | | | | |
| initial | 11.5 | 11.4 | 10.1 | 10.0 | 10.5 | 8.8 | 11.5 |
| after 40° C. × 30 days | — | — | — | — | — | — | non curing |

TABLE 23

| example | | 42 | 43 | 44 | 45 | 46 | 47 | 48 | 49 |
|---|---|---|---|---|---|---|---|---|---|
| composition weight parts | | | | | | | | | |
| (A) | comp.A-1 | 100 | — | — | — | 100 | — | 100 | — |
| | comp.A-2 | — | 100 | — | — | — | 100 | — | 100 |
| | comp.A-3 | — | — | 100 | — | — | — | — | — |
| | comp.A-4 | — | — | — | 50 | — | — | — | — |
| (B) | comp.B-1 | — | — | — | — | 100 | — | — | — |
| | comp.B-2 | — | 100 | — | — | — | — | — | 100 |
| | EX-421 | 15.5 | — | — | — | — | — | 15.5 | — |
| | PZ-33 | — | — | 16.1 | — | — | — | — | — |
| | CORONATE EH | — | — | — | — | 20.0 | — | — | — |
| | CYMEL 303 | — | — | — | — | — | 14.0 | — | — |
| (C) (a) | thermal latent acid catalyst C-1 | 1.7 | 2.7 | — | — | — | — | — | — |
| | thermal latent acid catalyst C-2 | — | — | 2.0 | — | — | — | — | — |
| | thermal latent acid catalyst C-3 | — | — | — | 1.5 | 1.5 | 1.4 | — | — |
| | thermal latent acid catalyst C-5 | — | — | — | — | — | — | 1.7 | 2.6 |
| (D) | comp.D-1 | — | — | — | — | — | — | — | — |
| others | Titanium dioxide | 52.4 | 80.0 | 52.9 | 56.0 | 56.0 | 51.2 | 52.4 | 80.0 |
| | MODAFLOW | 0.3 | 0.5 | 0.3 | 0.3 | 0.3 | 0.3 | 0.3 | 0.5 |

TABLE 24

| example | | 50 | 51 | 52 | 53 | 54 | 55 |
|---|---|---|---|---|---|---|---|
| composition weight parts | | | | | | | |
| (A) | comp.A-1 | — | — | 100 | — | — | — |
| | comp.A-2 | — | — | — | 100 | — | — |
| | comp.A-3 | 100 | — | — | — | 100 | — |
| | comp.A-4 | — | 50 | — | — | — | 50 |
| (B) | comp.B-1 | — | 100 | — | — | 100 | 100 |
| | comp.B-2 | — | — | — | — | — | — |
| | EX-421 | — | — | — | — | — | — |
| | PZ-33 | 16.1 | — | — | — | — | — |
| | CORONATE EH | — | — | 20.0 | — | — | — |
| | CYMEL 303 | — | — | — | 14.0 | — | — |
| (C) (a) | thermal latent acid catalyst C-6 | 1.8 | — | — | — | — | — |
| | thermal latent acid catalyst C-7 | — | 1.7 | 1.6 | 1.6 | — | — |
| | thermal latent acid catalyst C-10 | — | — | — | — | 9.0 | — |
| | thermal latent acid catalyst C-11 | — | — | — | — | — | 6.8 |
| (D) | comp.D-1 | — | — | — | — | — | — |
| others | Titanium dioxide | 52.9 | 56.0 | 56.0 | 51.2 | 80.0 | 56.0 |
| | MODAFLOW | 0.3 | 0.3 | 0.3 | 0.3 | 0.5 | 0.3 |

TABLE 25

| example | | 42 | 43 | 44 | 45 | 46 | 47 |
|---|---|---|---|---|---|---|---|
| steel plate | raw material | GF | GF | GF | GF | GI | GI |
| | chemical treating | Cr | Cr | Cr | Cr | P | P |
| under coating | coating | P-40 | SP-7 | SP-7 | P-40 | SP-7 | SP-7 |
| coating condition | curing:plate temp. × time | 230° C. × 40 sec | 200° C. × 40 sec | 200° C. × 40 sec | 230° C. × 40 sec | 200° C. × 40 sec | 200° C. × 40 sec |
| top coating condition | curing:plate temp. × time | 230° C. × 50 sec | 230° C. × 50 sec | 230° C. × 50 sec | 230° C. × 50 sec | 230° C. × 50 sec | 230° C. × 50 sec |
| process-ability | 2T | ⊙ | ○ | ○ | ⊙ | ○ | ○ |
| | 4T | ⊙ | ⊙ | ⊙ | ⊙ | ⊙ | ⊙ |
| impact resistance | | non abnormal | non abnormal | non abnormal | non abnormal | non abnormal | non abnormal |
| pencil hardness | | H | H | H | H | H | H |
| corrosion resistance | | | | | | | |
| | plane portion | ○ | ○ | ○ | ○ | ○ | ○ |
| | bended portion | ○ | ○ | ○ | ○ | ○ | ○ |
| | cross-cut portion | ○ | ○ | ○ | ○ | ○ | ○ |
| boiling water resistance | | ○ | ○ | ○ | ○ | ○ | ○ |
| weathering resistance | | non abnormal | non abnormal | non abnormal | non abnormal | non abnormal | non abnormal |
| acid resistance-1 | | non abnormal | non abnormal | non abnormal | non abnormal | non abnormal | non abnormal |
| acid resistance-2 | | non abnormal | non abnormal | non abnormal | non abnormal | non abnormal | non abnormal |
| acid resistance-3 | | non abnormal | non abnormal | non abnormal | non abnormal | non abnormal | non abnormal |
| marking ink stain resistance | | non abnormal | non abnormal | non abnormal | non abnormal | non abnormal | non abnormal |
| carbon stain resistance | | ⊙ | ⊙ | ⊙ | ⊙ | ⊙ | ⊙ |
| storage stability (30° C.) | initial viscosity | 120 sec | 120 sec | 120 sec | 120 sec | 120 sec | 120 sec |
| | viscosity after 30 days | 132 sec | 130 sec | 134 sec | 136 sec | 128 sec | 136 sec |
| | pencil hardness after 30 days | H | H | H | H | H | H |

TABLE 26

| example | | 48 | 49 | 50 | 51 | 52 | 53 |
|---|---|---|---|---|---|---|---|
| steel plate | raw material | GF | GF | GF | GF | GI | GI |
| | chemical treating | Cr | Cr | Cr | Cr | P | P |
| under coating | coating | P-40 | SP-7 | SP-7 | P-40 | SP-7 | SP-7 |
| coating condition | curing:plate temp. × time | 230° C. × 40 sec | 200° C. × 40 sec | 200° C. × 40 sec | 230° C. × 40 sec | 200° C. × 40 sec | 200° C. × 40 sec |
| top coating condition | curing:plate temp. × time | 230° C. × 50 sec | 230° C. × 50 sec | 230° C. × 50 sec | 230° C. × 50 sec | 230° C. × 50 sec | 230° C. × 50 sec |
| process-ability | 2T | ⊙ | ○ | ○ | ⊙ | ○ | ○ |
| | 4T | ⊙ | ⊙ | ⊙ | ⊙ | ⊙ | ⊙ |
| impact resistance | | non abnormal | non abnormal | non abnormal | non abnormal | non abnormal | non abnormal |
| pencil hardness | | H | H | H | H | H | H |
| corrosion resistance | | | | | | | |
| | plane portion | ○ | ○ | ○ | ○ | ○ | ○ |
| | bended portion | ○ | ○ | ○ | ○ | ○ | ○ |
| | cross-cut portion | ○ | ○ | ○ | ○ | ○ | ○ |
| boiling water resistance | | ○ | ○ | ○ | ○ | ○ | ○ |
| weathering resistance | | non abnormal | non abnormal | non abnormal | non abnormal | non abnormal | non abnormal |
| acid resistance-1 | | non abnormal | non abnormal | non abnormal | non abnormal | non abnormal | non abnormal |
| acid resistance-2 | | non abnormal | non abnormal | non abnormal | non abnormal | non abnormal | non abnormal |
| acid resistance-3 | | non abnormal | non abnormal | non abnormal | non abnormal | non abnormal | non abnormal |
| marking ink stain resistance | | non abnormal | non abnormal | non abnormal | non abnormal | non abnormal | non abnormal |
| carbon stain resistance | | ⊙ | ⊙ | ⊙ | ⊙ | ⊙ | ⊙ |
| storage | initial viscosity | 120 sec | 120 sec | 120 sec | 120 sec | 120 sec | 120 sec |

TABLE 26-continued

| example | | 48 | 49 | 50 | 51 | 52 | 53 |
|---|---|---|---|---|---|---|---|
| stability (30° C.) | viscosity after 30 days | 132 sec | 130 sec | 134 sec | 136 sec | 128 sec | 136 sec |
| | pencil hardness after 30 days | H | H | H | H | H | H |

TABLE 27

| | | example | | comparative example | |
|---|---|---|---|---|---|
| | | 54 | 55 | 15 | 16 |
| steel plate | raw material | GF | GF | GF | GI |
| | chemical treating | Cr | Cr | Cr | P |
| under coating | coating | SP-7 | P-40 | P-40 | SP-7 |
| coating condition | curing:plate temp. × time | 200° C. × 40 sec | 230° C. × 40 sec | 230° C. × 40 sec | 200° C. × 40 sec |
| top coating condition | curing:plate temp. × time | 230° C. × 50 sec | 230° C. × 50 sec | 230° C. × 50 sec | 210° C. × 50 sec |
| process-ability | 2T | ○ | ◎ | ◎ | ○ |
| | 4T | ◎ | ◎ | ◎ | ◎ |
| impact resistance | | non abnormal | non abnormal | non abnormal | non abnormal |
| pencil hardness | | H | H | H | H |
| corrosion resistance | | | | | |
| | plane portion | ○ | ○ | ○ | ○ |
| | bended portion | ○ | ○ | ○ | ○ |
| | cross-cut portion | ○ | ○ | ○ | ○ |
| boiling water resistance | | ○ | ○ | ○ | ○ |
| weathering resistance | | non abnormal | non abnormal | dulling | dulling |
| acid resistance-1 | | non abnormal | non abnormal | stain | stain |
| acid resistance-2 | | non abnormal | non abnormal | large stain | large stain |
| acid resistance-3 | | non abnormal | non abnormal | stain | stain |
| marking ink stain resistance | | non abnormal | non abnormal | stain | stain |
| carbon stain resistance | | ◎ | ◎ | X | X |
| storage stability (30° C.) | initial viscosity | 120 sec | 120 sec | 120 sec | 120 sec |
| | viscosity after 30 days | 140 sec | 138 sec | 145 sec | 150 sec |
| | pencil hardness after 30 days | H | H | H | H |

TABLE 28

| | | example | | | | comparative example | | |
|---|---|---|---|---|---|---|---|---|
| | | 91 | 92 | 93 | 94 | 21 | 22 | 23 |
| top coating condition | coatings | example 45 | example 51 | example 54 | example 55 | PRE 2120 W | PRE 3800 W | PRE 4600 W |
| | thickness (μm) | 40 | 30 | 30 | 40 | 20 | 20 | 20 |
| condition of surface of cured film | | non abnormal | non abnormal | non abnormal | non abnormal | general popping | general popping | general popping |

TABLE 29

| example | | 56 | 57 | 58 | 59 | 60 | 61 | 62 | 63 |
|---|---|---|---|---|---|---|---|---|---|
| composition weight parts | | | | | | | | | |
| (A) | comp.A-3 | 100 | 100 | — | 100 | 100 | — | 100 | — |
| | comp.A-4 | — | — | — | — | — | — | — | 50 |
| (B) | comp.B-1 | 100 | — | — | 100 | — | — | 100 | 100 |
| | KR-214 | — | 49.0 | — | — | 49.0 | — | — | — |
| (C) | thermal latent acid catalyst C-1 | — | 2.2 | 1.4 | — | — | — | — | — |
| | thermal latent acid catalyst C-4 | 2.5 | — | — | — | — | — | — | — |
| | thermal latent acid catalyst C-5 | — | — | — | — | 2.2 | 1.4 | — | — |
| | thermal latent acid catalyst C-8 | — | — | — | 2.5 | — | — | — | — |
| | thermal latent acid catalyst C-10 | — | — | — | — | — | — | 9.0 | — |
| | thermal latent acid catalyst C-11 | — | — | — | — | — | — | — | 6.8 |
| (D) | comp.D-1 | — | — | 100 | — | — | 100 | — | — |
| others | MODAFLOW | 0.5 | 0.3 | 0.3 | 0.5 | 0.3 | 0.3 | 0.5 | 0.3 |

TABLE 30

| example | | 56 | 57 | 58 | 59 | 60 | 61 |
|---|---|---|---|---|---|---|---|
| steel plate | raw material | GI | GL | GL | GI | GL | GL |
| | chemical treating | Cr | Cr | Cr | Cr | Cr | Cr |
| under coating | coating | SP-7 | SP-7 | PRE 3200 W | SP-7 | SP-7 | PRE 3200 W |
| condition | thickness (μm) | 5 | 5 | 15 | 5 | 5 | 15 |
| | curing:plate temp. × time | 200° C. × 40 sec | 200° C. × 40 sec | 230° C. × 50 sec | 200° C. × 40 sec | 200° C. × 40 sec | 230° C. × 50 sec |
| intermediate coating condition | | PRE 3800 W | PRE 3800 W | — | PRE 3800 W | PRE 3800 W | — |
| process-ability | 2T | ○ | ○ | ○ | ○ | ○ | ○ |
| | 4T | ◉ | ◉ | ◉ | ◉ | ◉ | ◉ |
| impact resistance | | non abnormal | non abnormal | non abnormal | non abnormal | non abnormal | non abnormal |
| pencil hardness | | H | H | H | H | H | H |
| corrosion resistance | | | | | | | |
| | plane portion | ○ | ○ | ○ | ○ | ○ | ○ |
| | bended portion | ○ | ○ | ○ | ○ | ○ | ○ |
| | cross-cut portion | ○ | ○ | ○ | ○ | ○ | ○ |
| boiling water resistance | | ○ | ○ | ○ | ○ | ○ | ○ |
| weathering resistance | | non abnormal | non abnormal | non abnormal | non abnormal | non abnormal | non abnormal |
| acid resistance-1 | | non abnormal | non abnormal | non abnormal | non abnormal | non abnormal | non abnormal |
| acid resistance-2 | | non abnormal | non abnormal | non abnormal | non abnormal | non abnormal | non abnormal |
| acid resistance-3 | | non abnormal | non abnormal | non abnormal | non abnormal | non abnormal | non abnormal |
| marking ink stain resistance | | non abnormal | non abnormal | non abnormal | non abnormal | non abnormal | non abnormal |
| carbon stain resistance | | ◉ | ◉ | ◉ | ◉ | ◉ | ◉ |
| storage stability (30° C.) | initial viscosity | 120 sec | 120 sec | 120 sec | 120 sec | 120 sec | 120 sec |
| | viscosity after 30 days | 133 sec | 134 sec | 131 sec | 133 sec | 134 sec | 131 sec |
| | pencil hardness after 30 days | H | H | H | H | H | H |

TABLE 31

| example | | 62 | 63 |
|---|---|---|---|
| steel plate under coating condition | raw material | GI | GL |
| | chemical treating | Cr | Cr |
| | coating | SP-7 | PRE 3200 W |
| | thickness (μm) | 5 | 15 |
| | curing:plate temp. × time | 200° C. × 40 sec | 230° C. × 50 sec |
| intermediate coating condition | | PRE 3800 W | — |
| process- ability | 2T | ○ | ○ |
| | 4T | ◉ | ◉ |
| impact resistance | | non abnormal | non abnormal |
| pencil hardness | | H | H |
| corrosion resistance test | plane portion | ○ | ○ |
| | bended portion | ○ | ○ |
| | cross-cut portion | ○ | ○ |
| boiling water test | | ○ | ○ |
| weathering resistance | | non abnormal | non abnormal |
| acid resistance-1 | | non abnormal | non abnormal |
| acid resistance-2 | | non abnormal | non abnormal |
| acid resistance-3 | | non abnormal | non abnormal |
| marking ink stain resistance | | non abnormal | non abnormal |
| carbon stain resistance | | ◉ | ◉ |
| storage stability (30° C.) | initial viscosity | 120 sec | 120 sec |
| | viscosity after 30 days | 137 sec | 135 sec |
| | pencil hardness after 30 days | H | H |

TABLE 32

| example | | 64 | 65 | 66 | 67 | 68 |
|---|---|---|---|---|---|---|
| composition weight parts | | | | | | |
| (A) | comp.A-5 | 100 | 100 | 100 | 100 | 100 |
| | comp.A-6 | — | — | — | — | — |
| (B) | comp.B-3 | 175 | — | — | 158 | — |
| | YD-128 | — | 70 | — | — | 70 |
| | GT-302 | — | — | — | — | — |
| | KF-101 | — | — | 120 | — | — |
| | X-22-169AS | — | — | — | — | — |
| | CYMEL 303 | — | — | — | 17.0 | — |
| | MSTEP2 | — | — | — | — | — |
| (C) | zinc octanoate | — | 2.3 | — | — | — |
| | tin octanoate | — | 1.2 | — | — | — |
| | thermal latent acid catalyst C-6 | 8.6 | — | — | — | 8.4 |
| | thermal latent acid catalyst C-7 | — | — | 5.8 | 7.5 | — |
| (D) | comp.D-2 | — | — | — | — | 100 |
| others | MODAFLOW | 0.7 | 0.4 | 0.6 | 0.7 | 0.7 |
| non-volatile matter (weight %) | | 87.7 | 87.4 | 85.7 | 85.9 | 85.0 |
| cured film property | acid resistance-1 | non abnormal | non abnormal | non abnormal | non abnormal | non abnormal |
| | acid resistance-2 | non abnormal | non abnormal | non abnormal | non abnormal | non abnormal |
| | acid resistance-3 | non abnormal | non abnormal | non abnormal | non abnormal | non abnormal |
| | impact resistance | non abnormal | non abnormal | non abnormal | non abnormal | non abnormal |
| | weathering resistance | non abnormal | non abnormal | non abnormal | non abnormal | non abnormal |
| | knoop hardness | 10.7 | 16.3 | 16.5 | 11.4 | 16.7 |

TABLE 33

| | | Example | | | |
|---|---|---|---|---|---|
| | | 69 | 70 | 71 | 72 |
| compsition weight parts | | | | | |
| (A) | comp. A - 5 | — | — | — | — |
| | comp. A - 6 | 100 | 100 | 100 | — |
| (B) | comp. B - 3 | — | — | 165 | — |
| | YD - 128 | — | — | — | — |
| | GT - 302 | 70 | — | — | — |
| | KF - 101 | — | — | — | — |
| | X - 22 - 169AS | — | 180 | — | — |
| | CYMEL 303 | — | — | — | — |
| | MSTEP2 | — | — | 10.0 | — |
| (C) | zinc octanoate | — | — | — | — |
| | tin octanoate | — | — | — | — |
| | thermal latent acid catalyst C - 6 | 4.7 | — | 8.5 | — |
| | thermal latent acid catalyst C - 7 | — | 7.5 | — | 3.1 |
| (D) | comp. D - 2 | — | — | — | 100 |
| others | MODAFLOW | 0.4 | 0.7 | 0.7 | 0.3 |
| non-volatile matter (weight %) | | 85.8 | 86.4 | 86.9 | 85.2 |
| cured film property | acid resistance - 1 | non abnormal | non abnormal | non abnormal | non abnormal |
| | acid resistance - 2 | non abnormal | non abnormal | non abnormal | non abnormal |
| | acid resistance - 3 | non abnormal | non abnormal | non abnormal | non abnormal |
| | impact resistance | non abnormal | non abnormal | non abnormal | non abnormal |

TABLE 33-continued

|  | Example | | | |
|---|---|---|---|---|
|  | 69 | 70 | 71 | 72 |
| weathering resistance | non abnormal | non abnormal | non abnormal | non abnormal |
| knoop hardness | 22.0 | 18.0 | 15.7 | 14.5 |

TABLE 34

|  |  | comparative example | |
|---|---|---|---|
|  |  | 17 | 18 |
| composition weight parts | comp. A - 5 (a) | 100 | — |
|  | comp. A - 6 (a) | — | 100 |
|  | comp. B - 3 | 255 | — |
|  | GT - 302 | — | 125 |
|  | thermal latent acid catalyst C - 6 | 12.5 | 9.0 |
|  | MODAFLOW | 1.1 | 0.8 |

TABLE 35

|  |  | example | | | |
|---|---|---|---|---|---|
|  |  | 73 | 74 | 75 | 76 |
| steel plate | | | | | |
| raw material | | GI | GL | GL | GL |
| chemical treating under coating condition | | Cr | Cr | Cr | Cr |
| coatings | | SP-7 | SP-7 | PRE 3200W | PRE 3800W |
| thickness (μm) | | 5 | 5 | 15 | 15 |
| curing: plate temp. × time | | 200° C. × 40 sec | 200° C. × 40 sec | 230° C. × 50 sec | 210° C. × 50 sec |
| intermadiate coat | | PRE 3800W | PRE 3800W | — | — |
| top coat | | examp. 64 | examp. 68 | examp. 66 | examp. 71 |
| processability | | | | | |
| 2T | | ○ | ○ | ○ | ○ |
| 4T | | ⊙ | ⊙ | ⊙ | ⊙ |
| impact resistance | | non abnormal | non abnormal | non abnormal | non abnormal |
| pencil hardness | | H | H | H | H |
| corrosion resistance | | | | | |
| plane portion | | ○ | ○ | ○ | ○ |
| bended portion | | ○ | ○ | ○ | ○ |
| cross-cut portion | | ○ | ○ | ○ | ○ |
| boiling water resistance | | ○ | ○ | ○ | ○ |
| weathering resistance | | non abnormal | non abnormal | non abnormal | non abnormal |
| acid resistance - 1 | | non abnormal | non abnormal | non abnormal | non abnormal |
| acid resistance - 2 | | non abnormal | non abnormal | non abnormal | non abnormal |
| acid resistance - 3 | | non abnormal | non abnormal | non abnormal | non abnormal |
| marking ink stain resistance | | non abnormal | non abnormal | non abnormal | non abnormal |
| carbon stain resistance | | ⊙ | ⊙ | ⊙ | ⊙ |

TABLE 36

|  |  |  | example | | |
|---|---|---|---|---|---|
|  |  |  | 77 | 78 | 79 |
| composition weight parts | | | | | |
| main material | (A) | comp. A - 1 | 100.0 | — | — |
|  |  | comp. A - 2 | — | 50.0 | — |
| compo-sition solution | (B) | comp. B - 1 | — | 100.0 | — |
|  |  | EX - 421 | 15.5 | — | — |
|  | (D) | comp. D - 1 | — | — | 100.0 |
|  | others | titanium dioxide | 52.4 | 56.0 | 40.0 |
|  |  | MODAFLOW | 0.3 | 0.3 | 0.3 |
| acid catalyst solution | | acid catalyst C - 17 | — | — | 10.5 |
|  | | 10 weight % solution of PTSA in isopropanol | 9.6 | — | — |
|  | | 10 weight % solution of zinc chloride in isopropanol | — | 8.4 | — |
| cured film property | | | | | |
| acid resistance - 1 | | | non abnormal | non abnormal | non abnormal |
| acid resistance - 2 | | | non abnormal | non abnormal | non abnormal |
| acid resistance - 3 | | | non abnormal | non abnormal | non abnormal |
| impact resistance | | | non abnormal | non abnormal | non abnormal |
| weathering resistance | | | non abnormal | non abnormal | non abnormal |
| knoop hardness | | | 6.9 | 8.3 | 7.5 |

TABLE 37

|  |  |  |  | example | |
|---|---|---|---|---|---|
|  |  |  |  | 80 | 81 |
| composition weight parts | main material composition solution | (A) | comp. A - 2 | 50.0 | — |
|  |  | (B) | comp. B - 2 | 100.0 | — |
|  |  | (D) | comp. D - 1 | — | 100.0 |
|  |  | others | MODAFLOW | 0.1 | 0.1 |
|  | acid catalyst solution | | acid catalyst C - 17 | — | 10.5 |
|  |  | | 10 weight % solution of zinc chloride in isopropanol | 8.4 | — |

TABLE 38

|  |  | example | |
|---|---|---|---|
|  |  | 80 | 81 |
| cured film property | acid resistance - 1 | non abnormal | non abnormal |
|  | acid resistance - 2 | non abnormal | non abnormal |
|  | acid resistance - 3 | non abnormal | non abnormal |
|  | impact resistance | non abnormal | non abnormal |
|  | weathering resistance | non abnormal | non abnormal |
|  | knoop hardness | 8.1 | 7.2 |

TABLE 39

| | | example | | | | |
|---|---|---|---|---|---|---|
| | | 82 | 83 | 84 | 85 | 86 |
| composition weight parts | | | | | | |
| (A) | comp. A - 5 | 100 | 100 | 100 | 36.4 | 36.4 |
| (B) | YD - 128 | 175 | 88 | 88 | 63.6 | 63.6 |
| | KF - 101 | — | 60 | 60 | — | — |
| (C) | thermal latent acid catalyst C - 7 | 7.5 | 6.6 | — | 10.0 | — |
| | thermal latent acid catalyst C - 10 | — | — | 10.5 | — | — |
| | thermal latent acid catalyst C- 11 | — | — | — | — | 16.4 |
| others | CRT - D | — | — | — | 220.0 | 220.0 |
| | MF3A | — | — | — | 45.0 | 45.0 |
| izod impact value (kg · cm/cm) | | 3 | 4 | 3 | 10 | 9 |
| flexural strength (kg/cm$^2$) | | 700 | 800 | 750 | 1500 | 1300 |
| flexural modulus (kg/cm$^2$) | | 14000 | 16000 | 15000 | 40000 | 39000 |
| coefficient of linear thermal expansion (× 10$^{-5}$/°C.) | | 7.0 | 6.5 | 6.8 | 2.5 | 2.8 |
| volume resistivity (25° C. Ω · cm) | | 5 × 10$^{16}$ | 5 × 10$^{16}$ | 5 × 10$^{16}$ | 5 × 10$^{16}$ | 5 × 10$^{16}$ |
| Corrosion resistance of enamel wire conductor (60° C. 95% RH, days) | | >15 | >15 | >15 | — | — |
| Corrosion resistance of core (60° C. 95% RH, after 5 days) | | ○ | ○ | ○ | — | — |

TABLE 40

| compound | | E - 1 |
|---|---|---|
| xylene weight parts | | 40.0 |
| dropping composition weight parts | monomer E - 1 (a) | 35.90 |
| | n-butyl methacrylate | 20.00 |
| | methyl methacrylate | 19.20 |
| | 2-ethylhexylacrylate | 25.40 |
| | n-butyl acetate | 53.50 |
| | 2,2'-azo-bis-isobutyronitrile | 2.00 |
| additional catalyst weight parts | n-butyl acetate | 3.80 |
| | 2,2'-azo-bis-isobutyronitrile | 0.20 |
| charac- teristic | non-volatile matter (weight %) | 50.7 |
| | Gardener viscosity (25° C.) | O |

TABLE 41

| | | example | | | |
|---|---|---|---|---|---|
| | | 87 | 88 | 89 | 90 |
| composition weight parts | comp. E - 1 | 100 | 100 | 100 | 100 |
| | CY - 179 | — | 25.0 | — | — |
| | thermal latent acid catalyst C - 10 | 4.2 | — | — | — |
| | thermal latent acid catalyst C - 11 | — | 6.4 | — | — |
| | thermal latent acid catalyst C - 15 | — | — | 13.1 | — |
| | thermal latent acid catalyst C - 16 | — | — | — | 6.6 |
| | methyl ethyl ketone | 5.1 | 12.0 | 0.2 | 6.7 |
| knoop hardness | | 7.1 | 9.0 | 7.5 | 7.2 |
| storage stability | initial viscosity (poise) | 1.0 | 1.0 | 1.0 | 1.0 |
| | viscosity after 40° C. × 30 days (poise) | 1.8 | 1.5 | 1.2 | 1.3 |

TABLE 42

| | | comparative example | |
|---|---|---|---|
| | | 19 | 20 |
| composition weight parts | comp. E - 1 | 100 | 100 |
| | 5 weight % solution of zinc chloride in methyl ethyl ketone | — | 10.6 |
| | methyl ethyl ketone | 13.3 | 2.7 |
| knoop hardness | | non curing | 7.8 |
| storage stability | initial viscosity (poise) | 1.0 | 1.0 |
| | viscosity after 40° C. × 30 days (poise) | 1.0 | gelatination after 3 days |

What is claimed is:

1. A thermosetting composition which comprises:

(A) a compound having in the molecule two or more functional groups of the formula (1):

(1)

wherein $R^1$, $R^2$ and $R^3$ are each selected from the group consisting of a hydrogen atom and an organic group of 1 to 18 carbon atoms, $R^4$ is an organic group of 1 to 18 carbon atoms, $Y^1$ is selected from the group consisting of an oxygen atom and a sulfur atom, wherein $R^3$ and $R^4$ are optionally bonded with each other to form a heterocyclic structure which comprises $Y^1$ as the hereto atom component;

(B) a compound having in the molecule two or more reactive functional groups which can form chemical bonds with the functional groups of the compound (A), the reactive functional groups of the compound (B) being at least one compound selected from the group consisting of an epoxy group, an oxazoline group, a silanol group, an alkoxysilane group, a hydroxyl group, an amino group, an imino group, an unblocked isocyanate group, a blocked isocyanate group, a cyclocarbonate group, a vinyl ether group, a vinyl thioether group, an aminomethylol group which is optionally alkylated, an acetal group and a ketal group; the functional groups of the formula (1) of the compound (A) and the reactive functional groups of the compound (B) being in a ratio of 0.2:1.0 to 1.0:0.2; and (C) a catalytic component which is at least one component selected from the group consisting of:

(a) a thermal latent acid catalyst which comprises (i) a compound having one or more epoxy groups, (ii) a compound having a sulfur atom of formula (2):

$$R^5\text{—}S\text{—}R^6 \tag{2}$$

wherein $R^5$ and $R^6$ are each selected from the group consisting of a hydrogen atom and an organic group of 1 to 40 carbon atoms, $R^5$ and $R^6$ are the same or different from each other, or $R^5$ and $R^6$ are bonded with each other to form a cyclic structure; and (iii) a Lewis acid of formula (3):

$$(X^1)_n\text{-}M^1\text{-}(R^7)_{n2} \tag{3}$$

wherein $M^1$ is an atom selected from the group consisting of a boron atom, an aluminum atom, a tin atom, a lead atom and a transition element, $X^1$ is one or more halogen atoms, $R^7$ is one or more of an organic group of 1 to 40 carbon atoms, or $R^7$ forms a chelate ring by coordinating to the $M^1$ atom, n1 and n2 are each an integer from 0 to 6, and n1 plus n2 is an integer from 1 to 6 corresponding to the valency of $M^1$; and optionally, (iv) a carboxylic acid compound and/or a carboxylic acid anhydride compound, the Lewis acid (iii) being in an amount of 0.01 to 20 weight parts based on 100 weight parts of the total solid component which is the sum of the compound (A) and the compound (B); a ratio of the epoxy groups of the compound (i) to the $M^1$ atoms of the Lewis acid (iii) being 0.2 to 10 and a ratio of the sulfur atoms of the compound (ii) to the $M^1$ atoms of the Lewis acid (iii) being 0.2 to 10;

(b) a thermal latent acid catalyst which comprises (v) a compound of formula (4):

$$(R^8)_{n3}\text{—}Y^2 \tag{4}$$

wherein $Y^2$ is selected from the group consisting of a nitrogen atom, an oxygen atom, a phosphorus atom and a sulfur atom, $R^8$ is one or more of an organic group of 1 to 12 carbon atoms and is selected from the group consisting of an alkyl group, an alkenyl group, an aryl group, an alkaryl group and an alkanol group, or two of $R^8$ are bonded with each other to form a heterocyclic structure which comprises $Y^2$ as the hetero atom component, and n3 is an integer of 2 or 3 corresponding to the valency of $Y^2$; (vi) a compound having a halogen atom of formula (5):

$$R^9\text{—}X^2 \tag{5}$$

wherein $R^9$ is an organic group of 1 to 12 carbon atoms and is selected from the group consisting of an unsubstituted benzyl group, a substituted benzyl group, an unsubstituted allyl group, a substituted allyl group, an unsubstituted cycloalkyl group, a substituted cycloalkyl group, an unsubstituted secondary alkyl group, a substituted secondary alkyl group, an unsubstituted tertiary alkyl group and a substituted tertiary alkyl group, and $X^2$ is a halogen atom; and (vii) a Lewis acid of formula (6):

$$(X^3)_{n4}\text{-}M^2\text{-}(R^{10})_{n3} \tag{6}$$

wherein $M^2$ is an atom selected from the group consisting of an aluminum atom, a zinc atom and a tin atom, $X^3$ is one or more halogen atoms, $R^{10}$ is one or more of an organic group of 1 to 20 carbon atoms, or $R^{10}$ forms a chelate ring by coordinating to the $M^2$ atom, n4 and n5 are each an integer from 0 to 6, and n4 plus n5 equals an integer of 1 to 6 corresponding to the valency of $M^2$, the Lewis acid (vii) being in an amount of 0.01 to 20 weight parts based on 100 weight parts of the total solid component which is the sum of the compound (A) and the compound (B), a ratio of the $Y^2$ atoms of the compound (v) to the $M^2$ atoms of the Lewis acid (vii) being 0.5 to 10 and a ratio of the $X^2$ atoms of the compound (vi) to the $M^2$ atoms of the Lewis acid (vii) being 0.5 to 10; and (c) a mixture comprising (viii) a metallic chelate compound formed from a chelating agent selected from the group consisting of an alkylacetoacetate and an acetylacetone; and (ix) an organic silicon compound of formula (7) or a condensate thereof:

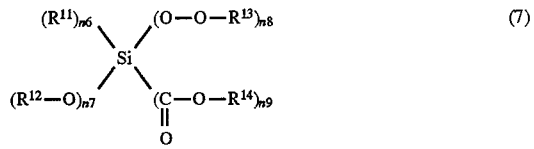

wherein $R^{11}$ is an organic group of 1 to 18 carbon atoms and is selected from the group consisting of an alkyl group, an aryl group and an alkenyl group, $R^{12}$ is a hydrogen atom or an organic group of 1 to 18 carbon atoms which is selected from the group consisting of an alkyl group, an aryl group and an alkaryl group, $R^{13}$ and $R^{14}$ are each an organic group of 1 to 18 carbon atoms and are each selected from the group consisting of an alkyl group and an aryl group, n6, n7, n8 and n9 are each an integer from 0 to 4, and the total of n6, n7, n8 and n9 equals 4, the metallic chelate compound (viii) being in an amount of 0.01 to 20 weight parts based on 100 weight parts of the total solid component which is the sum of the compound (A) and the compound (B), a ratio of the silicon atoms of the compound (ix) to the metallic atoms of the compound (viii) being 0.2 to 10.

2. A two component composition curable at temperatures of not less than 0° C. and less than 50° C. which is prepared by mixing:

(I) a main material composition or a solution thereof comprising (A) a compound having in the molecule two or more functional groups of the formula (1):

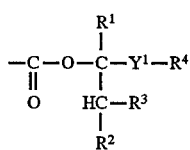

(1)

wherein $R^1$, $R^2$ and $R^3$ are each selected from the group consisting of a hydrogen atom and an organic group of 1 to 18 carbon atoms, $R^4$ is an organic group of 1 to 18 carbon atoms, $Y^1$ is selected from the group consisting of an oxygen atom and a sulfur atom and, wherein $R^3$ and $R^4$ are optionally bonded with each other to form a heterocyclic structure which comprises $Y^1$ as the hereto atom component; and (B) a compound having in the molecule two or more reactive functional groups which can form chemical bonds with the functional groups of the compound (A), the reactive functional groups of the compound (B) being at least one compound selected from the group consisting of an epoxy group, an oxazoline group, a silanol group, an alkoxysilane group, a hydroxyl group, an amino group, an imino group, an unblocked isocyanate group, a blocked isocyanate group, a cyclocarbonate group, a vinyl ether group, a vinyl thioether group, an aminomethylol group which is optionally alkylated, an acetal group and a ketal group, the functional groups of the formula (1) of the compound (A) and the reactive functional groups of the compound (B) being in a ratio of 0.2:1.0 to 1.0:0.2; and (II) an acid catalyst or a solution thereof comprising a mixture of a compound having a silanol group and a metallic chelate compound formed from a chelating agent selected from the group consisting of an alkylacetoacetate and an acetylacetone.

3. The composition as claimed in claim 1, or claim 2, wherein the compound (A) and/or the compound (B) are a polymer of an $\alpha,\beta$-unsaturated compound.

4. The composition as claimed in claim 1, or claim 2, wherein the compound (A) and/or the compound (B) are a polyester resin.

5. A thermosetting composition which comprises:

(D) a self-crosslinkable compound having in the molecule one or more functional groups ($\alpha$) of the formula (8):

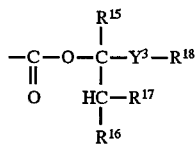

(8)

wherein $R^{15}$, $R^{16}$ and $R^{17}$ are each selected from the group consisting of a hydrogen atom and an organic group of 1 to 18 carbon atoms, $R^{18}$ is an organic group of 1 to 18 carbon atoms, $Y^3$ is selected from the group consisting of an oxygen atom and a sulfur atom, wherein $R^{17}$ and $R^{18}$ are optionally bonded with each other to form a heterocyclic structure which comprises $Y^3$ as the hetero atom component; and one or more reactive functional groups ($\beta$) which can form chemical bonds with the functional groups ($\alpha$), the reactive functional groups ($\beta$) being at least one compound selected from the group consisting of an epoxy group, an oxazoline group, a silanol group, an alkoxysilane group, a hydroxyl group, an amino group, an imino group, an unblocked isocyanate group, a blocked isocyanate group, a cyclocarbonate group, a vinyl ether group, a vinyl thioether group, an aminomethylol group which is optionally alkylated, an acetal group and a ketal group; the functional groups ($\alpha$) of the formula (8) and the reactive functional groups ($\beta$) being in a ratio of 0.2:1.0 to 1.0:0.2; optionally a component selected from the group consisting of (A) a compound having in the molecule two or more functional groups of the formula (1):

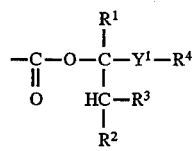

(1)

wherein $R^1$, $R^2$ and $R^3$ are each selected from the group consisting of a hydrogen atom and an organic group of 1 to 18 carbon atoms, $R^4$ is an organic group of 1 to 18 carbon atoms, $Y^1$ is selected from the group consisting of an oxygen atom and a sulfur atom, wherein $R^3$ and $R^4$ are optionally bonded with each other to form a heterocyclic structure which comprises $Y^1$ as the hetero atom component, (B) a compound having in the molecule two or more reactive functional groups which can form chemical bonds with either one or both of the functional group of the formula (8) and the functional group of the formula (1), and mixtures of the compounds (A) and (B), the compound (B) being at least one compound selected from the group consisting of an epoxy group, an oxazoline group, a silanol group, an alkoxysilane group, a hydroxyl group, an amino group, an imino group, an unblocked isocyanate group, a blocked isocyanate group, a cyclocarbonate group, a vinyl ether group, a vinyl thioether group, an aminomethylol group which is optional alkylated, an acetal group and a ketal group;

(C) a catalytic component which is at least one component selected from the group consisting of:
(a) a thermal latent acid catalyst which comprises (i) a compound having one or more epoxy groups, (ii) a compound having a sulfur atom of formula (2):

(2)

wherein $R^5$ and $R^6$ are each selected from the group consisting of a hydrogen atom and an organic group of 1 to 40 carbon atoms, $R^5$ and $R^6$ are the same or different each other, or $R^5$ and $R^6$ are bonded with each other to form a cyclic structure; and (iii) a Lewis acid of formula (3):

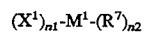

(3)

wherein $M^1$ an atom is selected from the group consisting of a boron atom, an aluminum atom, a tin atom, a lead atom and a transition element, $X^1$ is one or more halogen atoms, $R^7$ is one or more of an organic group of 1 to 40 carbon atoms, or $R^7$ forms a chelate ring by coordinating to the $M^1$ atom, n1 and n2 are each an integer from 0 to 6, and n1 plus n2 is an integer from 1 to 6 corresponding to the valency of $M^1$; and optionally, (iv) a carboxylic acid compound and/or a carboxylic acid anhydride compound, the Lewis acid (iii) being in an amount of 0.01 to 20 weight parts based on 100 weight parts of the total solid component which is the sum of the compound (D) and an optional component selected from the group consisting of a compound (A), a compound (B) and both compounds (A) and (B); a ratio of the epoxy groups of the compound (i) to the $M^1$ atoms of the Lewis acid (iii) being 0.2 to 10 and a ratio of the sulfur atoms of the compound (ii) to the $M^1$ atoms of the Lewis acid (iii) being 0.2 to 10;

(b) a thermal latent acid catalyst which comprises (v) a compound of formula (4):

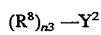            (4)

wherein $Y^2$ is selected from the group consisting of a nitrogen atom, an oxygen atom, a phosphorus atom and a sulfur atom, $R^8$ is one or more of an organic group selected from the group consisting of an alkyl group, an alkenyl group, an aryl group, an alkaryl group and an alkanol group, having 1 to 12 carbon atoms, or two of $R^8$ are bonded with each other to form a heterocyclic structure which comprises $Y^2$ as the hetero atom component, and n3 is an integer of 2 or 3 corresponding to the valency of $Y^2$; (vi) a compound having a halogen atom of formula (5):

            (5)

wherein $R^9$ is an organic group having 1 to 12 carbon atoms and is selected from the group consisting of an unsubstituted benzyl group, a substituted benzyl group, an unsubstituted allyl group, a substituted allyl group, an unsubstituted cycloalkyl group, a substituted cycloalkyl group, an unsubstituted secondary alkyl group, a substituted secondary alkyl group, an unsubstituted tertiary alkyl group and a substituted tertiary alkyl group, and $X^2$ is a halogen atom; and (vii) a Lewis acid of formula (6):

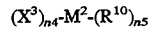            (6)

wherein $M^2$ is an atom selected from the group consisting of an aluminum atom, a zinc atom and a tin atom, $X^3$ is one or more halogen atoms, $R^{10}$ is one or more of an organic group of 1 to 20 carbon atoms, or $R^{10}$ forms a chelate ring by coordinating to the $M^2$ atom, n4 and n5 are each an integer from 0 to 6, and n4 plus n5 equals an integer of 1 to 6 corresponding to the valency of $M^2$, the Lewis acid (vii) being in an amount of 0.01 to 20 weight parts based on 100 weight parts of the total solid component which is the sum of the compound (D) and an optional component selected from the group consisting of the compound (A), the compound (B) and mixtures of the compounds (A) and (B), a ratio of the $Y^2$ atoms of the compound (v) to the $M^2$ atoms of the Lewis acid (vii) being 0.5 to 10 and a ratio of the $X^2$ atoms of the compound (vi) to the $M^2$ atoms of the Lewis acid (vii) being 0.5 to 10; and (c) a mixture comprising (viii) a metallic chelate compound formed from a chelating agent selected from the group consisting of an alkylacetatoacetate and an acetylacetone; and (ix) an organic silicon compound of formula (7) or a condensate thereof:

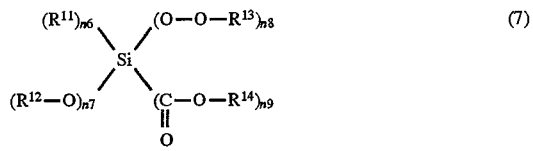            (7)

wherein $R^{11}$ is selected from the group consisting of an alkyl group, an aryl group and an alkenyl group, having 1 to 18 carbon atoms, $R^{12}$ is selected from the group consisting of a hydrogen atom, and an organic group having 1 to 18 carbons and is selected from the group consisting of an alkyl group, an aryl group and an alkaryl group, $R^{13}$ and $R^{14}$ are each an organic group having 1 to 18 carbon atoms and is selected from the group consisting of an alkyl group and an aryl group, n6, n7, n8 and n9 are each an integer from 0 to 4, and the total of n6, n7, n8 and n9 equals 4; the metallic chelate compound (viii) being in an amount of 0.01 to 20 parts by weight based on 100 weight parts of the total solid component which is the sum of the compound (D) and said optional component, a ratio of the silicon atoms of the compound (ix) to the metallic atoms of the compound (viii) being 0.2 to 10.

6. A two component composition curable at temperatures of not less than 0° C. and less than 50° C. which is prepared by mixing:

(I) a main material composition or a solution thereof comprising (D) self-crosslinkable compound having in the molecule one or more functional groups (α) of the formula (8):

            (8)

wherein $R^{15}$, $R^{16}$ and $R^{17}$ are each selected from the group consisting of a hydrogen atom and an organic group of 1 to 18 carbon atoms, $R^{18}$ is an organic group of 1 to 18 carbon atoms, $Y^3$ is selected from the group consisting of an oxygen atom and a sulfur atom, wherein $R^{17}$ and $R^{18}$ are optionally bonded with each other to form a heterocyclic structure which comprises $Y^3$ as the hetero atom component; and one or more reactive function groups (β) which can form chemical bonds with the functional group (α), the reactive functional group (β) being at least one compound selected from the group consisting of an epoxy group, an oxazoline group, a silanol group, an alkoxysilane group, a hydroxyl group, an amino group, an imino group, an unblocked isocyanate group, a blocked isocyanate group, a cyclocarbonate group, a vinyl ether group, a vinyl thioether group, an aminomethylol group which is optionally alkylated, an acetal group and a ketal group; and optionally a component selected from the group consisting of (A) a compound having in the molecule two or more functional groups of the formula (1):

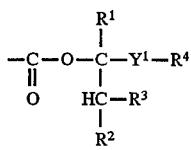

(1)

wherein $R^1$, $R^2$ and $R^3$ are each selected from the group consisting of a hydrogen atom and an organic group of 1 to 18 carbon atoms, $R^4$ is an organic group of 1 to 18 carbon atoms, $Y^1$ is selected from the group consisting of an oxygen atom and a sulfur atom or $R^3$ and $R^4$ are bonded with each other to form a heterocyclic structure which comprises $Y^1$ as the hetero atom component, (B) a compound having in the molecule two or more reactive functional groups which can form chemical bonds with either one or both of the functional group of the formula (8) and the functional group of the formula (1), the reactive functional groups of the compound (B) being at least one compound selected from the group consisting of an epoxy group, an oxazoline group, a silanol group, an alkoxysilane group, a hydroxyl group, an amino group, an imino group, an unblocked isocyanate group, a blocked isocyanate group, a cyclocarbonate group, a vinyl ether group, a vinyl thioether group, an aminomethylol group which is optionally alkylated, an acetal group and a ketal group, and mixtures of the compounds (A) and (B), the functional groups of the formula (1) of the compound (A) and the reactive functional groups of the compound (B) being in a ratio of 0.2:1.0 to 1.0:2; and (II) an acid catalyst or a solution thereof comprising a mixture of a compound having a silanol group and a metallic chelate compound formed from a chelating agent selected from the group consisting of an alkylacetoacetate and an acetylacetone.

7. The composition as claimed in claim 5, or claim 6, wherein at least one of the compound (D) and the compound (A) and/or the compound (B) are a polymer of an α,β-unsaturated compound.

8. The curable composition as claimed in claim 5, or claim 6, wherein at least one of the compound (D) and the compound (A) and/or the compound (B) are a polyester resin.

9. The thermosetting composition as claimed in claim 1, wherein the compound (A) is a compound prepared by reaction of a polycarboxyl compound prepared by a half-esterification of an acid anhydride with a polyol having two or more hydroxyl groups in the molecule and a vinyl ether compound.

10. The thermosetting composition as claimed in claim 1, wherein the compound (B) is a compound having two or more epoxy groups in the molecule.

11. The thermosetting composition as claimed in claim 1, wherein the compound (B) is a polymer of an α,β-unsaturated compound.

12. The thermosetting composition as claimed in claim 1, wherein the catalytic component (C) is the thermal latent acid catalyst (a).

13. The thermosetting composition as claimed in claim 1, wherein the catalytic component (C) is the thermal latent acid catalyst (a), the epoxy compound (i) comprising a monoepoxide, the compound having a sulfur atom (ii) of the formula (2) comprising an alkyl sulfide, the Lewis acid (iii) of the formula (3) comprising a zinc compound, and the catalytic component optionally containing (iv) a carboxylic acid compound and/or a carboxylic acid anhydride compound.

14. The thermosetting composition as claimed in claim 1, wherein the catalytic component (C) is the thermal latent acid catalyst (a), the epoxy compound (i) comprising a monoepoxide, the compound having a sulfur atom (ii) of formula (2) comprising an alkyl sulfide, the Lewis acid (iii) of formula (3) comprising a zinc compound, and the catalytic component containing (iv) a carboxylic acid compound.

15. The thermosetting composition as claimed in claim 1, wherein the catalytic component (C) is the thermal latent acid catalyst (a), the epoxy compound (i) comprising a monoepoxide, the compound having a sulfur atom (ii) of the formula (2) comprising an alkyl sulfide, the Lewis acid (iii) of the formula (3) comprising a zinc compound, and the catalytic component containing (iv) a carboxylic acid anhydride compound.

16. The thermosetting composition as claimed in claim 1, wherein the catalytic component (C) is the thermal latent acid catalyst (a), the epoxy compound (i) comprising a monoepoxide, the compound having a sulfur atom (ii) of formula (2) comprising an alkyl sulfide, the Lewis acid (iii) of formula (3) comprising a zinc compound, and the catalytic component containing (iv) a mixture of a carboxylic acid compound and a carboxylic acid anhydride compound.

17. The thermosetting composition as claimed in claim 1, wherein the catalytic component (C) is the thermal latent acid catalyst (b).

18. The thermosetting composition as claimed in claim 1, wherein the catalytic component (C) is the thermal latent acid catalyst (b), the compound (v) of the formula (4) comprising an alkyl sulfide, the compound having a halogen atom (vi) of the formula (5) comprising a benzyl halide, and the Lewis acid (vii) of the formula (6) comprising a zinc compound.

19. The thermosetting composition as claimed in claim 5, wherein the compound (D) is a compound having in the molecule one or more functional groups of the formula (8), and one or more epoxy groups.

20. The thermosetting composition as claimed in claim 5, wherein the compound (D) is a polymer of an α,β-unsaturated compound.

21. The thermosetting composition as claimed in claim 5, wherein the catalytic component (C) is the thermal latent acid catalyst (a).

22. The thermosetting composition as claimed in claim 5, wherein the catalytic component (C) is the thermal latent acid catalyst (a), the epoxy compound (i) comprising a monoepoxide, the compound having a sulfur atom (ii) of formula (2) comprising an alkyl sulfide, the Lewis acid (iii) of the formula (3) comprising a zinc compound, and the catalytic component optionally containing (iv) a carboxylic acid compound and/or a carboxylic acid anhydride compound.

23. The thermosetting composition as claimed in claim 5, wherein the catalytic component (C) is the thermal latent acid catalyst (a), the epoxy compound (i) comprising a monoepoxide, the compound having a sulfur atom (ii) of the formula (2) comprising an alkyl sulfide, the Lewis acid (iii) of the formula (3) comprising a zinc compound, and the catalytic component containing (iv) a carboxylic acid compound.

24. The thermosetting composition as claimed in claim 5, wherein the catalytic component (C) is the thermal latent acid catalyst (a), the epoxy compound (i) comprising a monoepoxide, the compound having a sulfur atom (ii) of formula (2) comprising an alkyl sulfide, the Lewis acid (iii) of the formula (3) comprising a zinc compound, and the catalytic component containing (iv) a carboxylic acid anhydride compound.

25. The thermosetting composition as claimed in claim 5, wherein the catalytic component (C) is the thermal latent acid catalyst (a), the epoxy compound (i) comprising a monoepoxide, the compound having a sulfur atom (ii) of the formula (2) comprising an alkyl sulfide, the Lewis acid (iii) of the formula (3) comprising a zinc compound, and the catalytic component containing (iv) a mixture of a carboxylic acid compound and a carboxylic acid anhydride compound.

26. The thermosetting composition as claimed in claim 5, wherein the catalytic component (C) is the thermal latent acid catalyst (b).

27. The thermosetting composition as claimed in claim 5, wherein the catalytic component (C) is the thermal latent acid catalyst (b), the compound (v) of the formula (4) comprising an alkyl sulfide, the compound having a halogen atom (vi) of the formula (5) comprising a benzyl halide and the Lewis acid (vii) of the formula (6) comprising a zinc compound.

28. The thermosetting composition as claimed in claim 1, wherein the catalytic component (C) is a thermal latent acid catalyst (a), a ratio of the epoxy groups of the compound (i) to the $M^1$ atoms of the Lewis acid (iii) being 0.5 to 5 and a ratio of the sulfur atoms of the compound (ii) to the $M^1$ atoms of the Lewis acid (iii) being 0.5 to 5.

29. The thermosetting composition as claimed in claim 1, wherein the catalytic component (C) is a thermal latent acid catalyst (b), a ratio of the atoms of the compound (v) to the $M^2$ atoms of the Lewis acid (vii) being 1 to 5 and a ratio of the $X^2$ atoms of the compound (vi) to the $M^2$ atoms of the Lewis acid (vii) being 1 to 5.

30. The thermosetting composition as claimed in claim 1, wherein the catalytic component (C) is a thermal latent acid catalyst (C), a ratio of the silicon atoms of the compound (ix) to the metallic atoms of the compound (viii) being 0.5 to 5.

31. The thermosetting composition as claimed in claim 5, wherein the catalytic component (C) is a thermal latent acid catalyst (a), a ratio of the epoxy groups of the compound (i) to the $M^1$ atoms of the Lewis acid (iii) being 0.5 to 5 and a ratio of the sulfur atoms of the compound (ii) to the $M^1$ atoms of the Lewis acid (iii) being 0.5 to 5.

32. The thermosetting composition as claimed in claim wherein the catalytic component (C) is a thermal latent acid catalyst (b), a ratio of the $Y^2$ atoms of the compound (v) to the $M^2$ atoms of the Lewis acid (vii) being 1 to 5 and a ratio of the $X^2$ atoms of the compound (vi) to the $M^2$ atoms of the Lewis acid (vii) being 1 to 5.

33. The thermosetting composition as claimed in claim 5, wherein the catalytic component (C) is a thermal latent acid catalyst (c), a ratio of the silicon atoms of the compound (ix) to the metallic atoms of the compound (viii) being 0.5 to 5.

* * * * *

UNITED STATES PATENT AND TRADEMARK OFFICE
CERTIFICATE OF CORRECTION

PATENT NO. : 5,661,219
DATED : August 26, 1997
INVENTOR(S) : Yoshinori NAKANE et al.

It is certified that error appears in the above-identified patent and that said Letters Patent is hereby corrected as shown below:

Title Page, Item [73] Assignee, replace "Nof" with --NOF--.

Column 17, line 11, replace "gultaric" with --glutaric--.

Column 77, line 29 (Claim 1), replace "$(X^1)_n-M^1-(R^7)_{n2}$" with --$(X^1)_{n1}-M^1-(R^7)_{n2}$--.

Column 79, line 8 (Claim 2), replace "$R^{1,R2}$" with --$R^1, R^2$--.

Column 80, line 45 (Claim 5), replace "$R^5-S-R^5$" with --$R^5-S-R^6$--.

Column 80, line 49 (Claim 5), after "different" insert --from--.

Column 83, line 41 (Claim 8), delete "curable".

UNITED STATES PATENT AND TRADEMARK OFFICE
CERTIFICATE OF CORRECTION

PATENT NO. : 5,661,219
DATED : August 26, 1997
INVENTOR(S) : Yoshinori NAKANE et al.

It is certified that error appears in the above-identified patent and that said Letters Patent is hereby corrected as shown below:

Column 86, line 1 (Claim 29), before "atoms" insert --$Y^2$--.

Column 86, line 16 (Claim 32), after "claim" insert --5--.

Signed and Sealed this

Seventeenth Day of November, 1998

Attest:

BRUCE LEHMAN

Attesting Officer

Commissioner of Patents and Trademarks